(12) United States Patent
Kanetsuki et al.

(10) Patent No.: US 9,718,023 B2
(45) Date of Patent: Aug. 1, 2017

(54) GAS SEPARATION MEMBRANE MODULE AND GAS SEPARATION METHOD

(75) Inventors: Yutaka Kanetsuki, Ube (JP); Nozomu Tanihara, Ube (JP); Tomohide Nakamura, Ube (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 587 days.

(21) Appl. No.: 13/288,095

(22) Filed: Nov. 3, 2011

(65) Prior Publication Data

US 2012/0304856 A1 Dec. 6, 2012

(30) Foreign Application Priority Data

| Nov. 4, 2010 | (JP) | ................................. 2010-247779 |
| Nov. 4, 2010 | (JP) | ................................. 2010-247931 |
| Dec. 9, 2010 | (JP) | ................................. 2010-274619 |
| May 31, 2011 | (JP) | ................................. 2011-122285 |
| Sep. 22, 2011 | (JP) | ................................. 2011-207538 |
| Sep. 22, 2011 | (JP) | ................................. 2011-207647 |
| Oct. 14, 2011 | (JP) | ................................. 2011-227101 |
| Oct. 31, 2011 | (JP) | ................................. 2011-239388 |

(51) Int. Cl.
*B01D 53/22* (2006.01)
*B01D 63/02* (2006.01)
(Continued)

(52) U.S. Cl.
CPC ........... *B01D 53/22* (2013.01); *B01D 53/228* (2013.01); *B01D 63/02* (2013.01); *B01D 63/023* (2013.01);
(Continued)

(58) Field of Classification Search
CPC ...... B01D 53/22; B01D 53/228; B01D 71/64; B01D 63/02; B01D 63/023;
(Continued)

(56) References Cited

U.S. PATENT DOCUMENTS 3,133,132 A      5/1964   Loeb et al.
4,553,988 A  *  11/1985  Shimizu et al. .................... 96/7
(Continued)

FOREIGN PATENT DOCUMENTS

| EP | 0 446 947 A2 | 9/1991 |
| JP | 61-133106 | 6/1986 |

(Continued)

OTHER PUBLICATIONS

First Office Action, State Intellectual Property Office (SIPO), Chinese Patent Application No. 201110345156X, dated Nov. 8, 2013, 8 pages.

(Continued)

*Primary Examiner* — Anthony Shumate
(74) *Attorney, Agent, or Firm* — Nixon Peabody LLP; Jeffrey L. Costellia

(57) ABSTRACT

A process for producing nitrogen-rich air by feeding high temperature air at 150° C. or more to an air separation membrane module is described. After being placed at 175° C. for two hours, the air separation module exhibits a shape-retention ratio of 95% or more in one embodiment. The nitrogen-rich air can be fed to a fuel tank for an aircraft, for example.

6 Claims, 21 Drawing Sheets

(51) Int. Cl.
*B01D 69/02* (2006.01)
*B01D 71/64* (2006.01)

(52) U.S. Cl.
CPC ............. *B01D 69/02* (2013.01); *B01D 71/64* (2013.01); *B01D 2053/224* (2013.01); *B01D 2256/10* (2013.01); *B01D 2257/104* (2013.01); *B01D 2311/13* (2013.01); *B01D 2313/02* (2013.01); *B01D 2313/04* (2013.01); *B01D 2313/20* (2013.01); *B01D 2313/21* (2013.01); *B01D 2319/04* (2013.01); *B01D 2325/20* (2013.01); *B01D 2325/32* (2013.01)

(58) Field of Classification Search
CPC .......... B01D 2053/224; B01D 2256/10; B01D 2257/104; B01D 2311/13; B01D 2313/02
USPC .................................. 95/43, 45, 47; 96/4, 10
See application file for complete search history.

(56) References Cited

U.S. PATENT DOCUMENTS

| | | | |
|---|---|---|---|
| 4,842,620 A * | 6/1989 | Hammel et al. | 95/47 |
| 5,049,169 A * | 9/1991 | Teramoto et al. | 96/14 |
| 5,051,114 A * | 9/1991 | Nemser et al. | 95/47 |
| 5,178,650 A * | 1/1993 | Hayes | 95/47 |
| 5,306,331 A * | 4/1994 | Auvil et al. | 95/42 |
| 5,538,536 A * | 7/1996 | Fuentes et al. | 95/45 |
| 5,725,769 A * | 3/1998 | Miller et al. | 210/500.39 |
| 5,837,032 A * | 11/1998 | Moll et al. | 95/45 |
| 5,969,087 A * | 10/1999 | Maeda | 528/353 |
| 6,126,721 A * | 10/2000 | Nemser et al. | 95/54 |
| 6,210,464 B1 | 4/2001 | Nakanishi et al. | |
| 6,425,267 B1 * | 7/2002 | Baker et al. | 62/624 |
| 6,491,739 B1 | 12/2002 | Crome et al. | |
| 6,592,650 B2 * | 7/2003 | Pinnau et al. | 95/47 |
| 6,630,011 B1 * | 10/2003 | Baker et al. | 95/47 |
| 6,749,747 B1 * | 6/2004 | Olapinski et al. | 210/184 |
| 7,179,322 B2 * | 2/2007 | Lyons et al. | 95/47 |
| 7,374,601 B2 * | 5/2008 | Bonchonsky et al. | 95/138 |
| 7,867,319 B2 * | 1/2011 | Zaki et al. | 95/45 |
| 8,245,978 B1 * | 8/2012 | Beers et al. | 244/135 R |
| 8,268,042 B2 * | 9/2012 | Lopez et al. | 95/52 |
| 8,328,906 B2 * | 12/2012 | Miller et al. | 95/45 |
| 8,337,598 B2 * | 12/2012 | Yates et al. | 96/10 |
| 8,394,182 B2 * | 3/2013 | Koros et al. | 96/10 |
| 2006/0011063 A1 * | 1/2006 | Zhou | 96/10 |
| 2008/0134885 A1 | 6/2008 | Yoshinaga et al. | |
| 2010/0155046 A1 | 6/2010 | Surawski | |
| 2010/0199840 A1 | 8/2010 | Yamaoka et al. | |
| 2010/0326278 A1 * | 12/2010 | Nakamura et al. | 96/8 |
| 2011/0232484 A1 * | 9/2011 | Yoshinaga et al. | 95/47 |
| 2012/0042777 A1 * | 2/2012 | Lee et al. | 95/47 |
| 2014/0047982 A1 * | 2/2014 | Fukuda et al. | 96/8 |

FOREIGN PATENT DOCUMENTS

| | | |
|---|---|---|
| JP | 62-074434 | 4/1987 |
| JP | A-H01-194905 | 8/1989 |
| JP | H01-194904 | 8/1989 |
| JP | 02-36287 | 8/1990 |
| JP | 03-267130 | 11/1991 |
| JP | 2509962 | 6/1996 |
| JP | 2000-262838 | 9/2000 |
| JP | A-2010-082549 | 4/2010 |
| JP | 2010-142801 | 7/2010 |
| JP | A-2010-172892 | 8/2010 |
| WO | WO 2009-044711 A1 | 4/2009 |
| WO | WO-2010/038810 A1 | 4/2010 |

OTHER PUBLICATIONS

Chinese Office Action for Application No. 201110345156.X dated Jul. 21, 2014, 5pgs.
Copy and English-language translation of Japanese Office Action dated May 27, 2014 issued in a Japanese Patent App. No. 2010-247931.
Copy and partial English Translation of Pre-Trial Examination Report dated Aug. 21, 2015 issued in a Japanese Patent Application No. JP2010-247931, 6 pgs.
Copy and English-language translation: Decision to Dismiss the Amendment dated Jan. 31, 2017 issued in a Japanese Patent Application No. JP-2015-104575.

* cited by examiner (A)   (B)

GAS SEPARATION MEMBRANE MODULE AND GAS SEPARATION METHOD

CROSS-REFERENCE TO RELATED APPLICATIONS

This application claims the benefit of Japanese Patent Application Nos. 2010-247779, filed Nov. 4, 2010; 2010-247931, filed Nov. 4, 2010; 2010-274619, filed Dec. 9, 2010: 2011-122285, filed May 31, 2011; 2011-207538, filed Sep. 22, 2011; 2011-207047 filed Sep. 22, 2011; 2011-227101, filed Oct. 14, 2011; and 2011-239388, filed Oct. 31, 2011.

TECHNICAL FIELD

The present invention relates to a gas separation membrane module and a gas separation method for separating gases using a number of hollow fiber membranes with selective permeability.

BACKGROUND ART

A separation membrane module using a separation membrane with selective permeability for gas separation (for example, separation of oxygen, nitrogen, hydrogen, water vapor, carbon dioxide, organic vapor or the like) can be of plate and frame type, of tubular type, of hollow fiber type or the like. Among these, a hollow-fiber type gas separation membrane module is industrially excellent because it is not only advantageous in its largest membrane area per a unit volume but also superior in pressure resistance and self-supporting ability, and thus has been extensively used.

SUMMARY OF INVENTION

The present inventions will be detailed in sections A to G below and include a combination of two or more inventions described in the sections. The background and the problems for the inventions disclosed in each section will be described in each section.

BRIEF DESCRIPTION OF THE DRAWINGS

FIGS. 8($a$) and 8($b$) show the states at normal temperature and an elevated temperature, respectively.

FIG. 15(A) is a cross-sectional view taken on line X-X of FIG. 15(B).

DETAILED DESCRIPTION

Figure 1:
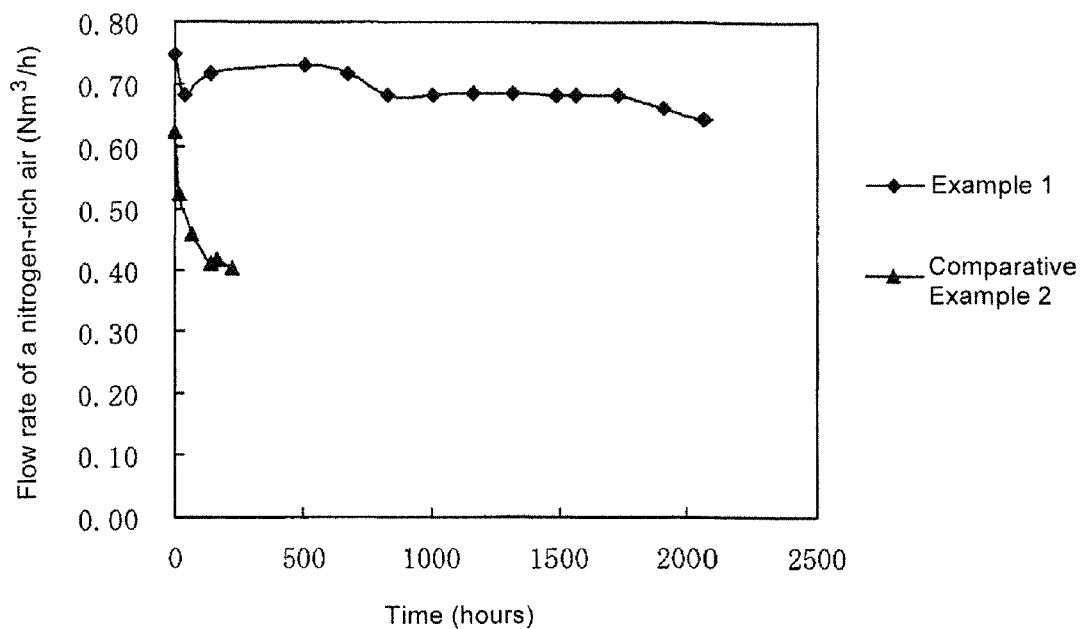
FIG. 1 shows the measurement results for Example 1 and Comparative Example 2 in section A.

There will be described embodiments of the present inventions in sections A to G.

Section A: a Process for Producing Nitrogen-Rich Air from High Temperature Gas (Background Art)

Some aircrafts use an on-board inert-gas generating system (OBIGGS) as one of methods for protecting against explosion of a fuel tank. An oxygen concentration of a gas-phase region in a fuel tank should be lower than a given concentration for avoiding risk of explosion. Thus, an OBIGGS separates oxygen from the air to generate nitrogen-rich air containing nitrogen in a higher level, which is then fed to a fuel tank.

An OBIGGS generates nitrogen-rich air using, for example, an air separation membrane module. Since a treated amount of an air separation membrane generally increases at a higher pressure and a higher temperature of a feed gas, an extracted gas from an engine, an ambient air or the like is compressed by, for example, a compressor and then fed to an air separation membrane module. The compressed gas is generally heated to 149 to 260° C.

A conventional air separation membrane module efficiently operates at a temperature of about 82° C. to about 93°

C. It cannot be, therefore, used at a high temperature as described above due to significant deterioration in separation performance. Therefore, a compressed gas is generally cooled to the above temperature range by using a heat exchanger or mixing the gas with a cool air and then fed to an air separation membrane module (see Japanese laid-open patent publication No. 2010-142801).

Problems to be Solved by the Invention in Section A

An objective of the invention in section A is to provide a process for producing nitrogen-rich air by feeding a compressed air at 150° C. or higher to an air separation membrane module.

The summary of the main invention disclosed in this section is as follows.

[1] A process for producing nitrogen-rich air from the air using an air separation membrane module, comprising feeding the air at 150° C. or higher to an air separation membrane module.

Effect of the Invention in Section A

According to a process of the invention in section A, a nitrogen-rich air containing a higher concentration of nitrogen can be produced by feeding the air at a high temperature, for example, 150° C. or higher to an air separation membrane module. The invention of this section is characterized in the use of an air separation membrane with a higher oxygen-gas permeation rate and higher selectivity of oxygen and nitrogen at a high temperature, which can maintain its performance even after a long period of use at a high temperature. The invention of this section is suitable for, for example, an explosion-proof system for a fuel tank in an aircraft. The use of the invention of this section in the explosion-proof system allows for weight reduction of, for example, a heat exchanger for cooling a hot air during feeding the air to an air separation membrane module. Furthermore, a permeation rate of an air separation membrane becomes higher as a temperature of a feed air is higher, and therefore, the process of the invention of this section, which can treat a high temperature air, can be efficient with a smaller membrane area. Thus, equipments in an aircraft can be simplified and be made lighter.

Embodiments in Section A

The invention disclosed in this section is a process for producing nitrogen-rich air from the air using an air separation membrane module, comprising feeding the air at a high temperature of 150° C. or higher to the air separation membrane module. Unless otherwise indicated, the term "high temperature" as used herein means a temperature of 150° C. or higher, preferably 175° C. or higher, more preferably 200° C. or higher.

An air separation membrane module can be produced by, for example, bundling 100 to 1,000,000 hollow fiber membranes with a proper length, fixing both ends of the hollow fiber bundle by a tube sheet made of, for example, a thermosetting resin keeping at least one end of the hollow fiber open, and mounting a resulting hollow fiber membrane element comprising the hollow fiber bundle and the tube sheet in a vessel equipped with at least an air inlet, a permeate gas outlet and a non-permeate gas outlet in such a way that the space leading to the inside of the hollow fiber membranes and the space leading to the outside of the hollow fiber membranes are isolated each other. In such an air separation membrane module, gas separation is performed by feeding the air to the space leading to the inside or the outside of the hollow fiber membranes from the air inlet and flowing in contact with the hollow fiber membranes while oxygen in the air selectively permeates the membrane so that a permeate gas (oxygen-rich air) and non-permeate gas (nitrogen-rich air) are discharged from the permeate gas outlet and the non-permeate gas outlet, respectively.

An example of an air separation membrane is, but not limited to, an asymmetric air separation membrane which has an asymmetric structure consisting of a very thin dense layer (preferably thickness: 0.001 to 5 µm) mainly responsible for air separation performance and a relatively thicker porous layer (preferably thickness: 10 to 2000 µm) supporting the dense layer. It is preferably a hollow fiber membrane having an inner diameter of about 10 to 3000 µm and an outer diameter of about 30 to 7000 µm.

The air separation membrane preferably has the following properties at a high temperature.

An air separation membrane preferably has a high oxygen-gas permeation rate at a high temperature. For example, it has an oxygen permeation rate ($P'_{O2}$) of $20 \times 10^{-5}$ cm$^3$(STP)/cm$^2$·sec·cmHg or more, preferably $25 \times 10^{-5}$ cm$^3$(STP)/cm$^2$·sec·cmHg or more, more preferably $30 \times 10^{-5}$ cm$^3$(STP)/cm$^2$·sec·cmHg or more at 175° C. Furthermore, an air separation membrane preferably exhibits high separation performance even at a high temperature; for example, a ratio of an oxygen-gas permeation rate to a nitrogen-gas permeation rate ($P'_{O2}/P'_{N2}$) as an index of separation performance of a membrane is for example 1.8 or more, preferably 2.0 or more, more preferably 2.5 or more at 175° C. A ratio of permeation rates is generally larger at a lower temperature. A higher ratio of permeation rates, that is, higher separation performance leads to a higher recovery ratio of desired nitrogen-rich air.

Furthermore, it is preferable that in an air separation membrane, an oxygen-gas permeation rate or separation performance of the membrane is not reduced very much even after a long period of use at a high temperature. For example, after the use at 175° C. for 140 hours, an oxygen permeation rate ($P'_{O2}$) and a ratio of an oxygen-gas permeation rate to a nitrogen-gas permeation rate ($P'_{O2}/P'_{N2}$) are preferably 75% or more, more preferably 80% or more, further preferably 90% or more, to $P'_{O2}$ and $P'_{O2}/P'_{N2}$ before use, respectively.

Furthermore, an air separation membrane preferably retains its shape even at a high temperature as much as its functions are not deteriorated. For example, it is preferable that a material constituting an air separation membrane has a glass-transition temperature (Tg) of preferably 225° C. or higher (that is, not less than 225° C.), more preferably 250° C. or more, further preferably 300° C. or more (including a material whose glass-transition temperature cannot be determined). Furthermore, it preferably retains its shape at a high temperature for a long period; a shape retention ratio is preferably 95% or more, more preferably 99% or more after being placed at 175° C. for 2 hours. Here, a shape retention ratio in this section is calculated by dividing a length of a fiber after heating at 175° C. for 2 hours by an initial length before heating, and converting the value to percentage.

Examples of a material having a glass-transition temperature of higher than 225° C., which is suitable for a separation membrane, include polyimides, polyether sulfones, polyamides and polyether ether ketones, particularly preferably, polyimides.

As a non-limiting material for an asymmetric gas separation hollow fiber membrane (hereinafter, sometimes simply referred to as a hollow fiber membrane), an exemplary composition of a polyimide will be described, which is suitable for an air separation membrane and has a glass-transition temperature of higher than 225° C. A polyimide having a composition described below is an aromatic polyimide having a repeating unit represented by general formula (1) and has a glass-transition temperature of generally 250° C. or higher, preferably 300° C. or higher (including a material whose glass-transition temperature cannot be determined).

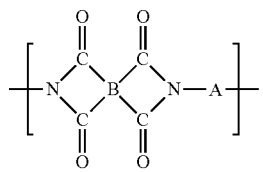

General Formula (1)

In this formula, B is a tetravalent unit derived from a tetracarboxylic acid component, and A is a divalent unit derived from a diamine component. The units constituting the aromatic polyimide will be detailed below.

Unit B is a tetravalent unit derived from a tetracarboxylic acid component, which comprises 10 to 70 mol %, preferably 20 to 60 mol % of unit B1 having a diphenylhexafluoropropane structure represented by general formula (B1) described below, and 90 to 30 mol %, preferably 80 to 40 mol % of unit B2 having a biphenyl structure represented by general formula (B2) described below, and it is preferably substantially comprised of unit B1 and unit B2. If the diphenylhexafluoropropane structure is less than 10 mol % and the biphenyl structure is more than 90 mol %, gas separation performance of a polyimide obtained is so deteriorated that a high performance gas separation membrane cannot be obtained. If the diphenylhexafluoropropane structure is more than 70 mol % and the biphenyl structure is less than 30 mol %, mechanical strength of a polyimide obtained may be deteriorated.

Unit B can comprise a tetravalent unit based on a phenyl structure represented by general formula (B3). The tetravalent unit based on the phenyl structure represented by general formula (B3) is suitably comprised in 0 to 30 mol %, preferably 10 to 20 mol %.

Furthermore, unit B can comprise a tetravalent unit B4 derived from another tetracarboxylic acid other than units B1, B2 and B3.

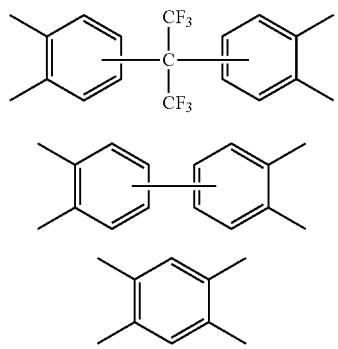

Unit A is a divalent unit derived from a diamine component, and comprises unit A1 selected from the group consisting of general formulas (A1a), (A1b) and (A1c) and unit A2 selected from the group consisting of general formulas (A2a) and (A2b). Furthermore, unit A can comprise a divalent unit A3 derived from another diamine component other than units A1 and A2.

Unit A1a is a divalent unit based on a biphenyl structure represented by Formula (A1a), and unit A1b and A1c comprise hexafluorinated structures represented by Formulas (A1b) and (A1c), respectively, more specifically a unit having a structure comprising two trifluoromethyl groups.

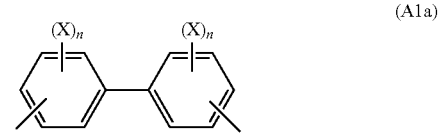

wherein X is chlorine or bromine, and n is 1 to 3.

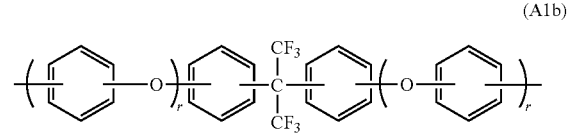

wherein r is 0 or 1, and the phenyl rings can be substituted by OH group.

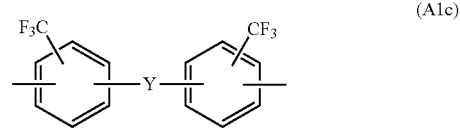

wherein Y represents O or a single bond.

When unit A1 comprises the unit represented by Formula (A1a), it is suitably comprised in 30 to 70 mol %, preferably 30 to 60 mol % in unit A. The benzidines contribute to improvement permselectivity. If the amount thereof is too much, a resulting polymer becomes insoluble and it is difficult to form a membrane, while if the amount is too low, a permselectivity is disadvantageously reduced.

When unit A1 contains the units represented by Formulas (A1b) and/or (A1c), these are comprised in 10 to 50 mol %, preferably 20 to 40 mol % in unit A.

Unit A2 is a sulfur-containing heterocyclic structure, specifically selected from the units represented by general formulas (A2a) and (A2b).

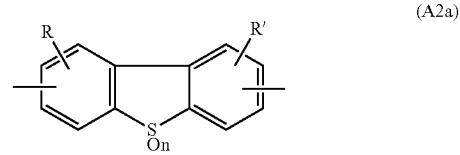

wherein R and R' are hydrogen or an organic group, and n is 0, 1 or 2.

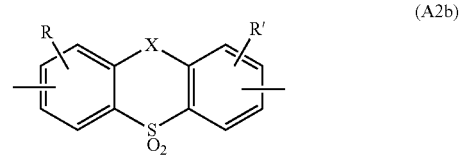

wherein R and R' are hydrogen or an organic group, and X is —CH₂— or —CO—.

Unit A2 is comprised in 90 to 30 mol %, preferably 90 to 40 mol %, more preferably 90 to 50 mol %, further preferably 80 to 60 mol % in unit A.

Unit A3 can be comprised in 50 mol % or less, preferably 40 mol % or less, more preferably 20 mol % or less in unit A.

There will be described a monomer component constituting each of the above units in an aromatic polyimide.

The unit having the diphenylhexafluoropropane structure represented by general formula (B1) can be prepared using a (hexafluoroisopropylidene)diphthalic acid, its dianhydride or its ester as a tetracarboxylic acid component. The (hexafluoroisopropylidene)diphthalic acids can be suitably selected from 4,4'-(hexafluoroisopropylidene)diphthalic acid, 3,3'-(hexafluoroisopropylidene)diphthalic acid, 3,4'-(hexafluoroisopropylidene)diphthalic acid, their dianhydrides and their esters, particularly suitably 4,4'-(hexafluoroisopropylidene) diphthalic acid, its dianhydride and its ester.

The unit having the biphenyl structure represented by general formula (B2) can be prepared by using biphenyltetracarboxylic acids such as biphenyltetracarboxylic acid, its dianhydride and its ester as a tetracarboxylic acid component. The biphenyltetracarboxylic acids can be suitably selected from 3,3',4,4'-biphenyltetracarboxylic acid, 2,3,3',4'-biphenyltetracarboxylic acid, 2,2',3,3'-biphenyltetracarboxylic acid, their dianhydrides and their esters, particularly suitably 3,3',4,4'-biphenyltetracarboxylic acid, its dianhydride and its ester.

The tetravalent unit based on a phenyl structure represented by general formula (B3) can be formed by using pyromellitic acids such as pyromellitic acid and its anhydride. The pyromellitic acids are suitable for improving mechanical properties. If its amount is excessive, it is difficult to form a hollow fiber membrane because a polymer solution becomes unstable, for example, it is coagulated during membrane formation.

Another tetracarboxylic acid component giving unit B4 is a tetracarboxylic acid other than those described above, and can be selected from those which can sometimes further improve performance without deteriorating the effects of the invention in this section. Examples can include diphenyl ether tetracarboxylic acids, benzophenone tetracarboxylic acids, diphenylsulfonetetracarboxylic acids, naphthalene tetracarboxylic acids, diphenyl methanetetracarboxylic acids and diphenylpropane tetracarboxylic acids.

The divalent unit based on the biphenyl structure represented by general formula (A1a) can be formed by using halogenated benzidines represented by general formula (A1a-M) as a diamine component.

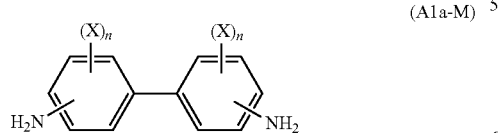
(A1a-M)

wherein X is chlorine or bromine, and n=1 to 3.

Examples of halogenated benzidines include dichlorobenzidines (diaminodichlorobiphenyl0, tetrachlorobenzidines (cliaminotetrachlorobiphenyls), hexachlorobenzidines, tetrabromobenziclines, dibromobenzidines and hexabromobenzidines. An example of dichlorobenzidines can include 3,3'-dichlorobenzidine (DCB) and an example of tetrachlorobenzidines can include 2,2',5,5'-tetrachlorobenzidine (TCB).

The divalent unit represented by general formula (A1b) is formed by using a hexafluorinated compound represented by general formula (A1b-M) as a diamine component.

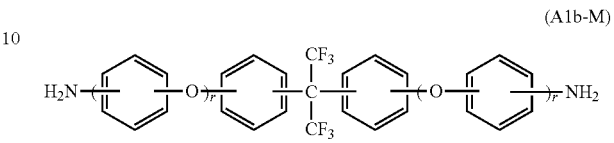
(A1b-M)

wherein r is 0 or 1, and the phenyl rings may be substituted by OH group.

A preferable hexafluorinated compound represented by (A1b-M) is represented by any of general formulas (A1b-M1) to (A1b-M3).

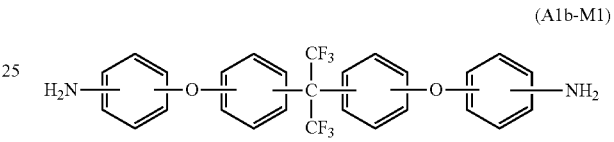
(A1b-M1)

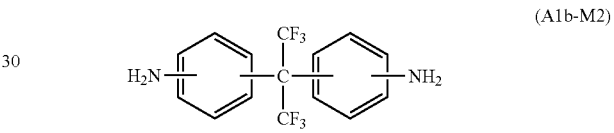
(A1b-M2)

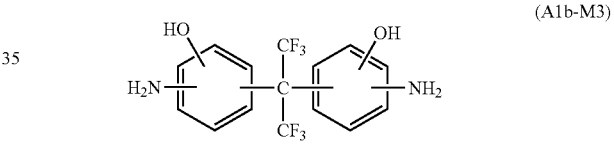
(A1b-M3)

The bisRaminophenoxy)phenyaexalluoropropanes represented by general formula (A1b-M1) can include for example, 2,2-bis[4-(4-aminophenoxy)phenyl]hexafluoropropane or 2,2-bis[4-(3-aminophenoxy)phenyl]hexafluoropropane. The bis(aminophenyl)hexafluoropropanes represented by general formula (A1b-M2) can include, for example, 2,2-bis(4-aminophenyl)hexafluoropropane. The hydroxylated bis(aminophenylkexafluorepropanes represented by general formula (A1b-M3) can include, for example, 2,2-bis(3-amino-4-hydroxy)hexafluoropropane.

The divalent unit represented by general formula (A1c) can be prepared by using a hexafluorinated compound represented by general formula (A1c-M) as a diamine component.

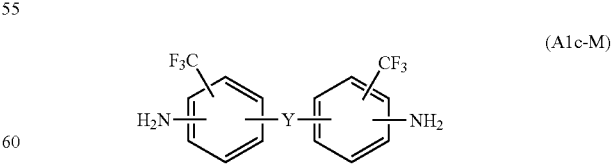
(A1c-M)

wherein Y represents O or a single bond.

The diamine compounds represented by general formula (A1c-M) can include, for example, 2,2'-bis(trifluoromethyl)-4,4'-diaminodiphenyl ether and 2,2'-bis(trifluoromethyl)-4,4'-diaminobiphenyl.

The unit having a structure represented by general formula (A2a) or (A2b) can be prepared by using an aromatic diamine represented by general formula (A2a-M) or (A2b-M), respectively, as a diamine component.

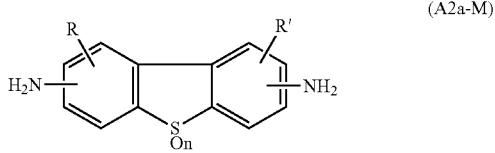

(A2a-M)

wherein R and R' are hydrogen or an organic group, and n is 0, 1 or 2.

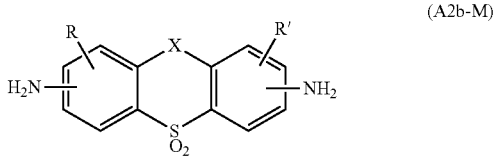

(A2b-M)

wherein R and R' are hydrogen or an organic group, and X is —CH$_2$— or —CO—.

The aromatic diamine represented by general formula (A2a-M) can include suitably the diaminodibenzothiophenes represented by general formula (A2a-M1), that is, general formula (A2a-M) in which n is 0, or the diaminoclibenzothiophene=5,5-dioxides represented by general formula (A2a-M2), that is, general formula (A2a-M) in which n is 2.

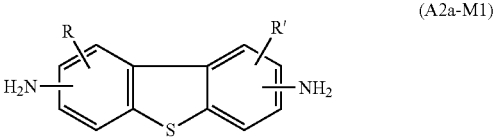

(A2a-M1)

wherein R and R' are hydrogen or an organic group.

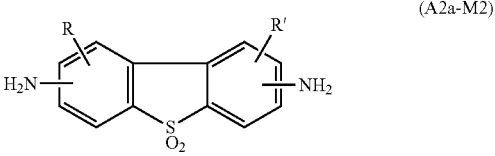

(A2a-M2)

wherein R and R' is hydrogen or an organic group.

The diaminodibenzothiophenes (general formula (A2a-M1)) can include, for example, 3,7-diamino-2,8-dimethyldibenzothiophene, 3,7-diamino-2,6-dimethyldibenzothiophene, 3,7-diamino-4,6-dimethyldibenzothiophene, 2,8-diamino-3,7-dimethyldibenzothiophene, 3,7-diamino-2,8-diethyldibenzothiophene, 3,7-diamino-2,6-diethyldibenzothiophene, 3,7-diamino-4,6-diethyldibenzothiophene, 3,7-diamino-2,8-dipropyldibenzothiophene, 3,7-diamino-2,6-dipropyldibenzothiophene, 3,7-diamino-4,6-dipropyldibenzothiophene, 3,7-diamino-2,8-dimethoxydibenzothiophene, 3,7-diamino-2,6-dimethoxydibenzothiophene, and 3,7-diamino-4,6-dimethoxydibenzothiophene.

The diaminodibenzothiophene=5,5-dioxides (general formula (A2a-M2)) can include, for example, 3,7-diamino-2,8-dimethyldibenzothiophene=5,5-dioxide, 3,7-diamino-2,6-dimethyldibenzothiophene=5,5-dioxide, 3,7-diamino-4,6-dimethyldibenzothiophene=5,5-dioxide, 2,8-diamino-3,7-dimethyldibenzothiophene=5,5-dioxide, 3,7-diamino-2,8-diethyldibenzothiophene=5,5-dioxide, 3,7-diamino-2,6-diethyldibenzothiophene=5,5-dioxide, 3,7-diamino-4,6-diethyldibenzothiophene=5,5-dioxide, 3,7-diamino-2,8-dipropyldibenzothiophene=5,5-dioxide, 3,7-diamino-2,6-dipropyldibenzothiophene=5,5-dioxide, 3,7-diamino-4,6-dipropyldibenzothiophene=5,5-dioxide, 3,7-diamino-2,8-dimethoxydibenzothiophene=5,5-dioxide, 3,7-diamino-2,6-dimethoxyclibenzothiophene=5,5-dioxide, and 3,7-diamino-4,6-dimethoxydibenzothiophene=5,5-dioxide.

The diaminothioxanthene-10,10-diones that are given by selecting —CH$_2$— as X the general formula (A2b-M) can include, for example, 3,6-diaminothioxanthene-10,10-dione, 2,7-diaminothioxanthene-10,10-dione, 3,6-diamino-2,7-diamethylthioxanthene-10,10-dione, 3,6-diamino-2,8-diethylthioxanthene-10,10-dione, 3,6-diamino-2,8-dipropylthioxanthene-10,10-dione, and 3,6-diamino-2,8-dimethoxythioxanthene-10,10-dione The diaminothioxanthene-9, 10, 10-triones that are given by selecting —CO— as X in the general formula (A2b-M) can include, for example, 3,6-diamino-thioxanthene-9,10,10-trione and 2,7-diamino-thioxanthene-9,10,10-trione.

Another diamine component giving unit A3 is a diamine compound other than those described above, and selected from compounds which can sometimes further improve performance without deteriorating the effects of the invention in this section.

Examples can include:

diaminodiphenyl sulfones such as 3,3'-diaminodiphenyl sulfone, 3,4'-diaminodiphenyl sulfone, 4,4'-diaminodiphenyl sulfone, 4,4'-diamino-3,3'-dimethyldiphenyl sulfone;

diaminodiphenyl ethers such as 4,4'-diaminodiphenyl ether, 3,4'-diaminodiphenyl ether, 3,3'-diaminodiphenyl ether, 3,3'-dimethyl-4,4'-diaminodiphenyl ether and 3,3'-diethoxy-4,4'-diaminodiphenyl ether;

diaminodiphenyl methanes such as 4,4'-diaminodiphenyl methane and 3,3'-diaminodiphenyl methane;

2,2-bis(aminophenyl)propanes such as 2,2-bis(3-aminophenyl)propane and 2,2-bis(4-aminophenyl)propane;

2,2-bis(aminophenoxyphenyl)propanes such as 2,2-bis[4-(4-aminophenoxy)phenyl]propane and 2,2-bis[4-(3-aminophenoxy)phenyl]propane;

diaminobenzophenones such as 4,4'-diaminobenzophenone and 3,3'-diaminobenzophenone;

diaminobenzoic acids such as 3,5-diaminobenzoic acid;

phenylenedimines such as 1,3-phenylenediamine and 1,4-phenylenediamine;

dichlorodiaminodiphenyl ethers such as 2,2'-dichloro-4,4'-diaminodiphenyl ether;

tolidines such as ortho-tolidine and meta-tolidine; and dihydroxydiaminobiphenyls such as 2,2'-dihydroxy-4,4'-diaminobiphenyl.

Among these, preferred are diaminodiphenyl sulfones, diaminodiphenyl ethers, diaminobenzoic acids, dichlorodiaminodiphenyl ethers and dihydroxydiaminobiphenyls.

When an aromatic polyimide represented by a repeating unit of general formula (1) is used for an asymmetric air separation membrane, for example, it is preferable that the tetracarboxylic acid component is a combination of 4,4'-(hexafluoroisopropylidene-bis(phthalic anhydride) as a carboxylic acid giving unit B1, 3,3',4,4'-biphenyl tetracarboxylic dianhydride as a carboxylic acid giving unit B2 and pyromellitic dianhydride as a carboxylic acid giving unit B3, and the diamine component is a combination of 2,2',5,5'-tetrachlorobenzidine as a diamine giving unit A1 and 3,7-diamino-dimethyldibenzothiophene=5,5-dioxide as a diamine giving unit A2. 3,7-Diamino-dimethyldibenzothiophene=5,5-dioxide means a mixture of 3,7-diamino-2,8-dimethyldibenzothiophene=5,5-dioxide as a main component containing isomers in which a methyl group is attached at a different position, that is, 3,7-diamino-2,6-dimethyldibenzothiophene=5,5-dioxide and 3,7-diamino-4,6-dimethyldibenzothiophene=5,5-dioxide.

The aromatic polyimide solution can be suitably prepared by a two-step process of combining a tetracarboxylic acid component and a diamine component in an organic polar solvent in a given composition ratio, which is then polymerized at a low temperature of around room temperature to form a polyamide acid, and of then imidizing the polyimide acid by heating or chemically imidizing by adding, for example, pyridine, or alternatively, a one-step process of combining a tetracarboxylic acid component and a diamine component in an organic polar solvent in a given composition ratio, which is then polymerized and imidized at a high temperature of about 100 to 250° C., preferably about 130 to 200° C. In imidizing by heating, the reaction is suitably conducted while water or an alcohol generated is removed. An amount used of the tetracarboxylic acid component and the diamine component to the organic polar solvent is suitably such that a concentration of the polyimide in the solvent is about 5 to 50% by weight, preferably 5 to 40% by weight.

The aromatic polyimide solution prepared after the polymerization and the imidizing can be directly used in spinning. Alternatively, for example, the aromatic polyimide solution obtained is added to a solvent in which the aromatic polyimide is insoluble, to precipitate and isolate the aromatic polyimide, which is then dissolved in an organic polar solvent to a given concentration to prepare an aromatic polyimide solution which can be used in spinning.

In the aromatic polyimide solution used in the spinning, a concentration of the polyimide is preferably 5 to 40% by weight, further preferably 8 to 25% by weight, and a solution viscosity (rotational viscosity) is 100 to 15000 poise, preferably 200 to 10000 poise, particularly preferably 300 to 5000 poise at 100° C. If a solution viscosity is less than 100 poise, a uniform membrane (film) may be formed, but an asymmetric membrane with a large mechanical strength cannot be obtained. If it is more than 15000 poise, extrusion from a spinning nozzle becomes difficult, so that an asymmetric hollow fiber membrane having a desired shape cannot be obtained.

There are no particular restrictions to the organic polar solvent as long as it can suitably dissolve an aromatic polyimide obtained, and examples of such a solvent include phenols such as phenol, cresol and xylenol; catechols such as catechol and resorcin in which a benzene ring directly has two hydroxyl groups; phenolic solvents including halogenated phenols such as 3-chlorophenol, 4-chlorophenol (equivalent to parachlorophenol described later), 3-bromophenol, 4-bromophenol and 2-chloro-5-hydroxytoluene; or amide solvent including amides such as N-methyl-2-pyrrolidone, 1,3-dimethyl-2-imidazolidinone, N,N-dimethylformamide, N,N-diethylformamide, N,N-dimethylacetamide and N,N-diethylacetamide; or mixtures of these.

A hollow fiber membrane can be suitably prepared by spinning in a dry/wet manner (dry-wet spinning) using the above aromatic polyimide solution. The dry-wet manner is a method where a solvent in the surface of the polymer solution having a hollow fiber shape is evaporated to form a thin dense layer (separation layer) and immersing the polymer solution in a coagulation liquid (a solvent which is compatible with the solvent in the polymer solution and in which a polymer is insoluble) to cause phase separation which is then utilized to form pores, giving a porous layer (supporting layer) (a phase inversion method), and has been proposed by Loeb et al. (for example, U.S. Pat. No. 3,133,132).

A dry-wet spinning manner is a method for forming a hollow fiber membrane using a spinning nozzle in a dry/wet manner, which is described in, for example, Japanese laid-open patent publication Nos. 1986-133106 and 1991-267130.

The production process generally has the steps of spinning (spinning-dope extruding), coagulating, washing, drying and heating.

First, in the spinning step (spinning-dope extruding step), a spinning nozzle used for extruding a spinning dope solution can be any nozzle capable of extruding the spinning dope solution as a hollow fiber form, suitably a tube-in-orifice type nozzle and the like. Generally, a temperature range of the aromatic polyimide solution during extrusion is preferable about 20° C. to 150° C., particularly 30° C. to 120° C. A suitable temperature range depends on a kind of a solvent for the dope and its viscosity. Furthermore, spinning is conducted while a gas or liquid is fed into the inside of the hollow fiber form extruded from the nozzle.

In the coagulating step subsequent to the spinning step, the hollow fiber form discharged from a nozzle is extruded into the air or an inert gas atmosphere such as nitrogen, and then fed to a coagulation bath for immersion in a coagulation liquid. Suitably, a coagulation liquid is substantially unable to dissolve an aromatic polyimide component while being compatible with a solvent in the aromatic polyimide solution. Suitable examples include, but not limited to, water; lower alcohols such as methanol, ethanol and propyl alcohol; ketones having a lower alkyl group such as acetone, diethyl ketone and methyl ethyl ketone; and their mixtures. When the solvent in the aromatic polyimide solution is an amide solvent, an aqueous solution of the amide solvent is also preferable.

In the next washing step, if necessary, the hollow fiber is washed with a washing solvent such as ethanol, and then the coagulation liquid and/or the washing solvent in the outside and the inside of the hollow fiber are replaced with a replacing solvent including an aliphatic hydrocarbon such as isopentane, n-hexane, isooctane and n-heptane.

In the subsequent drying step, the hollow fiber including the replacing solvent is dried at a proper temperature. Then, in the heating step, the fiber is heated preferably at a temperature lower than a softening point or second-order transition point of the aromatic polyimide used, to give an asymmetric gas separation hollow fiber membrane.

Industrial Usability

In accordance with the invention of this section, nitrogen-rich air containing a higher concentration of nitrogen can be obtained by feeding the air at a high temperature, for example, 150° C. or more to an air separation membrane module. A process according to the invention in this section can be used, for example, for an explosion-proof system in a fuel tank in an aircraft.

The inventions according to section A are as follows.

[1] A process for producing nitrogen-rich air using an air separation membrane module, comprising feeding the air at 150° C. or higher to the air separation membrane module.

[2] The process according to [1], wherein for the air separation membrane module, at the initiation of the use, an oxygen-gas permeation rate ($P'_{O2}$) at 175° C. is $20 \times 10^{-5}$ cm³(STP)/cm²·sec·cmHg or more and a ratio of an oxygen-gas permeation rate to a nitrogen-gas permeation rate ($P'_{O2}/P'_{N2}$) at 175° C. is 1.8 or more; and after the use at 175° C. for 140 hours, $P'_{O2}$ and $P'_{O2}/P'_{N2}$ are retained in levels of 90% or more of $P'_{O2}$ and $P'_{O2}/P'_{N2}$ before the initiation of the use, respectively.

[3] The process as described in [1] or [2], wherein an air separation membrane in the air separation membrane module comprises a material having no glass-transition temperatures at 225° C. or lower.

[4] The process according to any one of [1] to [3], wherein after being placed at 175° C. for 2 hours, the air separation membrane exhibits a shape-retention ratio of 95% or more.

[5] A method for explosion protection of an aircraft, comprising producing nitrogen-rich air by the production process according to any one of [1] to [4], and feeding the nitrogen-rich air to a fuel tank for an aircraft.

Section B: a Gas Separation Membrane Module Having Adequate Heat Resistance and Pressure Resistance at a High Temperature and a High Pressure without being Cracked Technical Field The invention of this section relates to a gas separation membrane module for mixed-gas separation in which a fiber bundle consisting of a number of hollow fiber membranes exhibiting selective permeability is fixed together to a tube sheet manufactured by curing a particular epoxy composition.

Background Art

A hollow-fiber type gas separation membrane module has a fiber bundle consisting of a number of hollow-fiber membranes exhibiting selective permeability, at least one end of which is fixed together to a plate (tube sheet) of a cured resin of cast molding, and the fiber bundle is housed in a casing comprising at least a mixed gas inlet, a permeate gas outlet and a non-permeate gas outlet. Besides functioning to fix the fiber bundle together, the tube sheet has another function to isolate the internal space of the hollow fiber membrane from its external space, and to retain gas tightness of the internal space and external space by sealing between the hollow fibers and between the hollow fibers and the casing. The hollow-fiber type gas separation membrane module would fail to perform suitable separation if gas-tightness by the tube sheet is lost.

In a gas separation method using a separation membrane, suitable gas separation can be sometimes achieved by feeding a mixed gas at a high temperature and a high pressure. In such cases, a material for a tube sheet is required to exhibit higher heat resistance and pressure resistance and its glass-transition temperature or heat deflection temperature must be higher by at least several dozens of degrees centigrade than an operation temperature of the gas separation membrane module.

A thermosetting resin is generally used as a tube sheet material for achieving higher heat resistance and pressure resistance, which is heated at a considerably high temperature during tube sheet formation for completing curing of the thermosetting resin. If a tube sheet prepared by incomplete curing is used, the curing reaction proceeds during operating a separation membrane module at a high temperature and the tube sheet is shrunk, which causes inadequate sealing between the tube sheet and the casing. The tube sheet material must be, therefore, heat-resistant to a considerably high temperature during the tube sheet formation.

As a gas separation membrane module which can be used for separation of a mixed gas at a high temperature and a high pressure, for example, Japanese laid-open patent publication No. 1987-74434 has described a hollow fiber element produced using a denatured epoxy resin prepared by reacting a phenol-novolac type epoxy resin with a liquid polybutadiene having a reactive terminal functional group.

Problems to be solved by the invention in section B

However, a conventional tube sheet material is subjected to much cure shrinkage during a tube sheet formation, which causes problems such as cracks and breakage of the tube sheet. Furthermore, when a priority is given to only pressure resistance and heat resistance, there may be problems such as crack forming and breakage of the tube sheet under impact during operation because a flexibility of the tube sheet material is poor. An objective of the invention of this section is to provide a tube sheet for a gas separation membrane module retaining adequate heat resistance and pressure resistance under a high temperature and a high pressure without being cracked.

The summary of the main invention disclosed in this section is as follows.

[1] A gas separation membrane module comprising a fiber bundle consisting of a number of hollow fiber membranes having gas separation performance;

a casing having a mixed gas inlet, a permeate gas outlet and a non-permeate gas outlet, in which the hollow fiber bundle is placed; and a tube sheet fixing at least one end of the hollow fiber bundle;

wherein the tube sheet is formed by an epoxy cured material prepared by curing a casting resin composition containing a denatured epoxy resin formed by reacting (a) a phenol novolac type epoxy compound and (b) a butadiene-acrylonitrile copolymer having a terminal functional group capable of reacting with an epoxy group, and (c) a hardener.

Advantages of the Invention in Section B

Since a tube sheet in a gas separation membrane module according to the invention of this section is produced using a butadiene-acrylonitrile copolymer having a terminal functional group capable of reacting with an epoxy group, it is more flexible than a conventional tube sheet. Furthermore, when it is exposed to a high-temperature and high-pressure gas during forming a tube sheet or operating a gas separation membrane module, the tube sheet is not cracked and its adhesiveness to a hollow fiber or sealing between the tube sheet and a casing is not deteriorated.

Embodiments in Section B

An epoxy cured material forming a tube sheet in a hollow fiber element according to the invention of this section can be produced by heat curing a casting resin composition containing at least a denatured epoxy resin formed by reacting (a) a phenol novolac type epoxy compound and (b) a butadiene-acrylonitrile copolymer having a terminal functional group capable of reacting with an epoxy group, and (c) a hardener.

This will be detailed below.

Denatured Epoxy Resin

A denatured epoxy resin can be obtained by reacting a phenol novolac type epoxy compound (hereinafter, sometimes referred to as epoxy compound (a)) with a butadiene-acrylonitrile copolymer having a terminal functional group capable of reacting with an epoxy group (hereinafter, sometimes referred to as compound (b)).

A phenol novolac type epoxy compound (a) used in the invention of this section is a compound represented by general formula (a):

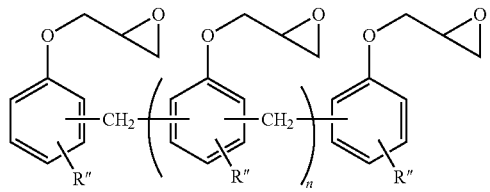

Formula (a)

wherein R" represents alkyl having 1 to 3 carbon atoms or hydrogen; and n represents an integer of 0 to 500, preferably 0 to 20.

In Formula (a), R" is preferably methyl or hydrogen. The epoxy compound (a) represented by general formula (a) preferably has a molecular weight of 300 to 2000 and an epoxy equivalent of 150 to 250. Examples of epoxy compound (a) include jER152 and jER154 from Mitsubishi Chemical Corporation; EPICLON-N740, N-770, N-775 and the like from DIC Corporation; YDPN-638 and YDCN-700 series from Tohto Kasei Co., Ltd.; and D.E.N.438 from The Dow Chemical.

In a butadiene-acrylonitrile copolymer having a terminal functional group capable of reacting with an epoxy group (compound (b)) used in the invention of this section, examples of the functional group capable of reacting with an epoxy group include carboxyl, amino and hydroxyl groups, partic Ilarly preferably carboxyl group. A resulting tube sheet can be made flexible by comprising the compound (b).

The butadiene-acrylonitrile copolymer having a terminal functional group capable of reacting with an epoxy group is preferably a carboxyl-terminated butadiene acrylonitrile copolymer (CTBN) represented by general formula (b).

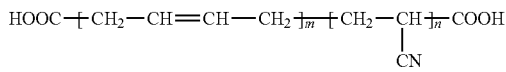

Formula (b)

In Formula (b), m represents the total number of repetition of the butadienemonomer unit and n represents the total number of repetition of the acrylonitrile monomer unit, and when 2 or more of the structures represented in [ ] are present, m and n represent the sum of a repetition number of each unit, respectively, and they can be present as a block or at random.

CTBN represented by general formula (b) preferably has a molecular weight of 2000 to 4000; for example, CTBN preferably contains 5 to 50% by weight of an acrylonitrile monomer unit. Examples of commercially available CTBN include Hypro™CTBN1300×8, CTBN1300×13 and CTBN1300×31 from Emerald Performance Materials.

A denatured epoxy resin is produced by mixing preferably 5 to 50 parts by weight, more preferably 5 to 20 parts by weight of compound (b) with 100 parts by weight of epoxy compound (a) and reacting them. The use of a denatured epoxy resin in which the contents of these compounds are within the above ranges can avoid crack formation in a resulting tube sheet at a high temperature and a high pressure and there is no problem of deformation due to too lowering of a glass-transition temperature. Other compounds can be added as long as they do not adversely affect the objectives of the invention in this section. Although there are no particular restrictions to the reaction conditions in preparing the denatured epoxy resin, a reaction temperature is preferably 100 to 200° C. and a reaction time is preferably 2 to 5 hours.

Hardener

There are no particular restrictions to a hardener used in the invention of this section as long as it is a thermosetting agent for an epoxy resin, including amines, phenols and acid anhydrides, more preferably acid anhydrides. Examples of an acid anhydride include phthalic anhydride, pyromellitic dianhydride, methyl-5-norbornene-2,3-dicarboxylic anhydride (methylnadic anhydride) and benzophenone tetracarboxylic dianhydride, particularly preferably methyl-5-norbornene-2,3-dicarboxylic anhydride.

Hardening Accelerator

A casting resin composition used in the invention of this section can, if necessary, contain a hardening accelerator, which can include an imidazole compound. Examples of an imidazole compound include 2-methylimidazole, 2-ethylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole and 1-cyanoethyl-2-ethyl-4-methylimidazole, particularly preferably 2-ethyl-4-methylimidazole.

Epoxy Cured Material

An epoxy cured material forming the tube sheet in the invention of this section can be produced by heat-curing a casting resin composition containing the above denatured epoxy resin, a hardener and, if necessary, a hardening accelerator (hereinafter, sometimes referred to as a casting resin composition). A mixing ratio of the denatured epoxy resin to the hardener and so on in preparation of the casting resin composition depends on the number of epoxy functional groups in the denatured epoxy resin and the number of functional groups in the hardener and can be appropriately adjusted depending on, for example, a viscosity of the desired casting resin composition. To 100 parts by weight of the denatured epoxy resin, preferably 0 to 5 parts by weight, more preferably 0.1 to 3 parts by weight of the hardening accelerator is used.

In a heating step, for example, the casting resin composition is subjected to the first curing by heating it until the casting resin composition does not flow, and then the resin after the first curing is preferably post-cured at a further high temperature. In post-curing, for avoiding change in physical properties of the tube sheet material during operating the module, the casting resin composition is preferably heated at a temperature equal to or higher than a temperature in the final operation, for example, preferably 100° C. to 250° C., more preferably 120° C. or more, for 2 to 10 hours. The first curing is, for example, but not limited to, preferably less than 100° C., more preferably 50 to 85° C. for 2 to 24 hours. It is preferable that the resin after the first curing is heated to a post-curing temperature at a temperature-increase rate of 5° C./min or less because thermal runaway due to reaction heat rapidly generated in the casting resin composition can be avoided. A process for forming a tube sheet will be described later.

Gas Separation Membrane Module

There will be described a structure of a gas separation membrane module according to the invention of this section.

Figure 3:
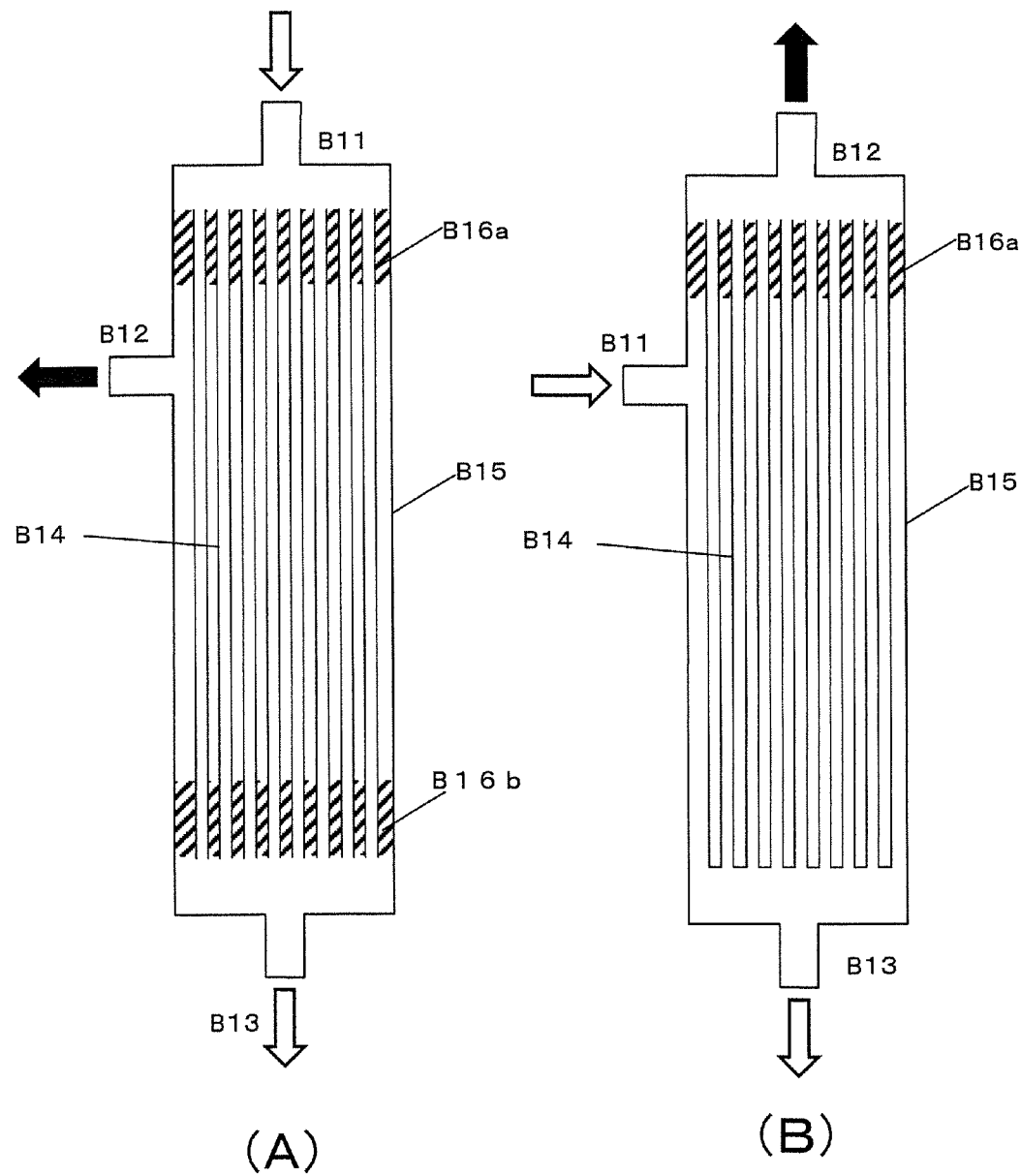
FIG. 3 schematically shows an example of a gas separation membrane module.

It is known that a gas separation membrane module made up of hollow fiber membranes is a bore feed type or a shell feed type. For example, in a bore feed type gas separation membrane module, a number of hollow fiber membranes B14 (for example, several hundred to several hundred-thousand) are put together as a hollow fiber bundle, which is housed in a casing B15 having at least a mixed gas inlet B11, a permeate gas outlet B12 and a non-permeate gas outlet B13, and is fixed to the casing B15 with tube sheets B16a and B16b formation in such a manner that the hollow fiber membranes B14 are open at the both ends of the hollow fiber bundle, so that a space where a gas is fed from a mixed gas inlet B11, passes through the inside of the hollow fiber membrane B14 and is led to a non-permeate gas outlet B13 (non-permeate side) and a space outside of the hollow fiber membrane B14 leading to a permeate gas outlet B12 (permeate side) are isolated each other as shown in FIG. 3(A). The casing B15 can be made of, for example, a material including metals such as stainless steel, plastics, fiber-reinforced plastics and ceramics. In a shell feed type gas separation membrane module, for example, as shown in FIG. 3(B), a tube sheet is formed at one end of a hollow fiber bundle in such a manner that a non-permeate side space where a mixed gas is fed from a mixed gas inlet B11 and is led to a non-permeate gas outlet B13 is outside of the hollow fiber membranes B14 while a permeate side space leading to the permeate gas outlet B12 is inside of the hollow fiber membranes B14.

In FIGS. 3(A) and (B), while a mixed gas fed from the mixed gas inlet B11 in the gas separation membrane module flows in contact with the hollow fiber membrane B14 in the gas separation membrane module, a high permeate gas preferentially permeates the hollow fiber membrane B14 to separate the mixed gas into a gas rich in a high permeate gas (permeate gas) and a remaining non-permeate gas poor in a high permeate gas (non-permeate gas). The permeate gas is discharged from the permeate gas outlet B12 while the non-permeate gas is discharged from the non-permeate gas outlet B13. Either or both of the non-permeate gas and the permeate gas discharged from the gas separation membrane module are recovered, depending on an application.

As a hollow fiber used in a gas separation membrane, the use of a number of hollow fibers with a thin thickness and a small diameter is preferable because a high membrane area and a higher separation efficiency can be conducted even in a small device, which is economically advantageous. For example, the hollow fiber can have, but not limited to, a film thickness of 10 to 500 μm and an outer diameter of 50 to 2000 μm. Furthermore, a gas separation membrane can be homogeneous or heterogeneous like a composite membrane or an asymmetric membrane, and can be microporous or nonporous.

Examples of a gas separation membrane can include those made of a polymer materials such as polyimides, polyetherimides, polyamides, polyamideimides, polysulfones, polycarobnates, silicone resins, cellulose polymers and ceramic materials such as zeolite. For example, a gas separation membrane made of a polyimide is preferably an aromatic polyimide hollow fiber separation membrane, more preferably an aromatic polyimide asymmetric hollow fiber separation membrane.

A fiber arrangement of a hollow fiber bundle may include parallel arrangement, cross arrangement, fabric arrangement and spiral arrangement. A hollow fiber bundle can have a core tube substantially in the center or the periphery of a hollow fiber bundle can be wrapped with a film. Furthermore, the shape of the hollow fiber bundle can be cylindrical, tabular or prismatic, and it can be put in the casing in an unchanged shape as described above, or in a folded U-shape or a spirally coiled shape.

There will be described a process for producing a gas separation membrane module according to the invention of this section.

First, there will be described a method for putting hollow fiber membranes together as a hollow fiber bundle.

The following is an example of a method for putting together hollow fiber membranes in such a manner that they alternately cross each other at an angle of 5 to 30° to an axial direction. One to 100 hollow fiber membranes are arranged on a tube to be a core (core tube) by a fiber-arranging guide which shuttles at a certain rate in an axial direction of the core tube, while the core tube simultaneously rotates at a certain rate. Thus, the hollow fiber membranes are arranged not in parallel with the axis, but at an angle corresponding to rotation of the core tube to the axial direction. Once fiber arrangement reaches one end, the hollow fiber membranes are fixed there and then the fiber-arranging guide moves back in the reverse direction. Since the core tube continues to rotate in the same direction, then the fibers are arranged at an angle to the axial direction which is just opposite to the above angle. This process is repeated so that hollow fiber membranes are alternately arranged on hollow fiber membranes arranged in an opposite angle to give a hollow fiber bundle.

There will be described a method for forming a tube sheet in the invention of this section. A method for forming a tube sheet can be centrifugal molding or stationary molding, and stationary molding is preferable because a convenient apparatus can be used and an productivity can be increased. There will be described an example of stationary molding.

Figure 4:
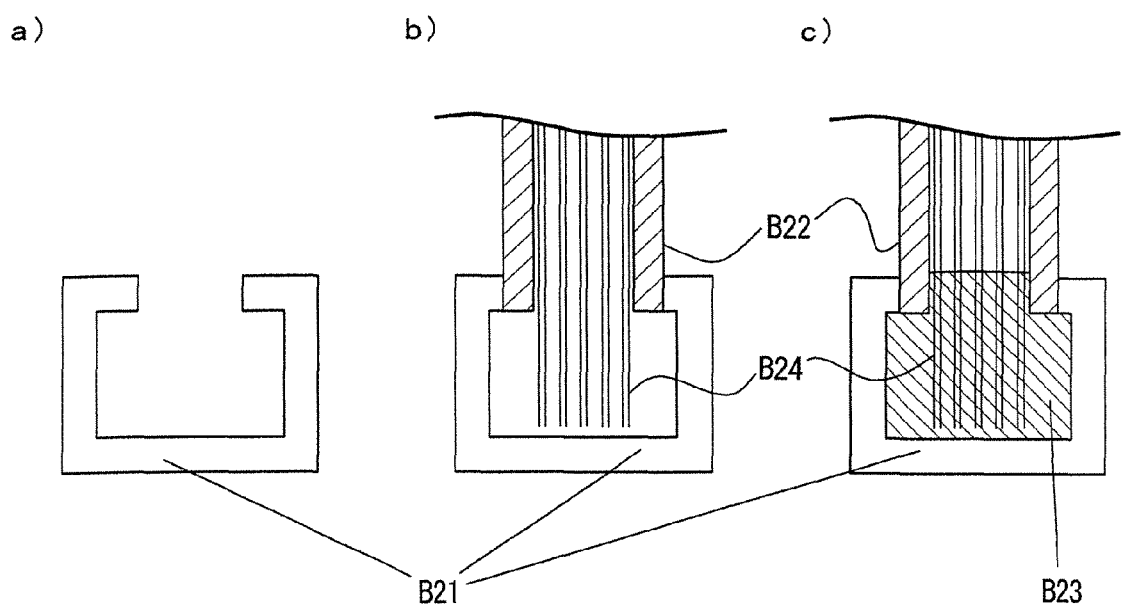
FIG. 4 schematically shows a process for manufacturing a tube sheet of a membrane module for separating a mixture of gasses.

For example, a hollow fiber bundle, which a given number of hollow fiber membranes B24 with a given length is put together by the above method, is put in a casing B22 without a core tube or with a core tube remained substantially in the center. Then, it is placed in a given position in a mold B21 whose end a tube sheet is to be formed, and subsequently, the hollow fiber bundle and the cylindrical casing B22 are substantially vertically held in such a way that the end is down. FIG. 4b schematically shows this state.

A given amount of a casting resin composition for forming a tube sheet B23 is cast into the mold B21. FIG. 4c schematically shows the state where the casting resin composition has been injected. Although there are no particular restrictions to a method for casting a casting resin composition, casting from the lower part of the mold using a syringe is preferable because it is easy to uniformly cast the casting resin composition in the mold B21 and between the hollow fiber membranes B24. If the casting resin composition is cast too fast, the casting resin composition cannot be uniformly cast to the parts to be filled, and therefore, it is preferably cast over a sufficient period. It is suitable to appropriately control a temperature of the mold B21 during casting the casting resin composition into the mold B21. Likewise, it is suitable to control a temperature of the casting resin composition.

The casting resin composition before curing is preferably in a liquid state at a temperature during resin cast in the light of moldability.

There are no particular restrictions to a viscosity of the casting resin composition, but it is preferable that a viscosity at a temperature of 70 to 90° C. common in resin cast is preferably less than 120 poise, particularly preferably less than 20 poise. Here, a viscosity of the resin composition can be suitably measured using a rotating viscometer.

If a viscosity of the casting resin composition at a temperature of 70 to 90° C. is 120 poise or more, there is a problem that a resin cast in molding a tube sheet takes a long time and foams generated during resin cast cannot be easily removed, and also, a space between the hollow fiber membranes are inadequately filled with the resin, which causes voids.

After cast of the casting resin composition into the mold B21, the mold B21 and the hollow fiber bundle are kept at a certain temperature to conduct the first curing of the casting resin composition to form a tube sheet B23. In this process, a temperature is suitably less than 100° C., preferably 50 to 85° C. An excessively high temperature in this stage is not preferable because curing of the casting resin composition becomes so severe that strength of a tube sheet finally obtained is adversely affected.

After curing of the casting resin composition, it is preferable to conduct post-curing of the casting resin composition by heating in the light of improving durability and mechanical properties. A temperature during the post-curing is preferably 100° C. to 250° C. A temperature of lower than 100° C. during post-curing is not preferable because the casting resin composition is inadequately cured. Furthermore, an excessively high temperature during post-curing is not preferable because curing of the casting resin composition becomes so severe that a problem about a strength of a tube sheet occurs. In post-curing of the casting resin composition, the composition can be heated at different temperatures in multiple steps.

After post-curing of the casting resin composition, the tube sheet is cut to open the ends of the hollow fiber membranes, giving a hollow fiber element in which the ends of the hollow fibers are kept open and fixed to the tube sheet.

Here, in case of forming a tube sheet at both ends of the hollow fiber bundle, after a tube sheet is formed at one end of the hollow fiber bundle as described above, then a tube sheet is formed at the other end by a similar procedure. "After a tube sheet is formed at one end" may be "after the hollow fiber membranes are made open by cutting the tube sheet". Alternatively, it is also suitable that one end is placed within the mold, the casting resin composition is cast and subjected to the first curing and then a tube sheet is formed at the other end before post-curing, and both ends can be processed by the procedure after the post-curing at the same time.

For a method for separating a mixed gas using a separation membrane module according to the invention of this section, there are no particular restrictions to a mixed gas to be separated as long as it is a mixed gas of two or more components. A gas separation membrane module according to the invention of this section can be suitably used for, for example, separation of nitrogen-rich air and oxygen-rich air from the air, separation of hydrogen gas from a hydrogen-containing mixed gas and separation of water vapor from a mixed vapor of water vapor and an organic vapor (dehydration of an organic vapor).

The inventions according to section B are as follows.

[1] A gas separation membrane module comprising
a fiber bundle consisting of a number of hollow fiber membranes having gas separation performance;
a casing having a mixed gas inlet, a permeate gas outlet and a non-permeate gas outlet, within which the hollow fiber bundle is placed; and
a tube sheet fixing at least one end of the hollow fiber bundle;
wherein the tube sheet is formed by an epoxy cured material prepared by curing a casting resin composition containing
a denatured epoxy resin formed by reacting (a) a phenol novolac type epoxy compound and (b) a butadiene-acrylonitrile copolymer having a terminal functional group capable of reacting with an epoxy group, and
(c) a hardener.

[2] The gas separation membrane module according to [1], wherein the casting resin composition further contains a curing accelerator.

[3] The gas separation membrane module according to [1] or [2], wherein the functional group capable of reacting with an epoxy group is a carboxyl group.

[4] The gas separation membrane module according to any one of [1] to [3], wherein the hardener is an acid anhydride.

[5] The gas separation membrane module according to any one of [2] to [4], wherein the curing accelerator is an imidazole compound.

Section C: a Separation Membrane Module and so on Satisfactorily Operable Even at High Temperature Technical Field The invention disclosed in this section relates to a gas separation membrane module having a hollow fiber element wherein a hollow fiber bundle including a number of hollow fiber membranes with selective permeability is fixed by tube sheet prepared by curing a particular epoxy resin composition. In particular, the invention relates to a separation membrane module satisfactorily operable at high temperature by reducing influence of thermal expansion of a tube sheet.

Background Art

The hollow fiber type gas separation membrane module generally has a hollow fiber element including a fiber bundle comprising a number of hollow fiber membranes with selective permeability, and a hollow vessel housing the element. Both ends or one end of the hollow fiber bundle in the hollow fiber element are fixed to the end of the vessel by the resin-cured plate (tube sheet). The vessel has, at least, a feed gas inlet, a permeate gas outlet and a non-permeate gas outlet.

In a gas separation membrane, generally, the higher temperature and pressure of feed gas are, the larger gas permeation rate is. Therefore when a gas separation module is used, it is sometimes considered to compress the feed gas before being fed to the module for example by a compressor. The compressed gas may be fed at very high temperature of 149° C. to 260° C.

When the separation membrane module is used under high-temperature conditions as described above, thermal expansion of a tube sheet may cause, for example, stress concentration within the tube sheet, or cracks in the tube sheet due to the stress concentration which may cause loss of airtightness in the separation membrane module. Especially, high-temperature gas compressed by a compressor or the like is generally cooled before being fed to the gas separation membrane module. There is room for improvement in conventional separation membrane modules in terms of the use at high temperature (e.g. designing components more effectively by taking the special condition of high temperature into consideration). Furthermore, whether separation membrane module is for a high temperature or not, it is required to simplify a structure of the separation membrane module and to develop structures which can contribute to downsizing.

In the light of the above problems, an objective of the invention in this section is to provide a separation membrane module which can satisfactorily operate at high temperature, with the influence of thermal expansion of the tube sheet being minimized Another objective is to provide a structure advantageous to downsizing and weight saving by simplifying the structure of a separation membrane module.

The summary of the main invention disclosed in this section is as follows.

[1] A separation membrane module using on high-temperature conditions, comprising;

a hollow fiber bundle including a number of hollow fiber membrane with selective permeability, a cylindrical vessel housing the hollow fiber bundle, a tube sheet placed at the end of the hollow fiber bundle, which fixes the end of the bundle to the end of the cylindrical vessel and separates the inside of the cylindrical vessel from the outside, and an annular sealing member for sealing between the outer surface of the tube sheet and the inner surface of the cylindrical vessel;

wherein the tube sheet does not have any step in a portion around the place to which a sealing member is attached.

According to such a configuration, since there is no steps in the tube sheet on the periphery of the place on which the annular sealing member (detailed below) is mounted, influence of stress concentration in use under high temperature can be reduced in comparison with conventional structures in which the tube sheet has step(s) for O-ring.

The term, "annular sealing member" as used in this section means an annular sealing member which seals between the outer surface of a tube sheet and the inner surface of a cylindrical vessel, and there are no particular restrictions to its cross-sectional shape. The annular sealing member can be, for example, an O-ring (substantially circular cross section), or can be V- or U-packing having a substantially V- or U-shaped cross section, respectively. Furthermore, its cross section can be elliptic, rectangular, polygonal or X-shaped.

The term, "under the high-temperature conditions" means a temperature in the range of 80° C. to 300° C.

The term, "cylindrical vessel" includes not only those with both ends being open but also those with one end being open.

A gas separation membrane module can be used for applications such as separation of oxygen, nitrogen, hydrogen, water vapor, carbon oxide or an organic vapor.

First Embodiment in Section C

Figure 5:
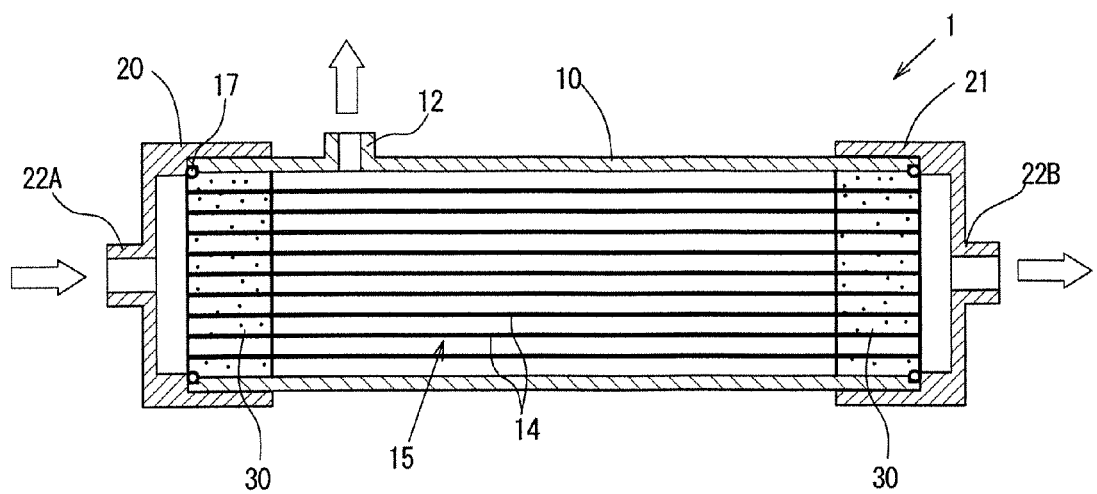
FIG. 5 is a cross-sectional view schematically showing a basic configuration of a separation membrane module of the first embodiment in section C.

FIG. 5 schematically shows a basic configuration of a gas separation membrane module. In the following description, there will be described several embodiments, which are not independent of each other and the contents of these embodiments can be combined as appropriate.

A gas separation membrane module 1, as shown in FIG. 5, has a hollow fiber bundle 15 of hollow fiber membranes 14 with selective permeability and a substantially cylindrical vessel 10 housing the hollow fiber bundle 15. The cylindrical vessel 10 is made of for example metal and has openings at both ends. The cylindrical vessel 10 can have a circular, elliptic or polygonal cross section. The case having a circular cross section (that is, the vessel 10 is cylindrical) will be described below.

The hollow fiber membrane 14 can be used conventional well-known membrane and can be made of any materials as long as it has gas separation ability. For example, it is suitably made of polymer material, which is glassy at normal temperature (23° C.) such as, in particular, polyimide, polysulfone, polyetherimide, polyphenylene oxide and polycarbonate for their gas separation ability.

The hollow fiber bundle 15 can be of about 100 to 1,000,000 hollow fiber membranes. There are no particular restrictions to the shape of the collected hollow fiber bundle, however a cylindrical hollow fiber bundle is preferable in the light of easiness in production and pressure resistance of a vessel. FIG. 5 shows an embodiment in which hollow fiber membranes are disposed substantially in parallel, however, these hollow fiber membranes can be cross-arranged.

Again referring to FIG. 5, tube sheets 30 are placed at the end of the hollow fiber bundle 15 in each end of the vessel 10, and an annular sealing member 17 is disposed on the periphery of each tube sheet. The annular sealing member 17 can be, for example, an O-ring (substantially circular cross section), or can be V- or U-packing having a substantially V- or U-shaped cross section, respectively. A case of an O-ring will be described below.

The tube sheet 30 is made of a cured material of epoxy resin composition (detailed below) in this example, and it is formed substantially as a disc-shape to be fitted into the end of the vessel 10. The hollow fiber membranes 14 penetrate this tube sheet 30 in its thickness direction, with the end of each hollow fiber membrane 14 opened to the outer surface of the tube sheet 30. The tube sheet has a function of fixing many hollow fiber membranes together. The tube sheet also has a function of maintaining airtightness by separating the internal space of the membranes from the external spaces, and sealing between the hollow fiber membranes as well as between the hollow fiber membranes and the inner surface of the vessel in cooperation with the annular sealing member.

There are no particular restrictions to a cured resin for the tube sheet 30 as long as it is resistant to a high temperature and can maintain airtightness of the inside of the hollow fiber module. The resin is preferably also resistant to water vapor when being used for dehydrating an organic vapor or moisturizing. In general, a thermosetting resin such as polyurethane or an epoxy resin is suitably used. In the light of resistance to a high temperature and strength, an epoxy resin is particularly suitably used. For a nitrogen membrane module, the epoxy resin for example described in Japanese published examined application No. 1990-36287 can be used, whereas for an organic-vapor separation module the epoxy resin for example described in WO 2009/044711 can be used. The epoxy resin as disclosed in section B can also be used for the tube sheet in the module of this section.

Caps 20 and 21 are attached to the ends of the cylindrical vessel 10 in the separation membrane module 1 as shown in FIG. 5. A mixed gas inlet 22A is formed in the cap 20, while a non-permeate gas outlet 22B is formed in the cap 21. An outlet 12 for a permeate gas is formed in a part of the peripheral wall of the vessel 10. It is noted that the invention in this section is mainly characterized in surrounding structures of the tube sheet 30 as described later, however there are no particular restrictions to the type of a separation membrane module as long as it can form such a structure.

A structure in the vicinity of the tube sheet will be described with reference to FIG. 6. FIG. 6(a) shows an exemplary structure of a module end according to the invention of this section, while FIG. 6(b) shows another structure.

An O-ring 18 is mounted between the inner surface of the cylindrical vessel 10 and the outer surface of the tube sheet 530 to ensure airtightness between these members in the gas separation membrane module shown in FIG. 6(b). Specifically, there is formed a step 530s to which the O-ring 18 is fitted in a part of the outer circumference of the tube sheet 530. When the gas separation membrane module 101 is used under high temperature, stress concentration can occurs in the vicinity of the step 530s in the tube sheet 530, depending on the conditions, which may cause troubles such as breakage of the tube sheet accompanying loss of airtightness.

Figure 6:
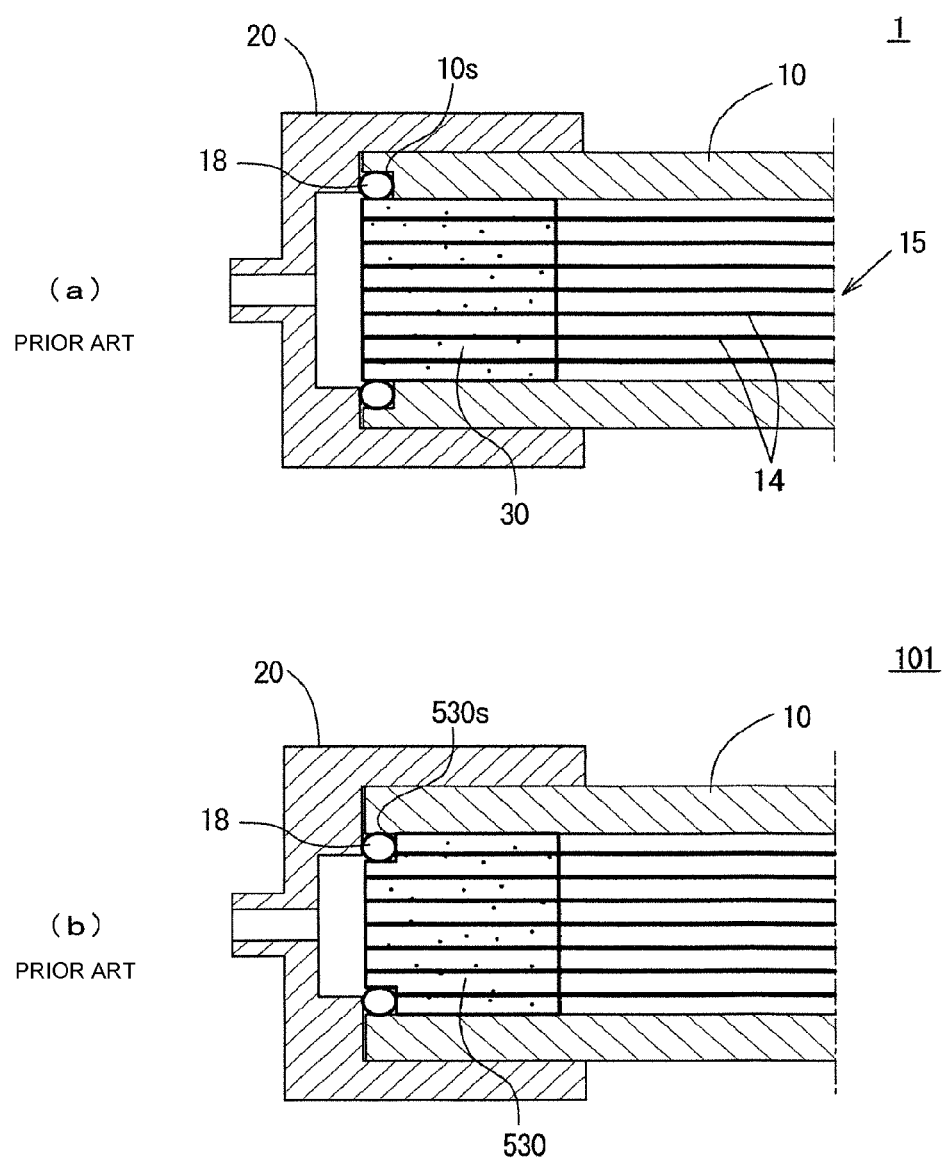
FIG. 6($a$) shows an exemplary structure of a module end and FIG. 6($b$) shows a conventional structure.

To deal with this problem, according to the structure of this embodiment, the tube sheet 30 without a step in the outer surface is used as shown in FIG. 6(*a*). In this example, a diameter of the tube sheet 30 is constant over its full length (for another aspect, described later with reference to FIG. 7). A step 10*s* is formed at the end of the cylindrical vessel 10, so that a groove for the O-ring 18 can be formed within the step. A cross-sectional shape of the groove is, for example, a rectangle. The O-ring 18 is to be fitted into the groove, to ensure airtightness between the outer surface of the tube sheet and the inner surface of the cylindrical vessel.

The O-ring 18 is also firmly contacted to the inner surface of the cap 20, so that airtightness can be also ensured between the vessel end and the cap inner surface. According to such a configuration, the one O-ring 18 contributes to sealing both (i) between the tube sheet and the cylindrical vessel and (ii) between the cap and the cylindrical vessel, thus the necessity of additional O-ring(s) can be eliminated.

There are no particular restrictions to means for fixing the cap 20 to the cylindrical vessel 10, however, various well-known means, for example such as fixing by an adhesive or by fixture can be employed.

According to the gas separation membrane module 1 in this embodiment configured as described above, no step is formed on the tube sheet 30 in the periphery where the O-ring 18 is to be mounted. Therefore, it is less influenced by stress concentration in use under high temperature than conventional structure as shown in FIG. 6(*b*). As a result, resistance to high temperature and reliability of the gas separation membrane module 1 as a whole can be improved.

Figure 7:
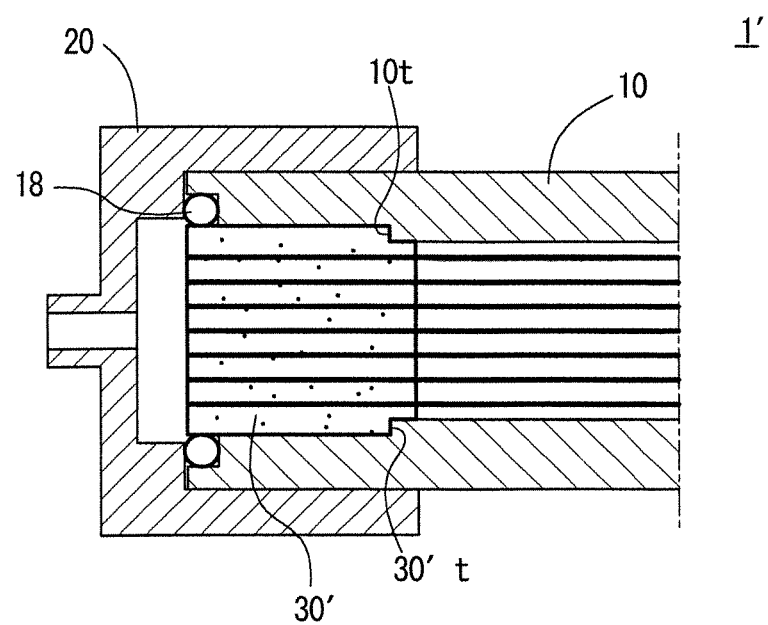
FIG. 7 is a view of another structure near the tube sheet.

Such advantages can be achieved likewise, in addition to the structure shown in FIG. 6(*a*), in the structure shown in FIG. 7. That is, means for preventing transfer of the tube sheet 30 along the axial direction is not described in the configuration of FIG. 6(*a*) to simplify the explanation, however, the configuration of FIG. 7 contains such means.

A step 10*t* is formed at a predetermined distance inside from the end of the vessel 10 as shown in FIG. 7 in this gas separation membrane module 1'. In response to this, there is also formed a step 30' t at the end of the tube sheet 30'. The other structural elements are as described in FIG. 6(*a*). According to such a configuration, the end of the tube sheet 30' (right side in this figure) abuts on the step 10*t*, to thereby prevent the tube sheet from moving inward along the axial direction.

Although the gas separation membrane module in FIG. 5 has been described with reference to an example, the invention in this section is, of course, applicable to another configuration. For example, the invention can be suitably applied to a shell feed type module and a purge type module where the cylindrical vessel has a purge gas inlet.

Second Embodiment in Section C

Figure 8:
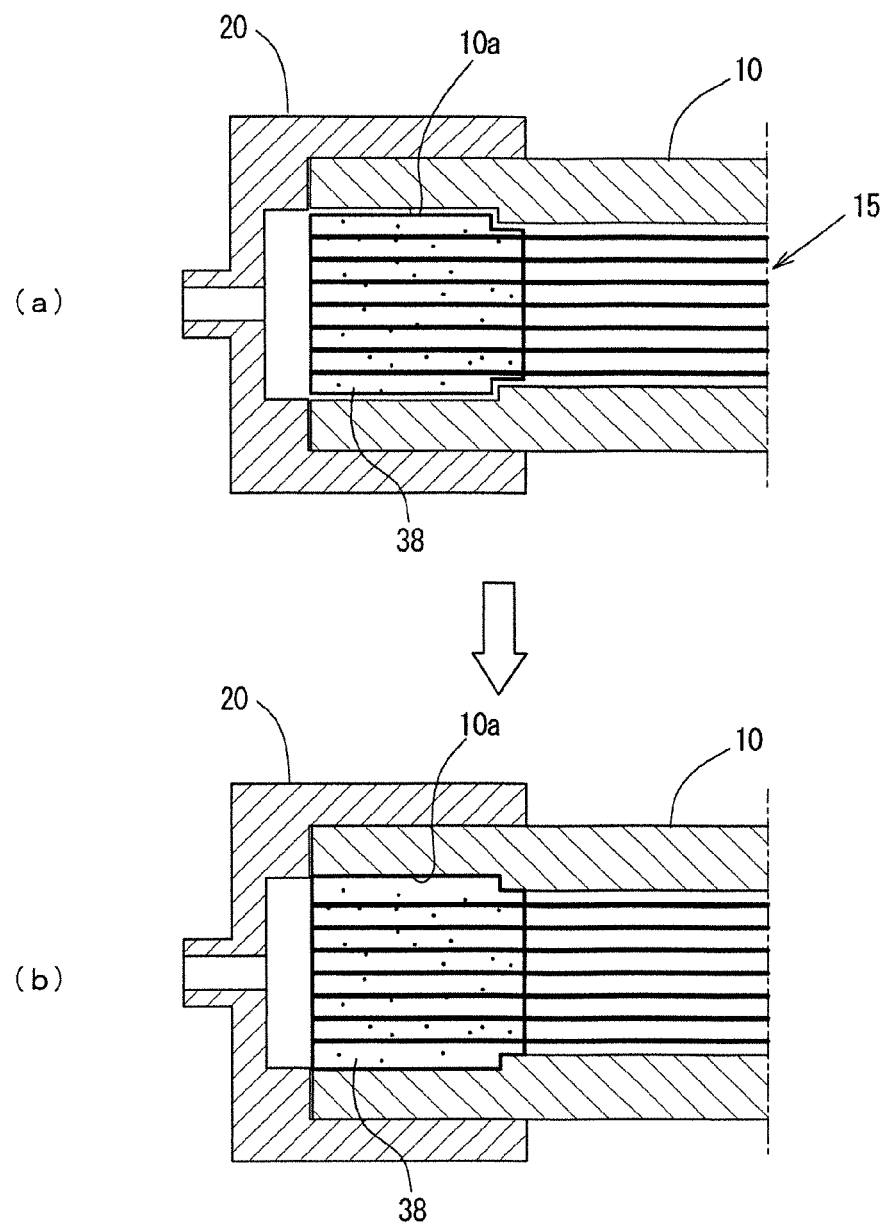
FIG. 8 shows an exemplary structure of a module end according to the second embodiment in section C.

FIG. 8 shows an exemplary structure of the module end in the second embodiment; FIGS. 8(*a*) and 8(*b*) show the state at normal temperature and the state in operation, that is, at high temperature, respectively.

The gas separation membrane module in FIG. 8 has, like the above embodiment, a hollow fiber bundle 15 as a collection of a number of hollow fiber membranes with selective permeability and a cylindrical vessel 10 housing the hollow fiber bundle. Furthermore, it has tube sheets 38 at the ends of the hollow fiber bundle 15 and caps 20 at the ends of the cylindrical vessel 10. For structural members similar to those in the above embodiment, the same symbols as used in the figures as described above are used without being redundantly described.

As shown in FIG. 8(*a*), this gas separation membrane module is designed such that the diameter of the tube sheet 38 is slightly smaller at normal temperature than the inner diameter of the inner surface 10*a* of the cylindrical vessel 10, thus there is a gap between the outer surface of the tube sheet 38 and the inner surface 10*a* of the cylindrical vessel. The tube sheet 38 is made of, like the above embodiment, a resin material such as an epoxy resin, which has a larger thermal expansion coefficient than a material for the cylindrical vessel 10 (for example a metal).

This gas separation membrane module is intended to be used, for example, at a temperature in the range of 80° C. to 300° C. As shown in FIG. 8(*b*), when using this module, the tube sheet 38 is warmed to a predetermined temperature, as a result, the diameter of the tube sheet will be expanded due to thermal expansion, so that its outer surface can be firmly contacted to the inner surface 10*a* of the cylindrical vessel. Such a contact ensures airtightness between these members.

When using the gas separation membrane module, the module is adequately warmed to ensure airtightness between the tube sheet 38 and the cylindrical vessel 10 and then a mixed gas is fed.

According to the above configuration, the tube sheet 38 thermally expands to exert the effect of sealing between the tube sheet and the cylindrical vessel. Thus, it can eliminate the necessity for placing other O-ring(s) for sealing between these members or adhering the outer surface of the tube sheet to the inner surface of the cylindrical vessel. Furthermore, when the tube sheet 38 thermally expands, the stress to the cylindrical vessel 10 can be reduced, so troubles such as breakage of the cylindrical vessel 10 can be advantageously prevented.

Although the above description assumes that the tube sheet and the cylindrical vessel are made of epoxy resin and metal, respectively, the material for the cylindrical vessel is not limited to metal as long as the material has a thermal expansion coefficient smaller than the tube sheet. Although being not shown in FIG. 8, sealing means for sealing between the cap 20 and the cylindrical vessel 10 can be used. For example, annular sealing member(s) to be disposed between the inner surface of the cap 20 and the outer surface of the cylindrical vessel 10 or between the inner surface of the cap 20 and the end face of the cylindrical vessel 10 can be used.

Third Embodiment in Section C

Figure 9:
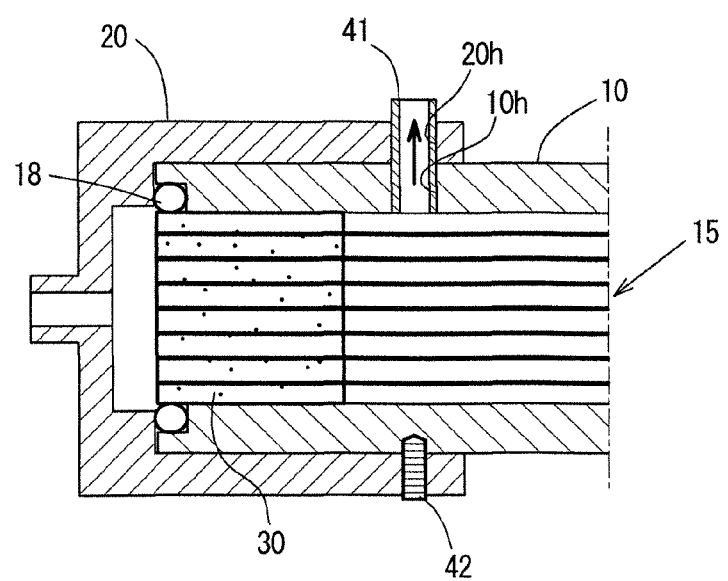
FIG. 9 shows an exemplary structure of a module end according to the third embodiment in section C.

FIG. 9 shows an exemplary module end structure of a module according to third embodiment. It is noted that although the module in the first and the second embodiments are intended to be used at high temperature, there are no particular restrictions to an operating temperature for the gas separation membrane module in FIG. 9.

The gas separation membrane module in FIG. 9 has, like the above two embodiments, a hollow fiber bundle 15 as a collection of a number of hollow fiber membranes with selective permeability, a cylindrical vessel 10 housing the hollow fiber bundle, tube sheet 30 at the end of the hollow fiber bundle 15 and a cap 20 at the end of the cylindrical vessel 10. Furthermore, it has an O-ring 18 for sealing between the tube sheet and the cylindrical vessel. For structural members similar to those in the above embodiments, the same symbols as used in the figures as described above are used without being redundantly described.

In the configuration in FIG. 9, an opening 10*h* is formed in a part of the peripheral wall of the cylindrical vessel 10, for discharging permeate gas passing through the hollow fiber membrane to the outside of the cylindrical vessel. Likewise, in a part of the peripheral wall of the cap 20, an opening 20h is formed at the corresponding place. A hollow discharge pipe 41 is mounted such that it passes through both openings 10h and 20h. In the gas separation membrane module in FIG. 9, the permeate gas outlet 12 as in FIG. 5 is not formed, since the discharge pipe 41 can serve as the permeate gas outlet 12.

This discharge pipe 41 also can act as means for fixing the cap 20 to the cylindrical vessel 10. That is, the discharge pipe 41 passes through both openings 10h and 20h, so that transfers in both the axial and the rotational directions between the cap 20 and the cylindrical vessel 10 are restricted.

To connect these members 10 and 20 more firmly, additional fixing screw(s) 42 can be used as shown FIG. 9. The fixing screw 42 is screwed into a threaded hole formed in the peripheral wall of the cap 20, and its tip in inserted into a part of the peripheral wall of the cylindrical vessel 10. A female screw part, into which the screw 42 is to be engaged, can be formed in the cap 20 or the cylindrical vessel. A fixing pin can be used instead of the fixing screw.

It is noted that there can be an annular sealing member (not shown) for sealing between the inner surface of the peripheral wall of the cap 20 and the outer surface of the cylindrical vessel 10. It can ensure more reliable airtightness between the cap 20 and the cylindrical vessel 10. However, such member can be omitted, if the O-ring 18 can satisfactorily seal both between the tube sheet and the cylindrical vessel and between the cap and the cylindrical vessel.

In the configuration described above, the member 41 for forming the channel for discharging permeate gas also acts as means for fixing the cap 20 and the cylindrical vessel 10. Thus, the module structure can be simplified, resulting in weight and size-reduction of the module.

The example shown in FIG. 9 has been described with reference to the discharge pipe 41 for discharging permeate gas passing through the hollow fiber membrane to the outside of the cylindrical vessel. However, another tubular member forming a channel communicating the inside with the outside of the cylindrical vessel can be used, instead of the discharge pipe 41.

Alternatively, the cap 20 can be fixed to the cylindrical vessel 10 only by fixing member such as the fixing screw 42 or fixing pin, without using the discharge pipe 41 passing through the openings 10h and 20h in the vessel and the cap. Such a configuration is advantageous for size reduction of a module, compared with the configuration of FIG. 10(b) where flanges are fixed to each other as described later, since the flanges can be omitted in the present configuration.

One or two or more fixing members can be used, and when two or more members are used, the fixing members are preferably evenly disposed in a circumferential direction.

Other Embodiments in Section C

The invention in this section can be, besides the embodiments described above, as shown in FIGS. 10(a) and (b). Each gas separation membrane module has, like the above embodiments, a hollow fiber bundle 15 as a collection of a number of hollow fiber membranes, a cylindrical vessel 10 housing the bundle, a tube sheet 30 at the end of the hollow fiber bundle 15 and caps (26, 27) at the end of the cylindrical vessel. Furthermore, it has the O-ring 18 for sealing between the outer surface of the tube sheet and the inner surface of the cylindrical vessel.

In the configuration in FIG. 10(a), the cap 26 is to be fixed to the cylindrical vessel 10 by a screw system. Specifically, in the configuration, a female screw formed in a part of the inner surface of the cap 26 is to engage with a male screw formed in a part of the outer surface of the cylindrical vessel 10. In the state where the cap 26 is rotated to a predetermined position (see FIG. 10(a)), the O-ring 18 partially abuts on the inner surface of the cap 26, ensuring airtightness between the cylindrical vessel end and the cap inner surface. Like the above embodiments, the O-ring 18 also ensures airtightness between the outer surface of the tube sheet and the inner surface of the cylindrical vessel.

In the configuration of FIG. 10(b), a flange 27f is formed in the cap 27, while a corresponding flange 10f is formed in the cylindrical vessel 10. By connecting the flanges 27f and 10f with fixtures 43, the cap 27 can be fixed to the cylindrical vessel 10. The fixture 43 can be, for example, a bolt-nut system. Alternatively, threaded hole formed in the flange 10f and bolt can be used. There are no particular restrictions to positions where flanges are tightened up by the fixtures 43, but the tightening positions are preferably located at regular intervals in a circumferential direction of the flange.

Further Embodiment in Section C

Figure 11:
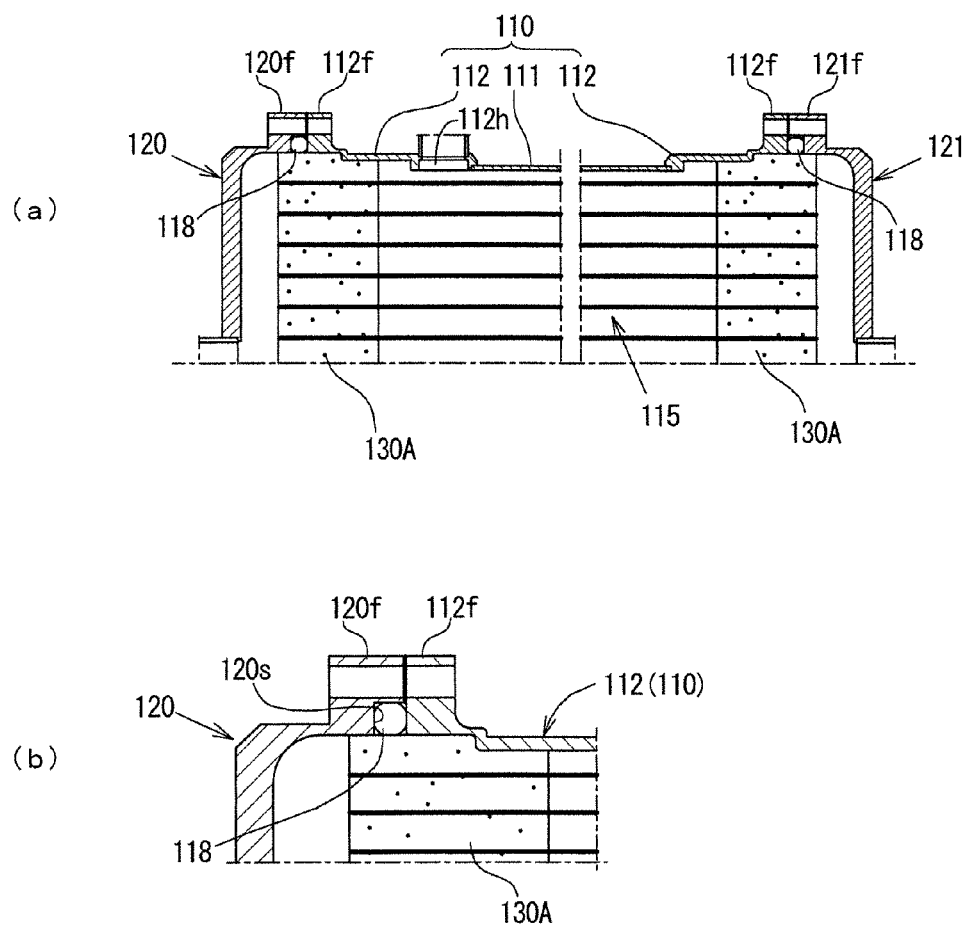
FIG. 11($a$) is a cross-sectional view showing a further exemplary separation membrane module, and FIG. 11($b$) is an enlarged partial view of FIG. 11($a$).

A gas separation membrane module of the invention in this section can have a configuration as shown in FIG. 11. FIG. 11(a) is a cross-sectional view showing an exemplary gas separation membrane module, and FIG. 11(b) is an enlarged partial view of FIG. 11(a).

The gas separation membrane module in FIG. 11 has a hollow fiber bundle 115 as a collection of hollow fiber membranes, a cylindrical vessel 110 housing the bundle, tube sheets 130A, 130A at both ends of the hollow fiber bundle 115 and caps 120, 121 at the end of the cylindrical vessel 110. Furthermore, the module has the O-ring 118 arranged on the outer surface of each tube sheet 130A.

The cylindrical vessel 110 of this example has a tubular member 111 extending along the longitudinal direction of the module, and end members 112, 112 attached at the each end of the member 111. In the peripheral wall of the end member 112 in the left side of the figure (gas inlet side), an outlet 112h for a permeate gas (as an example) is formed.

Figure 10:
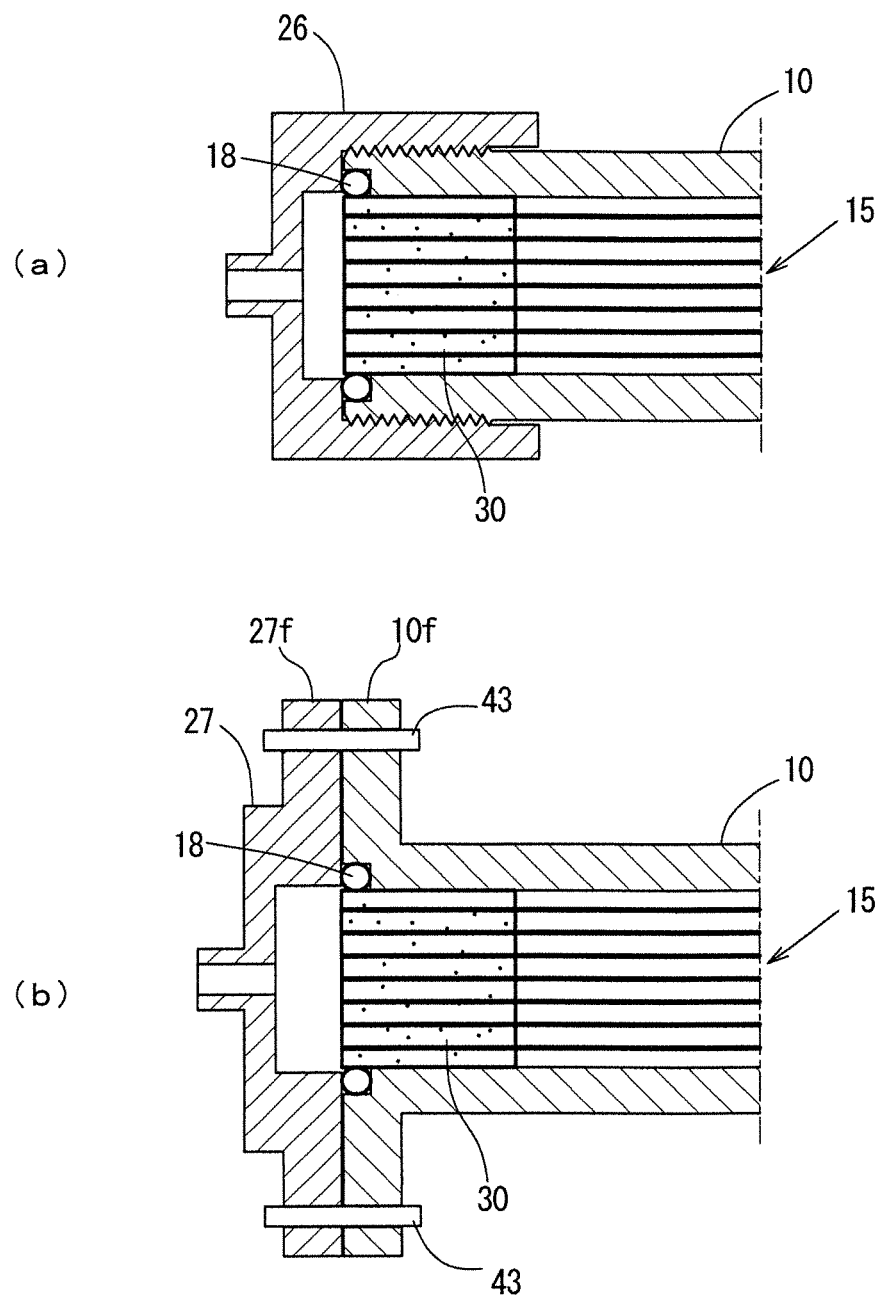
FIG. 10 is a view of another exemplary embodiment.

Each end member 112 has a flange 112f Meanwhile, the caps 120, 121 have flanges 120f, 121f, respectively. By engaging the flange 112f of the end member with the flange 120f of the cap, using for example bolt-nut system (not shown in FIG. 11) as illustrated in FIG. 10, the cap 120 can be fixed to the end member 112 (a similar configuration can be applicable to the cap 121).

As shown in FIG. 11(b), in this example, the tube sheet 130A is arranged such that it is firmly contacted to both a part of the inner surface of the cap 120 and a part of the inner surface of the cylindrical vessel 110. Each tube sheet 130A has an outer surface formed as a step like the tube sheet 30' in FIG. 7, the step in the outer surface of the tube sheet abuts on the step in the inner surface of the cylindrical vessel, thereby the position of the tube sheet 130A in an axial direction (lateral direction in the figure) is secured.

Inside in the radial direction of the flange 120f of the cap 120, there is formed an annular step 120s. An O-ring 118 is disposed within an annular groove, which has a rectangular cross section formed by the step 120s and a part of the flange 112f in the end member 112. The O-ring 118 contributes to ensure airtightness not only between the tube sheet 130A and the cap 120 but also between the cap 120 and the end member 112.

Although a surrounding structure of the O-ring 118 has been described with reference to the structure of the cap 120, the cap 121 side has a similar structure. Means for fixing a flange is not limited to a bolt-nut system, but can be for example configuration where a bolt tip is screwed into a threaded hole formed in either the flange 112f or 120f.

According to the configuration as described for FIG. 11, like the first embodiment, any step is not formed in the vicinity of the position of the tube sheet 130A where the O-ring 118 is to be mounted. Thus, it can be less influenced by stress concentration when being used at high temperature than conventional structure as shown in FIG. 6(b). As a result, resistance to the high temperature and reliability can be improved in the gas separation membrane module as a whole.

Furthermore, in the configuration in FIG. 11, the cylindrical vessel 110 includes a tubular member 111 and the end members 112, 112, and such a configuration is advantageous in that material for each member can be appropriately selected depending on the requirement of the members. It is noted that the invention in this section is not limited to it, but a single cylindrical vessel can be employed, in which for example the tubular member 111 and the end member 112 are integrally combined.

Figure 12:
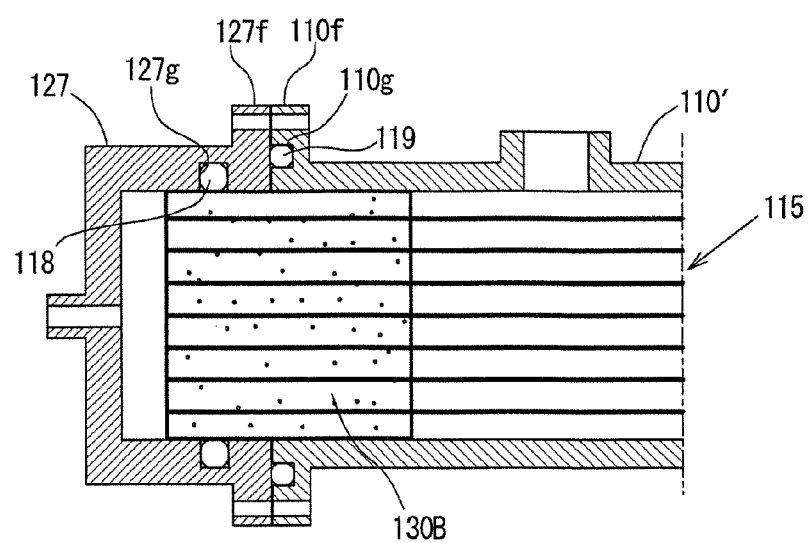
FIG. 12 is a view showing an exemplary arrangement of the O-RING.

Furthermore, other gas separation membrane module of the invention in this section can be as shown in FIG. 12. In this module, principally like the configuration in FIG. 10(b), the cap 127 is connected to the cylindrical vessel 110' in such a manner that the flange 127f in the cap 127 abuts on the flange 110f in the cylindrical vessel 110'. The number and the disposition of O-rings are different from that in FIG. 10(b). The tube sheet 130B is firmly contacted, like that in FIG. 11, to the parts of the inner surfaces of the cap 127 and the cylindrical vessel 110'.

A first O-ring 118 is disposed within an annular groove 127g formed in the inner surface of the cap 127, ensuring airtightness between the tube sheet 130B and the cap 127. The annular groove 127g is formed, but not limited to, slightly inside (left side in the figure) from the end face in the side of the flange 127f in the inner surface of the cap 127.

A second O-ring 119 is disposed between the flange 110f and the flange 127f. In this example, the O-ring 119 is disposed in the annular groove 110g formed in the flange 110f in the cylindrical vessel 110. The O-ring 119 is not an essential element, but it can prevent the gas from leaking through the space between the flanges 110f and 127f.

Of course, such a configuration of the O-rings 118, 119 is not limited to the embodiment illustrated in FIG. 12, but it can be used in combination with the above embodiments as appropriate. Furthermore, the groove in which the second O-ring 119 is disposed can be formed in the flange 127f in the cap 127.

The invention related to section C is as follows.

[1] A separation membrane module used under high-temperature conditions, comprising;
a hollow fiber bundle including a number of hollow fiber membrane with selective permeability,
a cylindrical vessel housing the hollow fiber bundle,
a tube sheet placed at the end of the hollow fiber bundle, which fixes the end of the bundle to the end of the cylindrical vessel and separates the inside of the cylindrical vessel from the outside, and
an annular sealing member for sealing between the outer surface of the tube sheet and the inner surface of the cylindrical vessel;
wherein there is not a step in the tube sheet on the periphery of the place on which the annular sealing member is to be mounted.

[2] A separation membrane module used under high-temperature conditions, comprising;
a hollow fiber bundle including a number of hollow fiber membrane with selective permeability,
a cylindrical vessel housing the hollow fiber bundle, and
a tube sheet placed at the end of the hollow fiber bundle, which fixes the end of the bundle to the end of the cylindrical vessel and separates the inside of the cylindrical vessel from the outside;
wherein the tube sheet is made of material having a larger thermal expansion coefficient than that of material for the cylindrical vessel, and
There is a gap between the outer surface of the tube sheet and the inner surface of the cylindrical vessel at normal temperature, whereas the tube sheet can expand by heating to a predetermined temperature, so that its outer surface adheres tightly to the inner surface of the cylindrical vessel to provide sealing effect.

[3] A gas separation membrane module, comprising;
a hollow fiber bundle including a number of hollow fiber membrane with selective permeability,
a cylindrical vessel housing the hollow fiber bundle,
a tube sheet placed at the end of the hollow fiber bundle, which fixes the end of the bundle to the end of the cylindrical vessel and separates the inside of the cylindrical vessel from the outside, and
a cap at the end of the cylindrical vessel;
wherein a tubular member for forming a channel communicating the inside with the outside of the cylindrical vessel penetrates a part of the cylindrical vessel and a part of the cap along the radial direction.

[4] The gas separation membrane module as described in [3], comprising a fixing member which is to be inserted into a part of the peripheral wall of the cap and which acts as means for fixing the cap and the cylindrical vessel.

[5] A gas separation membrane module, comprising;
a hollow fiber bundle including a number of hollow fiber membrane with selective permeability,
a cylindrical vessel housing the hollow fiber bundle,
a tube sheet placed at the end of the hollow fiber bundle, which fixes the end of the bundle to the end of the cylindrical vessel and separates the inside of the cylindrical vessel from the outside, and
a cap at the end of the cylindrical vessel;
further comprising a fixing member, which is to be inserted into a part of the peripheral wall of the cap, for fixing the cap to the cylindrical vessel.

[6] A gas separation membrane module, comprising;
a hollow fiber bundle including a number of hollow fiber membrane with selective permeability,
a cylindrical vessel housing the hollow fiber bundle,
a tube sheet placed at the end of the hollow fiber bundle, which fixes the end of the bundle to the end of the cylindrical vessel and separates the inside of the cylindrical vessel from the outside,
a cap at the end of the cylindrical vessel, and
an annular sealing member for sealing between the outer surface of the tube sheet and the inner surface of the cylindrical vessel;
wherein the cap is fixed to the cylindrical vessel, by a system
(i) using a thread formed in a part of the inner surface of the cap and a thread formed in an opposite part of the outer surface of the cylindrical vessel, or
(ii) binding a flange of the cap to a corresponding flange of the cylindrical vessel using a fixture.

[7] The gas separation membrane module as described in any of [3] to [6], wherein the annular sealing member further seals between the cap and the cylindrical vessel.

Section D: Gas Separation Membrane Module Whereby which can be Reduce a Replacement Cost and is Advantageous in Simplifying its Structure Technical Field The invention disclosed in this section relates to a gas separation membrane module for gas separation using a number of hollow fiber membranes with selective permeability. In particular, the invention relates to a separation membrane module which can reduce replacement cost and is advantageous for simplifying its structure.

Background Art

A hollow fiber type gas separation membrane module generally has a hollow fiber element having a fiber bundle including a number of hollow fiber membranes with selective permeability, and a cylindrical vessel housing the element. One or both ends of the hollow fiber bundle in the hollow fiber element is attached to the end of a vessel by a resin cured plate (tube sheet). Capping members are attached to the ends of the cylindrical vessel to seal the inside of the vessel.

In conventional gas separation membrane module, as described above, the cylindrical vessel and capping members attached to the cylindrical vessel as a whole constitute a single case. Thus, when the separation membrane module is replaced, the whole module must be change. Therefore, capping members that are no need to be changed are obliged to be replaced, leading to higher cost for a replacement part.

On the other hand, it would be possible to make the hollow fiber element in the case replaceable, but in such a configuration for example, it is necessary to provide some structure allowing for removal of the hollow fiber element, with inside of the case, therefore module structure become more complex and may be disadvantageous to weight reduction.

In view of the problems, an objective of the invention in this section is to provide a gas separation membrane module which can reduce a replacement cost, advantageous to simplifying a structure and allow for easy size- and weight-reduction.

The summary of the main invention disclosed in this section is as follows.

[1] A gas separation membrane module, comprising; a cartridge housing a hollow fiber bundle including a number of hollow fiber membranes in a cylindrical vessel, capping members each of which is configured to be attached to an end of said cartridge, a sealing member for sealing between each of said capping members and said cartridge, and a fixture for fixing said capping members to each other, wherein said cartridge is replaceably mounted between said capping members.

According to such a configuration, there is provided a gas separation membrane module which can reduce a replacement cost, is advantageous to simplifying a structure and can be easily size- and weight-reduced.

Embodiment in Section D

There will be described one embodiment of the invention in this section with reference to the drawings. The invention in this section is not limited to the following embodiment, but can be, if necessary, modified, including addition or omission of a component and change of a shape.

Figure 13:
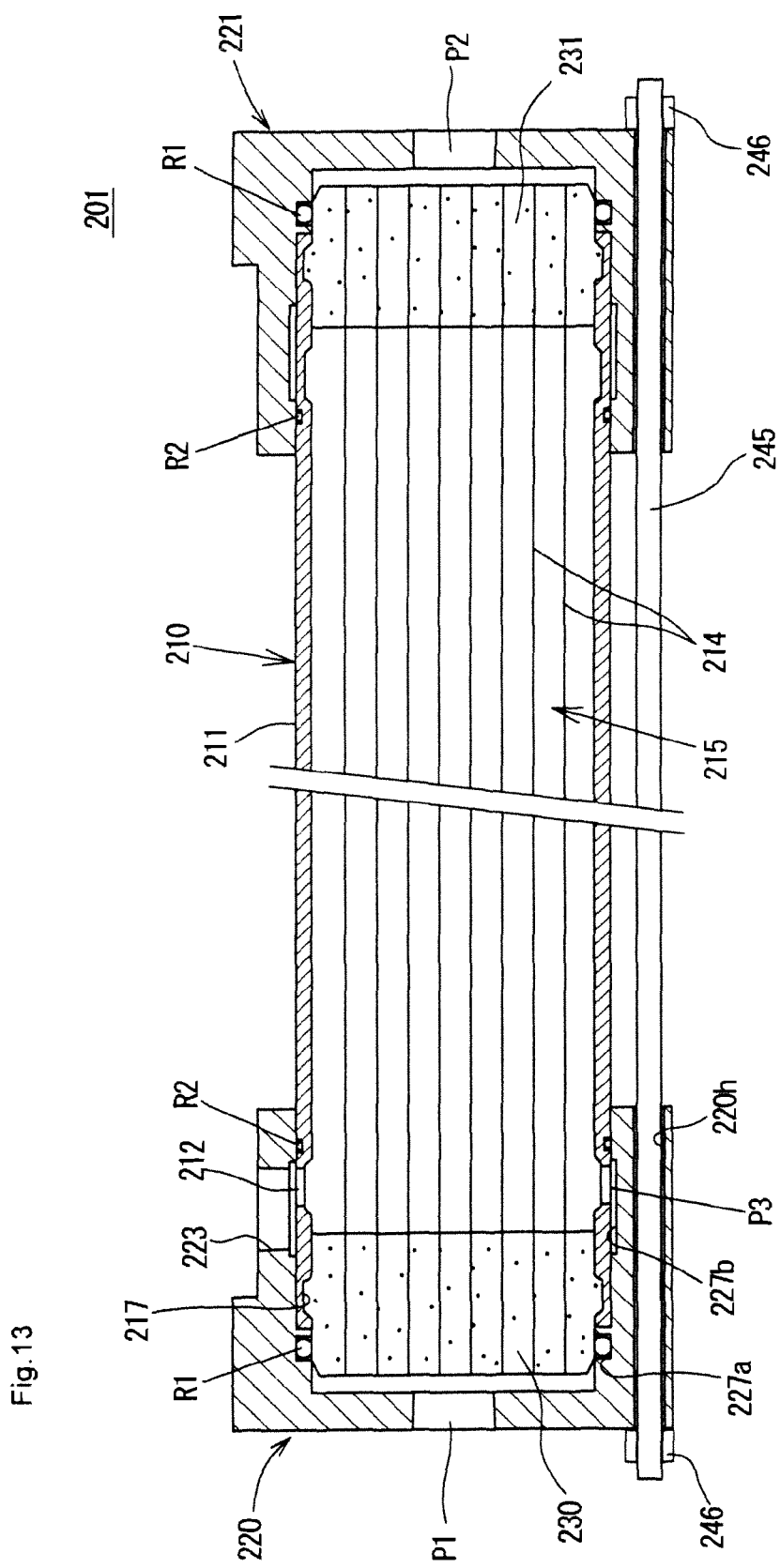
FIG. 13 is a cross-sectional view of a gas separation membrane module according to one embodiment in section D.

As shown in FIG. 13, a gas separation membrane module 201 (hereinafter, sometimes simply referred to as "separation membrane module") has a cylindrical cartridge 210 housing a hollow fiber bundle 215, capping members 220, 221 at both ends of the cartridge and, for example, a fixing rod 245 for connecting these capping members 220, 221 to each other.

The cartridge 210 includes a cylindrical vessel 211 with open ends, the hollow fiber bundle 215, and tube sheets 230, 231. The tube sheets 230, 231 hold the ends of the hollow fiber bundle 215 and separate the inside and the outside of the cylindrical vessel 211.

The hollow fiber bundle 215 can be made of known structure. The hollow fiber bundle 215 can be, for example, a collection of about 100 to 1,000,000 hollow fiber membranes 214. There are no particular restrictions to a material for the hollow fiber membrane 214 as long as the membrane can separate gases. For example, it is suitably made of polymer material, which is glassy at normal temperature (23° C.) such as, in particular, polyimide, polysulfone, polyetherimide, polyphenylene oxide and polycarbonate which exhibits higher gas separation ability. There are no particular restrictions to a shape of the collected hollow fiber bundle, but in the light of easiness of production and pressure resistance of a vessel, it can be hollow fiber bundle as a cylindrical collection. FIG. 13 shows an embodiment in which hollow fiber membranes 214 are disposed substantially in parallel, however, these hollow fiber membranes can be cross-arranged.

The cylindrical vessel 211 can have any shape of cross section such as circular, elliptic or polygonal. There will be described a circular shape. The cylindrical vessel 211 can be formed for example by processing a single metal pipe. In this embodiment, it is preferable that, for example, fixing mechanism for fixing the capping members 220, 221 to the cylindrical vessel 211 is not arranged in the cylindrical vessel 211 as a cartridge (in other words, a structure where capping members are not to be connected to the cylindrical vessel may be preferable). The configuration can eliminate the necessity for processing the cylindrical vessel 211 such as forming a flange, forming a threaded hole and placing a fixing pin.

Figure 14:
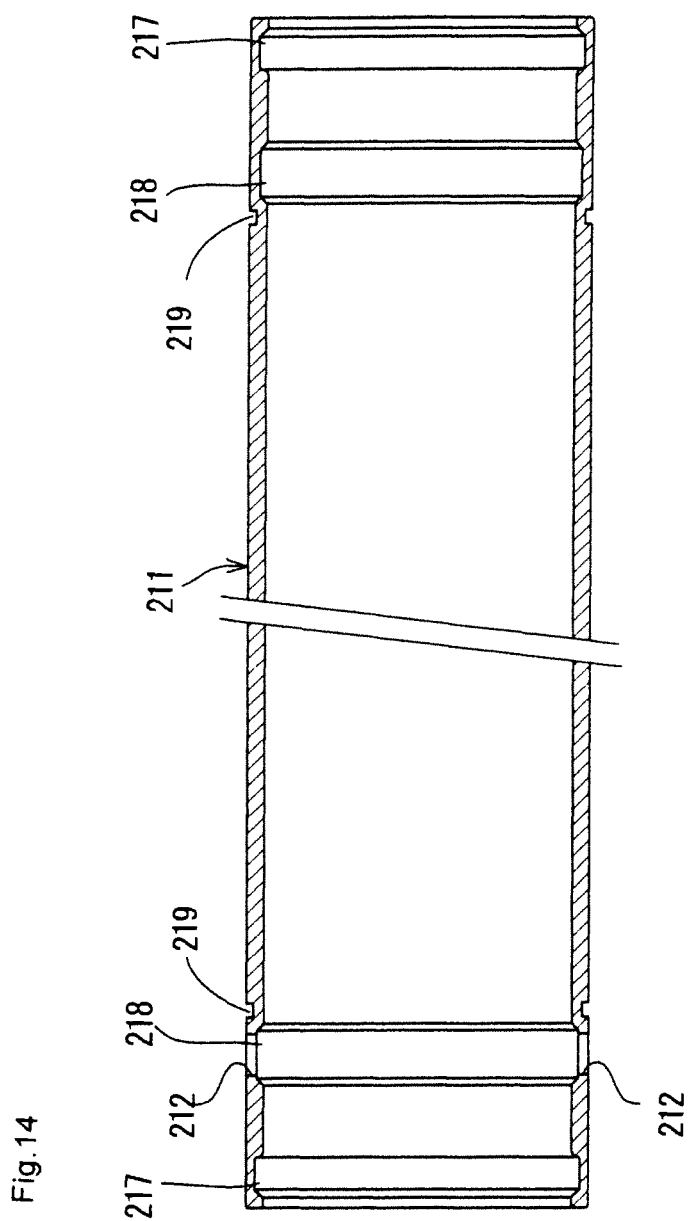
FIG. 14 is a cross-sectional view of the tubular member in the module in FIG. 13.

An inner groove 217 is formed near the end in the inside of the cylindrical vessel 211, as shown in FIG. 14, where the inner diameter is partially longer. A part of tube sheet 230, 231 is configured to be fitted into the inner groove 217 as described later. Another inner groove 218 is formed further inside from the inner groove 217 by a predetermined distance (in a direction away from the end). With respect to the inner grooves 217 and 218, cross-sectional shape of the grooves may be any shape such as rectangular, substantially rectangular, trapezoidal or substantially_trapezoidal.

Openings 212 for discharging gas from the vessel are formed in the part where the inner groove 218 is formed. The number and the positions of the openings 212 are not particularly limited. For example, the openings 212 can be formed on the periphery of the cylindrical vessel 211 at regular intervals. As shown in FIG. 14, an outer annular groove 219 for elastic ring member R2 described later is formed on the periphery of the tubular member 211 and positioned slightly inwardly from the inner groove 218 (in a direction away from the cylinder end).

Sealing members 230 and 231 (see FIG. 13) in the cartridge 210 are for example made of an epoxy resin and formed as a substantially disc-shape to be fit into the end of the vessel 211. Since the tube sheets 230 and 231 have a similar structure in principle, there will be described only the tube sheet 230. Each hollow fiber membrane 214 penetrates the tube sheet 230 along its thickness direction, and the end of each hollow fiber membrane 214 is open at to the outside of the tube sheet 230. The tube sheet 230 adheres the hollow fiber membranes 214 together, and separates the inside of the cylindrical vessel 211 from the outside. There are no particular restrictions to a cured resin forming the tube sheet as long as it is adequately durable and can ensure airtightness of the inside of the hollow fiber module. The resin is also preferably resistant to water vapor when being used for dehydrating or moisturizing. In general, a thermosetting resin such as polyurethane and an epoxy resin is suitably used. In the light of durability and strength, an epoxy resin is particularly suitably used. For a nitrogen membrane module, the epoxy resin for example described in Japanese published examined application No. 1990-36287 can be used, whereas for an organic-vapor separation module the epoxy resin for example described in WO 2009/044711 can be used. The epoxy resin as disclosed in section B can also be used for the tube sheet in the module of this section. The tube sheet can be formed by known method such as centrifugal molding or stationary molding.

It is noted that the term "separate" (e.g. separating the inside of a cylindrical vessel from the outside by a tube sheet) as used above means that substantial isolation by the tube sheet is acceptable and the outer circumference of the tube sheet does not necessarily have to adhere to the inner surface of the cylindrical vessel.

As shown in FIG. 13, the part of the tube sheet 230 extrudes from the end of the cylindrical vessel 211, and a chamfer (tapered surface) is formed along the periphery of the end of the tube sheet 230. The tube sheet 230 can be formed by for example the following process. First, for example a mold (not-shown) is attached to the end of the cylindrical vessel 211, with the hollow fiber bundle 215 being disposed within the cylindrical vessel 211. Then, a resin is injected into the mold and the cylindrical vessel 211, and then cured. After the resin is cured, the mold is detached and the end of the cured resin is cut to form the end face of the tube sheet 230 and to make the ends of the hollow fiber membranes 214 opened. The chamfer in the tube sheet 230 can be formed by molding or by secondary processing after resin curing.

Since the cylindrical vessel 211 has the inner groove 217, the groove 217 is filled with the resin for the tube sheet 230. Consequently, the part of the tube sheet 230 can engage with the inner groove 217, so that the tube sheet 230 can be positioned relative to the cylindrical vessel 211 in an axial direction. Generally, during operation of the separation membrane module 201, the pressure is applied to the tube sheet 230 in such a direction that the member is pushed into the cylindrical 1 vessel 211. According to the configuration of this embodiment, the part of tube sheet 230 engages with the inner groove 217. Therefore, the tube sheet 230 can be prevented from moving into the cylindrical vessel 211 by pressure during operation.

Next, there will be described a structure of the capping members 220, 221 with reference to FIGS. 13 and 15. Since the capping members 220, 221 basically have a similar structure in this example only the capping member 220 will be described, and for the capping member 221 only different parts will be described. There are no particular restrictions to materials for the capping members 220 and 221, however they can be for example made of metal. It is noted that the capping members 220, 221 can have different shape from each other, and the shapes of the capping members 220, 221 can be appropriately changed depending on the application and specifications of the separation membrane module.

Figure 15:
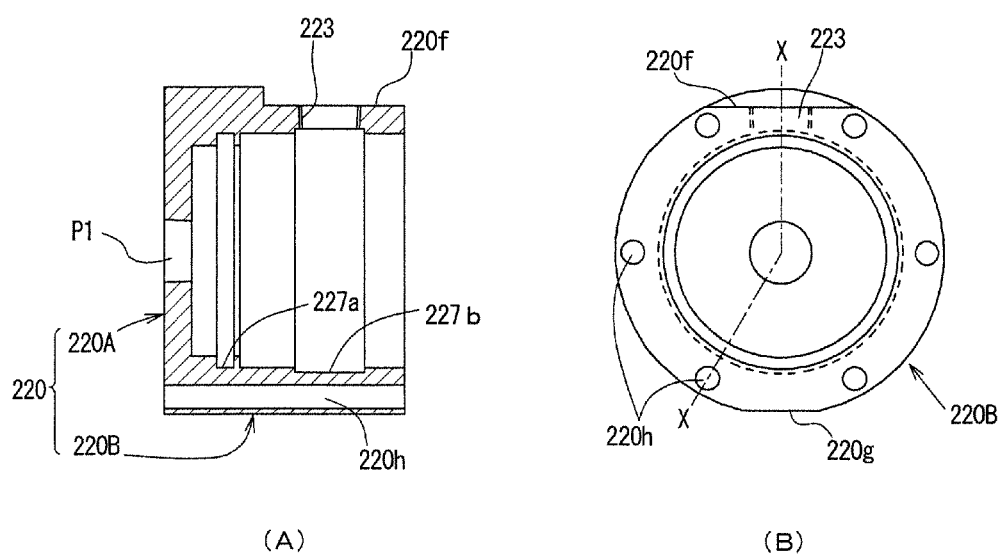
FIG. 15 shows a plan view and a sectional side view of a capping member in the module in FIG. 13.

As shown in FIGS. 13 and 15, the capping member 220 has a bottomed cylindrical shape. Specifically, as shown in FIG. 15(A), it has an end face 220A covering the opening of the cylindrical vessel 211 and a cylindrical part 220B extending from the edge of the end face.

The end face 220A has a gas inlet P1 for introducing mixed gas. Inner grooves 227a, 227b are formed on the inside of the cylindrical part 220B. An elastic ring member R1 (detailed below) is to be fitted into the inner groove 227a as shown in FIG. 13. The other inner groove 227b is for forming a gas channel P3 surrounding the cylindrical vessel 211 when the capping member 220 is attached to the cylindrical vessel 211. The other capping member 221 has a non-permeate gas outlet P2.

The gas channel P3 (FIG. 13) communicates with the openings 212 of the cylindrical vessel 211, such that the gas in the vessel flows into the gas channel P3 through each opening 212. The gas is discharged to the outside via the outlet 223 formed in the cylindrical part 220B in the cap. An element (opening) corresponding to the outlet 223 is not formed in the capping member 221 in the configuration in FIG. 13, however, depending on, for example, an application of the module, the opening can be formed in the capping member 221, while in response to that, openings 212 can be formed in the cylindrical vessel 211.

Again referring to FIG. 15, the cylindrical part 220B has through-holes 220h through which fixing rod 245 (FIG. 13, detailed below) is inserted respectively. Six through-holes 220h are disposed at regular intervals in a circumferential direction in this example. According to the configuration such as the cylindrical part 220B has through-holes 220h through which the fixing rod 245 is inserted, the following advantages can be obtained. That is, in this configuration, since the cylindrical part 220B as the part of the cap 220 holds the fixing rod 245, there is no need to provide any special structure for holding the fixing rod with the capping member 220. Therefore, the capping member 220 and thus the separation membrane module 201 can be size-reduced, contributing weight-reduction in the module.

Figure 16:
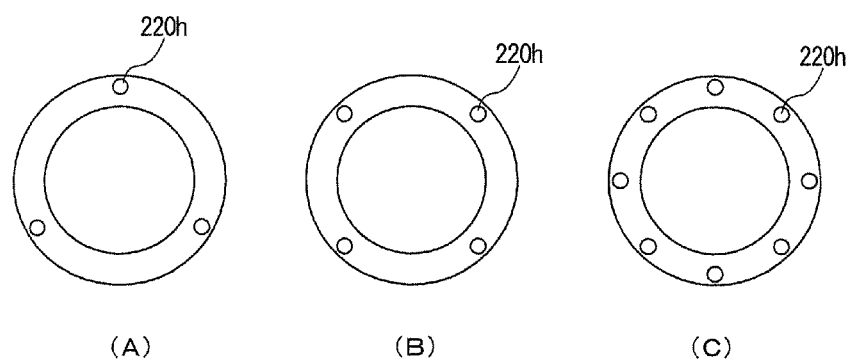
FIG. 16 is a schematic view of a capping member for illustrating an example in which the number of fixing rods has been changed.

It is noted that the number of the fixing rods 245 is not limited to 6, but can be 1 to 5 or 7 or more. For example, as shown in FIG. 16, it can be 3, 4 or 8. The fixing rod 245 can be, for example, made of, but not limited to, a metal.

As shown in FIG. 15(B), a flat part 220f is formed on the part of the cylindrical part 220B where the outlet 223 opens, by cutting the part of the cylindrical part 220B. Furthermore, in the bottom of the cylindrical part 220B, for example, a flat part 220g for preventing the separation membrane module from rolling is formed.

An elastic sealing member R1 for sealing between the tube sheet 230 and the capping member 220 is fitted in the inner groove 227a of the capping member as shown in FIG. 13. The elastic ring member R1 is configured such that it remains on the inside of the capping member 220 when the cartridge 210 is detached from the capping member 220 for replacement. The elastic ring member R1 can be, for example, an O-ring (substantially circular cross section). Alternatively, it can be a V- or U-packing with a substantially V- or U-shaped cross section, respectively. Furthermore, its cross section can be elliptic, rectangular, polygonal or X-shaped.

Another elastic ring member R2 is disposed between the cylindrical vessel 211 and the cylindrical part 220B, such that it is fitted into the periphery groove 219 of the cylindrical vessel 211, to seal between these members. The elastic ring member R2 can be also selected from a various types such as an O-ring, a V-packing and a U-packing as described above.

As shown in FIGS. 13 and 15, the capping members 220, 221 are connected to each other with six (for example) fixing rods 245 and nuts 246 mounted on both ends. In this embodiment, it is the fixtures as separate components from the cartridge 210 that connect the capping members 220, 221. Therefore, there is no need to provide any structure such as flanges with the cartridge 210 (particularly, the tubular member 211), resulting in simplifying the structure of the cartridge 210.

There are no particular restrictions to a fixture for fixing the capping members 220, 221, but it can be selected from various types. For example, one end of the fixing rod can be a head with a larger diameter, while the other end can receive a nut. Alternatively, the inner circumference of the through-hole 220*h* of the inner capping member 220 can be threaded, while in response to that, the rod end can be also threaded, so that the rod end is to be screwed into the through-hole 220*h*. Alternatively, mechanisms for mechanically binding and fixing capping members can be used; such as a mechanism for fixing the module by clamping both ends of the module (capping members 220, 221).

In addition, such mechanisms are not limited to the ones for connecting capping members 220, 221 to each other. Instead, mechanism for securing each capping members 220, 221 to a predetermined fixing position can be used, in which the cartridge 210 is removably mounted between the capping members 220 and 221. For example, a particular configuration can be employed, where some part of an apparatus or facility on which the separation membrane module is to be mounted is configured to serve as a base member (not shown), and each of the capping members 220, 221 can be fixed to the base member.

In the separation membrane module 201 of this embodiment, for example, gas separation is conducted as follows. A pressurized air is introduced into the inside of the vessel through the gas inlet P1, and the air is fed into the inside of the hollow fiber membrane 214 via the open end. While the pressurized air flows in the hollow fiber membrane 214, an oxygen-rich air selectively permeates toward the outside of the membrane, and the permeating oxygen-rich air moves into the space where the hollow fiber bundle between tube sheets is mounted. The permeate gas is discharged from openings 212 and 223 as permeate gas outlets. On the other hand, the non-permeating nitrogen-rich air is discharged, through the other opening in the hollow fiber membrane 214, from the non-permeate gas outlet P2 as non-permeate gas outlet.

According to the gas separation membrane module 201 described above, it has the configuration in which the cartridge 210 housing the hollow fiber bundle 215 is to be mounted between the capping members 220, 221. Thus, the Module can be replaced only by changing the cartridge without changing the whole module, therefore cost for the replacement part can be reduced.

On the other hand, a structure may be adopted in which only the inner components corresponding to the hollow fiber element 215, however, it is necessary to design a structure for mounting/removing the replaceable component within the cylindrical vessel 211 in this case. In contrast, according to the module 201, complex structures are not required, since the cylindrical vessel 211 (as a part of the cartridge 210) itself can serve as the case for the module 201. This is advantageous in weight reduction for the whole separation membrane module 201, particularly suitably applicable to a field needing weight reduction of the module such as aeronautical field.

Furthermore, according to the above configuration, the capping members 220, 221 are coupled by fixture (245, 246) as separate component from the cartridge 210. It is, therefore, not necessary to provide structure(s) for coupling the capping member with the cylindrical vessel 211 (for example, a flange). Thus, a structure of the cartridge 210 can be simplified and a production cost can be reduced.

According to the above configuration, the elastic ring member R1 is set on the inner circumference of the capping member 220, 221 such that the ring member R1 remains in the capping member side when the cartridge 210 is removed during replacement. Such a configuration is advantageous to saving production cost for the cartridge 210 compared with forming the ring member R1 in the side of the cartridge 210.

As shown in FIG. 13, in the configuration of this embodiment, the chamfer (tapered surface) is formed along the periphery of the end of the tube sheet 230, therefore, the end of the tube sheet 230 can be smoothly inserted into the elastic ring member R1.

The embodiments of this invention in this section have been described with reference to the drawings, however, there can be various modifications of the invention in this section in addition to that illustrated in the drawings. For example, the shape and the position of a sealing member for sealing between members can be appropriately changed. In addition to the elastic ring members R1, R2, additional sealing member can be used.

Although there has been illustrated a configuration in which the elastic ring member R2 is fitted into the periphery of the cylindrical vessel 211 in the above embodiment as shown in FIG. 13, the invention of this section is not limited to that, but can be a configuration in which the elastic ring member R2 is disposed in the inner circumference of the capping member 220, 221 and during replacement of a cartridge, the elastic ring member R2 is to remain in the side of the capping member 220, 221. It can eliminate the necessity of forming the periphery groove 219 in the cylindrical vessel 211 in the cartridge 210, resulting in further reducing a production cost for the cartridge 211.

Although the examples of separation membrane modules constituting a so-called bore feed type in the above embodiment, the invention in this section can be applied to the separation membrane module constituting a shell feed type. In such a case, a configuration can be employed in which the cartridge suitable to a shell feed type is replaceably mounted between the capping members as described above.

The inventions according to section D are as follows.

[1] A gas separation membrane module, comprising;
  a cartridge housing a hollow fiber bundle including a number of hollow fiber membranes in a cylindrical vessel,
  capping members each of which is configured to be attached to both end of said cartridge,
  a sealing member for sealing between each of said capping members and said cartridge, and
  a fixture for fixing said capping members to each other,
  wherein said cartridge is replaceably mounted between said capping members.

[2] The gas separation membrane module as described in [1], wherein
  said fixture has at least one fixing rod coupling said capping members, and
  each capping member has a through-hole into which said fixing rod is inserted.

[3] The gas separation membrane module as described in [1] or [2], wherein
  said capping member is mounted such that it covers the end of said cylindrical vessel, and
  said sealing member is an elastic ring member configured to be disposed between the periphery of said cartridge and the inner circumference of said capping member.

[4] The gas separation membrane module as described in [3], wherein said elastic ring member is to be held in the inner circumference of said capping member, and is configured to remain in the side of said capping member when said cartridge is removed from said capping member for replacement.

[5] The gas separation membrane module as described in any of [1] to [4], wherein said cartridge has a tube sheet holding the end of said hollow fiber bundle, for separating the inside of said cylindrical vessel from the outside, an inner groove is formed in a region within said cylindrical vessel and facing said tube sheet, and a part of said tube sheet engages with said inner groove.

Section E: Gas Separation Membrane Module Capable of More Efficiently Separating Gases Technical Field The invention in this section relates to a gas separation membrane module for separating gases with a hollow fiber membrane, in particular a gas separation membrane module which can more efficiently separate gases in a so-called bore feed type module.

Background Art

A hollow fiber type gas separation membrane module generally has a hollow fiber element including a hollow fiber bundle comprising a number of hollow fiber membranes with selective permeability and a hollow casing housing the element. Both ends or one end of the hollow fiber bundle in the hollow fiber element are fixed by resin-cured plate (tube sheet). Furthermore, the casing has a mixed gas inlet, a permeate gas outlet and a non-permeate gas outlet.

For the purpose of efficient gas separation, for example, Japanese published unexamined application No. 2000-262838 discloses a gas separation membrane as a so-called bore feed type module in which mixed gas is fed into hollow fiber membranes, wherein a part of the hollow fiber bundle is covered by a film member, so that the carrier gas outside of the hollow fiber membranes and the mixed gas inside of the membranes flow countercurrently.

According to the above gas separation membrane module in No. 2000-262838, the flow direction of the carrier gas can be regulated to achieve more efficient gas separation, however, it is important to improve an efficiency of gas separation even in the bore feed type modules without using a carrier gas (purge gas). In view of the above problem, an objective of the invention in this section is to provide a bore feed type gas separation membrane module which can more efficiently separate gases.

The summary of the main invention disclosed in this section is as follows.

[1] A gas separation membrane module comprising;

a hollow fiber bundle as a collection of a number of hollow fiber membrane with gas separation ability, a casing having a mixed gas inlet, a permeate gas outlet and a non-permeate gas outlet, in which said hollow fiber bundle is disposed, and two tube sheets for fixing both ends of said hollow fiber bundle, in which mixed gas from said mixed gas inlet is fed into said hollow fiber membrane, while the mixed gas partly permeates the membrane, to achieve gas separation, wherein, (i) a structure for feeding purge gas is not provided, said purge gas is for purging permeate gas from hollow fiber membrane, and (ii) the module further comprising, a gas-impermeable film member wrapped around the outer surface of said hollow fiber bundle, in which one end substantially abuts on said tube sheet in the downstream side along the mixed-gas feeding direction, whereas the other end is disposed away from the tube sheet in the upstream side in the mixed-gas feeding direction.

According to the invention in this section the film member wrapped around the hollow fiber bundle regulates feeding of a permeate gas in a direction opposite to a direction of feeding a mixed gas (detailed later), therefore gas separation can be more efficiently conducted in the bore feed type module.

Embodiment in Section E

Figure 17:
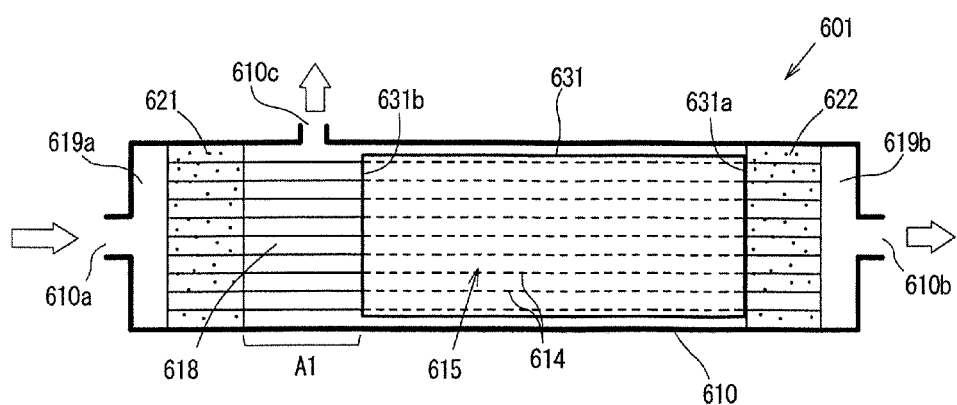
FIG. 17 is a cross-sectional view schematically showing a basic configuration of a gas separation membrane module according to one embodiment in section E.

There will be described one embodiment of the invention in this section with reference to the drawings. FIG. 17 is a cross-sectional view schematically showing a basic configuration of a gas separation membrane module according to this embodiment.

A gas separation membrane module 601 as shown in FIG. 17 is of the bore feed type, which has a hollow fiber bundle 615 as a collection of a number of hollow fiber membranes 614, a casing 610 housing the bundle, and tube sheets 621 and 622 at both ends of the hollow fiber bundle 615.

The hollow fiber membrane 614 can be made of any known structure as long as it has gas separation ability. For example, it is suitably made of polymer material which is glassy at normal temperature (23° C.) such as, in particular, polyimide, polysulfone, polyetherimide, polyphenylene oxide and polycarbonate for their gas separation ability.

The hollow fiber bundle 615 can be, for example, a collection of about 100 to 1,000,000 hollow fiber membranes 614. There are no particular restrictions to the shape of the collected hollow fiber bundle 615, but for example, the cylindrical shape is preferable in the light of easiness in production and pressure resistance of a vessel. FIG. 17 shows an embodiment in which hollow fiber membranes 614 are disposed substantially in parallel, however, these hollow fiber membranes can be cross-arranged.

There are no particular restrictions to mixed gas to be subjected to separation by the hollow fiber membrane 614, but it can be, for example, a mixed gas of a more permeable gas and a less permeable gas with a ratio of permeation rates to a separation membrane of 2 or more. The gas separation membrane module 601 of this embodiment can be use for separating a particular gas component from a mixed gas in various manners. For example, it can be used for drying a variety of gases, humidification of a variety of gases, nitrogen enrichment or oxygen enrichment.

The tube sheets 621, 622 are formed as a disc-shape in response to the cross-sectional shape of the casing, and they hold the end of the hollow fiber bundle 615 with each hollow fiber membrane 614 opened. The tube sheets 621, 622 can be made of a thermoplastic resin such as polyethylene and polypropylene or a thermosetting resin such as an epoxy resin and a urethane resin. The tube sheets 621, 622 have a function of bundling the hollow fiber membranes 614 together. It also has a function of sealing between the hollow fiber membranes 614 as well as between the hollow fiber bundle 615 and the inner surface of the casing 610. As shown in FIG. 17, a dosed space 618 (as described later, having a permeate gas outlet 610c) is formed by the casing 610 and two tube sheets 621 and 622, into which the permeate gas from the hollow fiber membrane 614 is to be introduced. A mixed gas space 619a is formed by the clising 610 and the tube sheet 621, while a non-permeate gas space 619b is formed by the casing 610 and the tube sheet 622. Other sealing means can be installed for sealing between the tube sheets 621, 622 and the inner surface of the casing 610.

For a nitrogen membrane module, the epoxy resin for example described in Japanese published examined application No. 1990-36287 can be used for the tube sheet 621, 622, whereas for an organic-vapor separation module the epoxy resin for example described in WO 2009/044711 can be used. The epoxy resin as disclosed in section B can also be used for a tube sheet in the module of this section As shown in FIG. 17, the casing 610 is substantially cylindrical as a whole. The casing 610 has a mixed gas inlet 610a in the upstream side (left side in the figure) for introducing mixed gas into the casing 610, a non-permeate gas outlet 610b in the downstream side (right side in the figure), and a permeate gas outlet 610c in its side wall. The number of the permeate gas outlet 610c can be one or two or more. Permeate gas outlets 610c can be disposed at regular intervals along the side wall of the casing 610. The permeate gas outlet 610c is, in this example, placed at the position near the upstream tube sheet 621 (specifically, the position of exposed part A1 in the hollow fiber bundle 615 without a film member 631 described later).

The mixed gas introduced from the mixed gas inlet 610a enters into each hollow fiber membrane 614 via the end face of the tube sheet 621 and flows downstream in the inside. A part of the mixed gas permeates the hollow fiber membrane 614 and the permeate gas is fed into the inside of the closed space 618 and then discharged from the casing through the permeate gas outlet 610c. On the other hand, a non-permeate gas not permeating the hollow fiber membrane as it is flows downstream in the hollow fiber membrane 614 and flows outward from the end face, and then is discharged out of the casing through the non-permeate gas outlet 610b.

Figure 19:
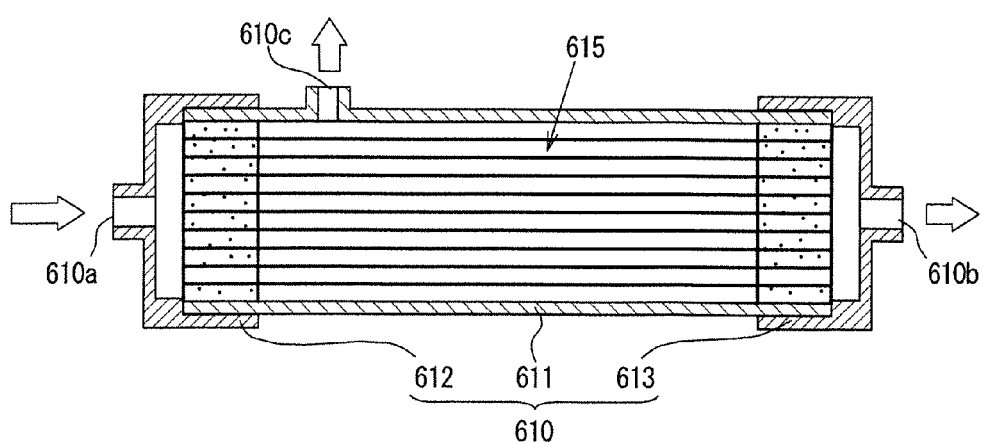
FIG. 19 is a cross-sectional view showing an exemplary casing in the module in FIG. 17.

Although FIG. 17 schematically shows the casing 610, the casing can have a configuration as shown in FIG. 19. The casing 610 in this example has a cylindrical member 611 with open ends and caps 612, 613 attached to the ends. The tubular member 611 and the caps 612, 613 can be, for example, made of a metal, a plastic or a ceramic. A mixed gas inlet 610a and a non-permeate gas outlet 610b are formed in the caps 612 and 613, respectively. For example, the mixed gas inlet 610a and the non-permeate gas outlet 610b can be formed at the center of the caps 612, 613 (center seen from a front of the cap), respectively.

Figure 18:
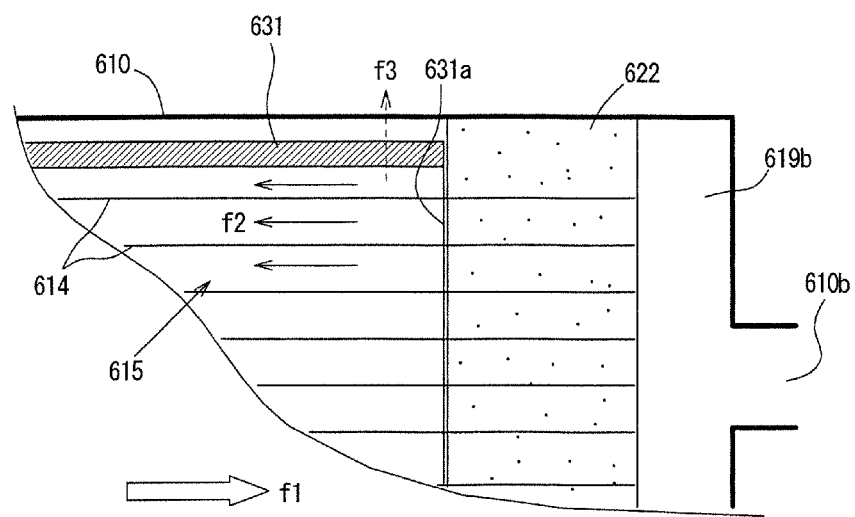
FIG. 18 is an enlarged partial view of FIG. 17.

A film member 631 is wrapped around the periphery of the hollow fiber bundle 615, as shown in FIGS. 17 and 18, in the gas separation membrane module 601 of this embodiment. The end 631a of the film member 631 substantially abuts on the tube sheet 622, while the other end 631b is disposed away from the tube sheet 621 by a predetermined distance. The region of hollow fiber bundle 615, which is not covered by the film member 631, is indicated by symbol A1 (exposed part) in FIG. 17. The film member 631 can cover 50% to 95%, preferably 75% to 92% of the outer surface of the hollow fiber bundle. Alternatively, the film member 631 may cover the whole surface of the hollow fiber bundle so that each end of the film member are close to each tube sheet, and one or multiple openings are formed on the film member 631 in the vicinity of the tube sheet 621.

The phrase, (an end of a film member) "substantially abut" means both that (i) the film end completely abuts on the tube sheet, and that (ii) the film end is close to the tube sheet with a small gap between the film end and the tube sheet due to convenience in production for example. When the tube sheet is made of an epoxy resin or the like and the film end is inserted in the tube sheet (for example, a case in which the film end is inserted in the tube sheet material and then the tube sheet is cured), the tube sheet may be cracked or damaged beginning at the part. Thus it may be preferable to arrange the film so that the end is not inserted into the tube sheet.

The film member 631 can be made of any material as long as the material is substantially gas-impermeable. The term "substantially gas-impermeable" means that: the gas permeability of the film member 631 is low enough to limit gas flow. For example, it can be a plastic film such as polyimide, polyethylene, polypropylene, polyamide and polyester. Among these, polyimide is preferable in the light of heat resistance, solvent resistance and processability. In addition to a plastic film, a metal foil such as aluminum and stainless steel can be used. A thickness of the film can be in the range of several ten μm to several mm. The film member 631 can be formed by attaching both side edges of the sheet to form cylindrical shape, or the film member 631 can be of a seamless tubular member. Side edges of the film can be attached by for example adhesive material or tape.

If the module does not has the film member 631, permeate gas from the hollow fiber membrane 614 flows in a cross-flow direction as shown by arrow f3 in FIG. 18 (i.e. a direction crossing the hollow fiber membrane 614). On the other hand, when the film member 631 is wrapped on the hollow fiber bundle 615 as in this embodiment, diffusion of the permeate gas is prevented and thus the permeate gas flows along the countercurrent direction f2 to the direction of mixed gas feeding f1.

There will be described an exemplary method for using the separation membrane module of this embodiment constructed as described above. A method for using the module according to embodiment is not limited to the following example.

First, a mixed gas is introduced through the mixed gas inlet 610a into the mixed gas space 619a within the casing 610. The introduced mixed gas enters each hollow fiber membrane 614 from the end face of the tube sheet 621, and flows downstream inside of the membrane. It is preferable that pressure within the hollow fiber membrane 614 is higher than that of the closed space 618, specifically, it is suitable that the mixed gas is fed at a pressure of 0.01 MPaG to 10 MPaG whereas the closed space 618 is vacuumed. A part of the mixed gas selectively permeates the hollow fiber membrane 614 during this operation, and is then discharged into the closed space 618 outside of the hollow fiber membrane 614. On the other hand, the non-permeable gas flows downstream as it is within the hollow fiber membranes 614 and then discharged to the non-permeate gas space 619b outside of the hollow fiber membranes 614 from the end face downstream.

The permeate gas from the hollow fiber membrane 614 is then introduced into the closed space 618 in the casing 610. The film member 631 prevents the permeate gas from diffusing in the region wrapped with the film member 631, as shown in FIG. 18, thus the permeate gas flows along the direction of the arrow f2 opposite to the direction of feeding the mixed gas f1. The permeate gas is then discharged out of the casing 610 through the permeate gas outlet 610c (see FIG. 17). The non-permeate gas is released from the downstream end of the hollow fiber membrane 614 and then discharged outside via the non-permeate gas outlet 610b.

According to the separation membrane module 601 described above, the film member 631 can prevent the permeate gas from diffusing and enables the permeate gas to flow along the direction opposite to the direction of feeding a mixed gas. Thus, gas separation efficiency can be improved.

The inventions according to section E are as follows.

[1] A gas separation membrane module comprising;
a hollow fiber bundle as a collection of a number of hollow fiber membrane with gas separation ability,
a casing having a mixed gas inlet, a permeate gas outlet and a non-permeate gas outlet, in which said hollow fiber bundle is disposed, and
two tube sheets for fixing both ends of said hollow fiber bundle,
in which mixed gas from said mixed gas inlet is fed into said hollow fiber membrane, while the mixed gas partly permeates the membrane, to achieve gas separation,
wherein,
(i) a structure for feeding purge gas is not provided, said purge gas is for purging permeate gas from hollow fiber membrane, and
(ii) the module further comprising, a gas-impermeable film member wrapped around the outer surface of said hollow fiber bundle, in which one end substantially abuts on said tube sheet in the downstream side along the mixed-gas feeding direction, whereas the other end is disposed away from the tube sheet in the upstream side in the mixed-gas feeding direction.

[2] The gas separation membrane module as described in [1], wherein said one end of the film member is configured not to be inserted into said tube sheet.

[3] The gas separation membrane module as described in [1] or [2], wherein said permeate gas outlet is formed in a part of said casing, the part surrounding an exposed area of said hollow fiber bundle where the bundle is not covered by said film member.

[4] The gas separation membrane module as described in any of [1] to [3], wherein said film member covers 50% to 95% of the outer surface of said hollow fiber bundle in the region between the one tube sheet and the other tube sheet.

[5] The gas separation membrane module as described in any of [1] to [4], wherein said film member is made of polyimide.

Section F: Gas Separation Membrane Module in which Gas Leakage from Agar, Between a Film End and a Tube Sheet is Prevented Technical Field The invention in this section relates to a gas separation membrane module for gas separation using hollow fiber membranes, in particular, to a bore feed type gas separation membrane module which can prevent gas leakage from a gap between a film end and a tube sheet to achieve more efficient gas separation.

Background Art

A hollow fiber type gas separation membrane module generally has a hollow fiber element having a hollow fiber bundle including a number of hollow fiber membranes with selective permeability and a hollow casing housing the element. Both ends or one end of the hollow fiber bundle in the hollow fiber element are fixed by a resin-cured plate (tube sheet). The casing has a mixed gas inlet, a permeate gas outlet and a non-permeate gas outlet.

For the purpose of efficient gas separation, for example, Japanese published unexamined application No. 2000-262838 discloses a gas separation membrane as a so-called bore feed type module in which a mixed gas is fed into hollow fiber membranes, wherein a part of the hollow fiber bundle is covered by a film member and carrier gas outside of the hollow fiber membranes and the mixed gas in side of the membranes flow countercurrently.

In the above gas separation membrane module in the reference document, the flow direction of the carrier gas can be regulated to achieve more efficient gas separation, however, it is important to improve an efficiency of gas separation even in a module without using carrier gas (purge gas). To improve the efficient of gas separation, it is effective to prevent gas from leaking through the gap between the film end and the tube sheet (detailed later) whether purge gas is used or not.

In view of the above problem, an objective of this section is to provide a bore type gas separation membrane module capable of separating gases by preventing gas leakage from a gap between a film end and a tube sheet.

The summary of the main invention disclosed in this section is as follows.

[1] A gas separation membrane module comprising;
a hollow fiber bundle as a collection of a number of hollow fiber membrane with gas separation ability,
a casing having a mixed gas inlet, a permeate gas outlet and a non-permeate gas outlet, in which said hollow fiber bundle is disposed, and
two tube sheets for fixing both ends of said hollow fiber bundle,
a gas-impermeable (including substantially gas-impermeable) film member wrapped around the outer surface of said hollow fiber bundle, in which one end substantially abuts on said tube sheet in the downstream side along the mixed-gas feeding direction, whereas the other end is disposed away from said tube sheet in the upstream side in the mixed-gas feeding direction, and
a sealing structure sealing a gap between said one end of the film member and said tube sheet.

According to the invention in this section, there can be provided a bore type gas separation membrane module capable of separating gases by preventing gas leakage from a gap between a film end and a tube sheet.

Embodiments in Section F

Figure 21:
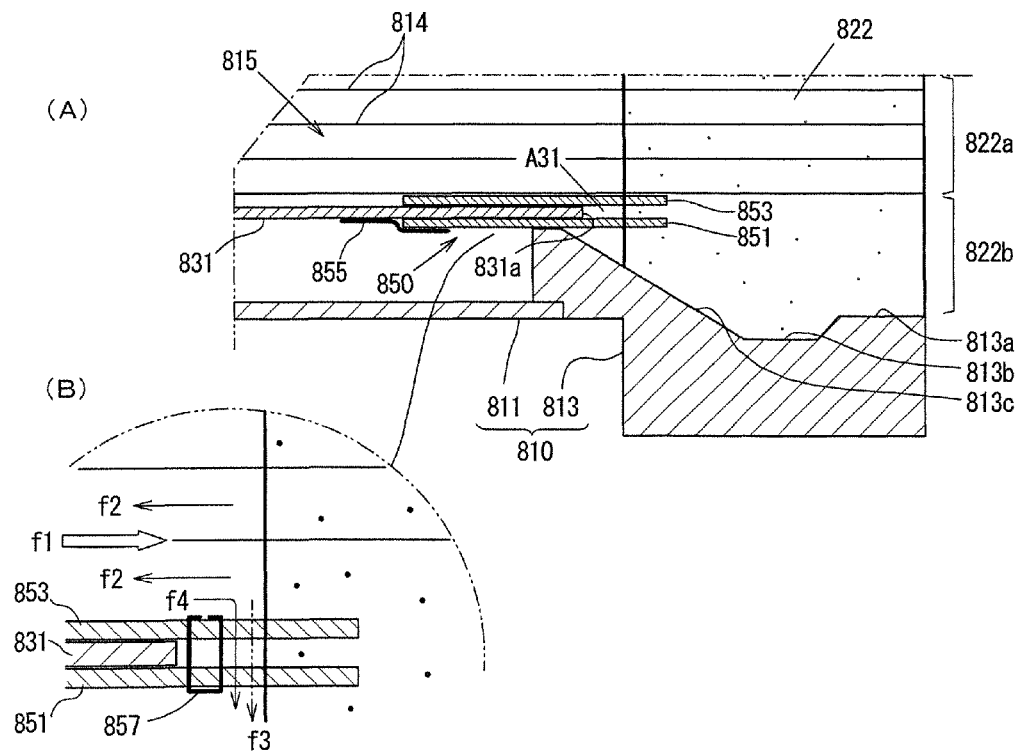
FIG. 21(A) is an enlarged partial view of FIG. 20
FIG. 21(B) is an enlarged view further showing a part of the figure.

There will be described one embodiment of the invention in this section with reference to the drawings. FIG. 21 shows the shape of a casing (detailed later) more specifically as an example.

A gas separation membrane module (hereinafter, simply referred to as "module") 801 shown in FIGS. 20 and 21 has a hollow fiber bundle 815 as a collection of a number of hollow fiber membranes 814, a casing 810 housing the bundle, and tube sheets 821, 822 at the ends of the hollow fiber bundle 815. This module 801 is of a so-called bore feed type, where the mixed gas (source gas) is fed into the hollow fiber membrane 814.

The hollow fiber membrane 814 can be made of any of known structure as long as it has gas separation ability. For example, it is suitably made of polymer material, which is glassy at normal temperature (23° C.) such as, in particular, polyimide, polysulfone, polyetherimide, polyphenylene oxide and polycarbonate for the gas separation ability.

The hollow fiber bundle 815 can be, for example, a collection of about 100 to 1,000,000 hollow fiber membranes 814. There are no particular restrictions to the shape of the collected hollow fiber bundle 815, however, a cylindrical shape is preferable in the light of easiness in production and pressure resistance of a vessel. Although FIG. 20 shows an embodiment in which hollow fiber membranes 814 are disposed substantially in parallel, these hollow fiber membranes can be cross-arranged.

There are no particular restrictions to a mixed gas to be subjected to separation by the hollow fiber membrane 814, however it can be, for example, a mixed gas of a more permeable gas and a less permeable gas with a ratio of permeation rates to a separation membrane of 2 or more. The gas separation membrane module 801 of this embodiment can be use for separating a particular gas component from a mixed gas in various manners. For example, it can be used for drying a variety of gases, humidification of a variety of gases, nitrogen enrichment or oxygen enrichment.

The tube sheets 821, 822 are formed substantially as a disc-shape in response to the shape of the casing 810, and fix the end of the hollow fiber bundle 815 with each hollow fiber membrane 814 opened. The tube sheets 821, 822 can be made of a thermoplastic resin such as polyethylene and polypropylene or a thermosetting resin such as an epoxy resin and a urethane resin. The tube sheets 821, 822 have a function of bundling the hollow fiber membranes 814 together. It also has a function of sealing between the hollow fiber membranes 814 as well as between the hollow fiber bundle 815 and the inner surface of the casing 810. As shown in FIG. 20, a closed space 818 (as described later, having a permeate gas outlet 810c) is formed by the casing 810 and two tube sheets 821 and 822, the permeate gas from the hollow fiber membrane 814 is to be introduced into the closed space 818. A mixed gas space 819a is formed by the casing 810 and the tube sheet 821, whereas a non-permeate gas space 819b is formed by the casing 810 and the tube sheet 822. Another sealing means can be used for sealing between the tube sheets 821, 822 and the inner surface of the casing 810.

For a nitrogen membrane module, the epoxy resin for example described in Japanese published examined application No. 1990-36287 can be used for the tube sheet 821, 822, whereas for an organic-vapor separation module the epoxy resin for example described in WO 2009/044711 can be used. The epoxy resin as disclosed in section B can also be used for a tube sheet in the module of this section The casing 810 is substantially cylindrical as a whole as shown in FIG. 20. The casing 810 has a mixed gas inlet 810a for introducing a mixed gas into the casing 810 in the upstream side (left side in the figure), a non-permeate gas outlet 810b in the downstream side (right side in the figure) and a permeate gas outlet 810c in its side wall. The number of the permeate gas outlet 810c can be one or two or more. The permeate gas outlets 810c can be disposed at regular intervals along the side wall of the casing 810. The permeate gas outlet 810c in this example is formed at the position near the upstream tube sheet 821 (specifically, the position of exposed part A1 in the hollow fiber bundle 815 without a film member 831 described later).

The mixed gas introduced from the mixed gas inlet 810a is fed into each hollow fiber membrane 814 from the end face of the tube sheet 821, and flows downstream in the inside of the membrane. A part of the mixed gas permeates the hollow fiber membrane 814, and the permeate gas is fed to the inside of the closed space 818 and then discharged from the casing through the permeate gas outlet 810c. On the other hand, a non-permeate gas not permeating the hollow fiber membrane as it is flows downstream in the hollow fiber membrane 814 and flows outward from the end face, and then is discharged out of the casing through the non-permeate gas outlet 810b.

The mixed gas inlet 810a and/or the non-permeate gas outlet 810b can be disposed in such a way that their central axes are aligned with the central axis of the casing 810 (that is, the central axis of the hollow fiber bundle 815). The casing 810 can have a cylindrical member 811 and retaining members 813 for hold the tube sheet at its ends (one is not shown) as in the example in FIG. 21(A). The tubular member 811 and the retaining member 813 can be welded to each other. The inner surface of the retaining member 813 in this example has a straight part 813a with a constant diameter, a large diameter part 813b with a larger diameter than the straight part 813a, and a tapered part 813c with a gradually reduced diameter. The tube sheet 822 has as shown in FIG. 21(A) a hollow-fiber-membrane burying part 822a into which the part of hollow fiber membrane 814 is placed, and a surrounding part 822b in which the hollow fiber membrane 814 does not exist.

Figure 20:
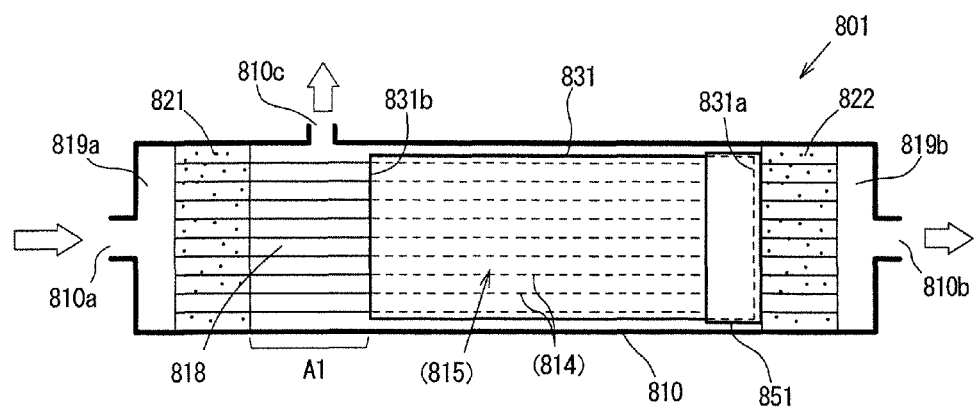
FIG. 20 is a cross-sectional view schematically illustrating a basic configuration of a gas separation membrane module according to one embodiment in section F.

A film member 831 is wrapped around the peripheral surface of the hollow fiber bundle 815 in the gas separation membrane module 801 of this embodiment as shown in FIGS. 20 and 21. One end 831a of the film member 831 (hereinafter, also referred to as "film end 831a") is close to the tube sheet 822, whereas the other end 831b is disposed away from the tube sheet 821 by a predetermined distance. In FIG. 20, the region of hollow fiber bundle 815, which is not covered by the film member 831, is indicated by symbol A1 (exposed part). The film member 831 can cover 50% to 95%, preferably 70% to 92% of the outer surface of the hollow fiber bundle. Alternatively, the member can cover the whole surface of the hollow fiber bundle so that each end of the film member 831 is close to each tube sheet, and the film member 831 can has one or multiple openings in the vicinity of the tube sheet 821.

The film member 831 can be made of any material as long as the material is substantially gas-impermeable. The term "substantially gas-impermeable" means that the gas permeability of the film member 631 is low enough to limit gas flow. For example, it can be a plastic film such as polyimide, polyethylene, polypropylene, polyamide and polyester. Among these, polyimide is preferable in the light of heat resistance, solvent resistance and processability. In addition to a plastic film, a metal foil such as aluminum and stainless steel can be used. A thickness of the film can be in the range of several ten μm to several mm.

The film member 831 can be formed by attaching both side edges of a film to form the cylindrical shape, or the member 631 can be of a seamless tubular member. The edges of the film can be attached for example by adhesive material or tape.

If the tube sheet is epoxy resin and the film end is buried in the tube sheet (e.g. a case in which the film end is inserted into the material and then cured), the tube sheet may be cracked or damaged beginning at the part. To avoid this, the film end is not buried in the tube sheet in this embodiment. In this configuration, however, a gap A31 might be formed between the film end, 831a and the tube sheet 822 as shown in FIG. 21 (for illustrative purposes, the size of the gap A31 is exaggerated).

A sealing structure 850 for sealing the gap A31 between the film end 831a and the tube sheet 822 is provided as shown in FIGS. 20 and 21 in this embodiment. The sealing structure 850 in this example has two cylindrically formed sealing parts 851 and 853 (see FIG. 21), which are disposed on both surfaces of the film to sandwich the film 831a and wrap the hollow fiber bundle 815.

Both sealing parts 851, 853 are made of material into which liquid resin material such as epoxy resin can permeate, that is, the material having a predetermined capillary force. The sealing parts 851, 853 can be made of any material as long as it has such feature, thus for example a mesh member formed by interweaving fibers, such as cloth or net can be used. The fiber can be, for example, a chemical or natural fiber, and a glass fiber or a carbon fiber can be used.

As shown in FIG. 21, the first sealing part 851 is disposed on the outer surface of the film member 831, whereas the second sealing part 853 is disposed on the inner surface of the film member 831. Each of the sealing parts 851, 853 is disposed such that it extends from the film end 831a toward the side of the tube sheet 822. A part of the extension of each of the sealing parts 851, 853 is buried in the intact part 822b in the tube sheet 822.

A fixing tape 855 is attached to the sealing part 851 to fix the part 851 to the film member 831 as shown in FIG. 21(A). The fixing tape 855 can be applied for example such that it surrounds the outer circumference of the hollow fiber bundle 815. The fixing tape 855 can also be wrapped around the fixing tape 855 twice or more. Instead, the tape 855 can be applied only on a part of the outer circumference.

An overlap portion of the sealing parts 851, 853 can be fixed to each other by a fixture 857 as shown in FIG. 21(B). The fixture 857 can be a mechanism for mechanically fixing both members, such as staple(s). In addition, for example, yarn or wire can be employed.

The sealing parts 851, 853 work to prevent leakage of a permeate gas from the gap A31 as described later. To prevent the leakage more effectively, at least some area of the sealing parts 851 and 853, which is to face the gap A31, can be permeated with cured resin material. Such a configuration can provide the sealing parts 851, 853 with improved gas-impermeable property, resulting in prevention of gas leakage. The configuration can be applied to only one sealing part 851 or 853.

The film member 831 and the sealing structure 850 can be produced for example as follows. The process described below is only an example and the process sequence and the like do not limit the present invention in any manner.

First, the hollow fiber bundle 815 and the casing (for example, that in FIG. 21) are prepared. The single film member 831 formed in a predetermined size is also prepared. The sealing parts 851, 853 are then put on both side of the film edge such that the region near the end 831a is sandwiched. The overlap portions of the sealing parts 851, 853 is fixed by a stapler (one example).

Next, the film member 831 in the above state is wrapped around the hollow fiber bundle 815 and then fixed to each other by a tape (not shown). Then, the hollow fiber bundle 815 is positioned at a predetermined position in the casing 810, and the tube sheets 821, 822 are formed at the ends of the hollow fiber bundle 815. The tube sheets 821, 822 can be formed by filling the end of the hollow fiber bundle 815 with an epoxy material and then curing the material.

A specific embodiment will be described with reference to the example in FIG. 21. The filling of the epoxy material can be conducted, for example, while the casing 810 for the hollow fiber bundle 815 is supported in a vertical direction, with a mold (not shown) attached to the lower end of the casing. During this process, the surface level of the epoxy material to be applied is controlled such that the ends of the sealing parts 851, 853 are buried in the tube sheet 822 as shown in FIG. 21(A), whereas the end 831a is not buried. Once the ends of the sealing parts 851, 853 are immersed in the epoxy material, the epoxy material infiltrates into the sealing parts 851, 853 (a region including at least a part facing the gap A31) by the capillary force.

Then, the tube sheet material is cured, and the cured tube sheet 822 is cut at a predetermined position to open the hollow fiber membrane 814. Subsequently, a conventional assembling (for example, a process for producing the casing 810) is conducted to form a module if necessary.

The film member 831 and the sealing parts 851, 853 can be disposed in the following order. First, the second sealing part 853 is wrapped on the hollow fiber bundle 815, then the film member 831 is wrapped, and the first sealing part 851 is wrapped.

There will be described an example of the used of the separation membrane module of this embodiment having the above configuration. The method for using a module according to this embodiment is not limited to the following.

First, the mixed gas is introduced into the mixed gas space 819a in the casing 810 via the mixed gas inlet 810a. The introduced mixed gas is fed into each hollow fiber membrane 814 from the end face of the tube sheet 821 and flows downstream in the inside. It is preferable that the pressure in the hollow fiber membrane 814 is higher than a pressure in the closed space 818; for example, it is suitable to feed a mixed gas at a pressure of 0.01 MPaG to 10 MPaG, and to vacuum the closed space, for example. During this operation, a part of the mixed gas selectively permeates the hollow fiber membrane 814 and is discharged to the closed space 818 outside of the hollow fiber membrane 814. On the other hand, a non-permeate gas as it is flows downstream in the hollow fiber membrane 814 and discharged from the downstream end face to the non-permeate gas space 819b outside of the hollow fiber membrane 814.

If the module does not have the film member 831, the permeate gas from the hollow fiber membrane 814 flows along a cross-flow direction (that is, a direction crossing the hollow fiber membrane 814). Alternatively, the gas flows along f4 direction, which includes the opposite direction relative to f2, that is, in a parallel flow direction, and finally f3 as shown by an arrow f3 in FIG. 21(B). On the other hand, according to this embodiment, since the film member 831 is wrapped on the hollow fiber bundle 815, dissipation of a permeate gas is prevented and the permeate gas flows in a direction of an arrow f2, that is, a countercurrent direction to the direction of mixed gas feeding f1, resulting in an improved efficiency of gas separation. In particular, this embodiment has the sealing structure 850 for sealing the gap A31, therefore leakage of the permeate gas through this gap A31 is prevented. Accordingly, dissipation of the permeate gas can be reliably prevented and gas separation can be more efficiently conducted.

Leakage of the permeate gas can be also prevented by a structure in which the film end 831a is directly buried in the tube sheet 822, but it may cause cracks or breakage beginning the area near the film end 831a in the tube sheet 822. In contrast, since the sealing parts 851, 853 as a separate member from the film member 831 are buried in this embodiment, such cracks and breakage in the tube sheet 822 can be prevented by appropriately selecting a material for the sealing part.

As described above, even when the sealing parts 851, 853 are made of a mesh material the leakage of the permeate gas can be prevented compared with configuration with no sealing part. However, according to this embodiment, leakage of a permeate gas can be more reliably prevented, since a resin material infiltrates into the sealing parts 851, 853 and cured therein.

Other Embodiments

Although one embodiment of the invention in this section has been described, the invention in this section is not limited to the above embodiment, but various changes can be made.

For example, the module can have only one of the first and the second sealing parts 851, 853. Alternatively, the fixing tape 855 for fixing the first sealing part 851 to the film member 831 can be omitted. Furthermore, the fixture 857 for fixing the overlap of two sealing parts 851, 853 (see FIG. 21(B)) can be omitted.

Figure 22:
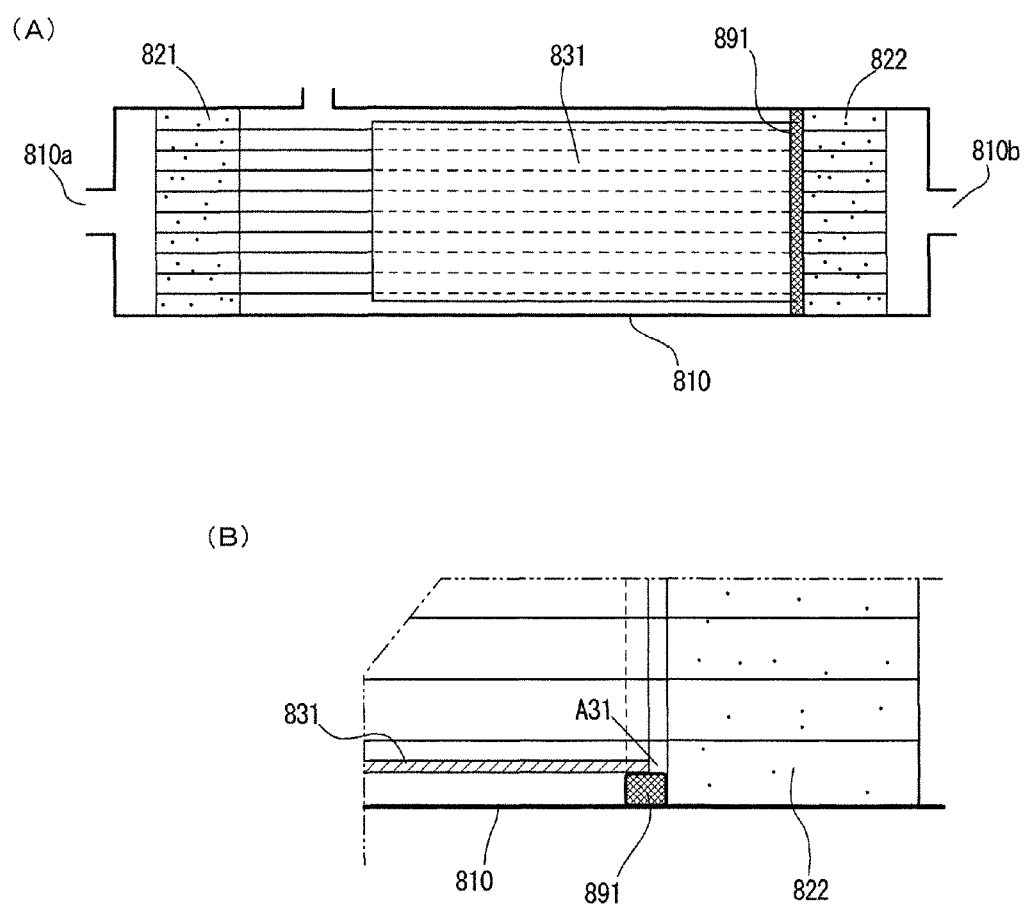
FIG. 22(A) is a cross-sectional view showing a gas separation membrane module according to another embodiment and FIG. 22(B) is an enlarged partial view.

FIG. 22 shows another sealing structure; FIG. 22(A) is a schematic cross-sectional view of the whole module and FIG. 22(B) is an enlarged partial view of the figure. In this example, filler 891 is illustrated disposed such that it fills a gap A31 between a film member 831 and a tube sheet 822. The filler 891 can be resin material such as heat-resisting silicone injected such that it surrounds the film member 831. Such a filler 891 can also prevent the permeate gas from leaking from the gap A31, consequently, a module capable of conducting efficient gas separation can be obtained. The filler 891 can be formed by processes such as forming one or multiple holes on the side wall of the casing after forming the tube sheet 822 in the casing, and then injecting the filler 891 and curing the filler.

Figure 23:
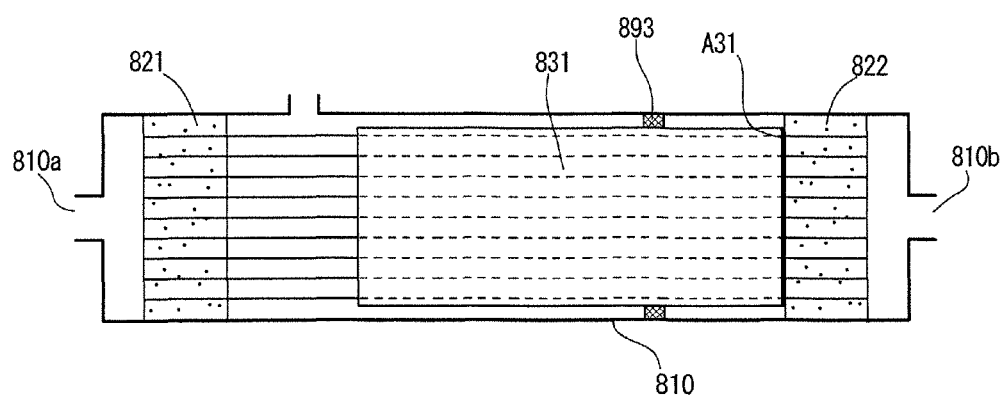
FIG. 23 is a cross-sectional view showing a gas separation membrane module according to a further embodiment.

Position for placing the filter 891 is not limited to the position shown in FIG. 22. For example, the filler 893 can be disposed at a position away from the gap A31 by a predetermined distance, between the film member 831 and the casing 810 as shown in FIG. 23. The filler 893 can be disposed at one position in the longitudinal direction of the film member 831 as shown in FIG. 23. Such a filler 893 can be disposed around the periphery of the film member 831 to thereby block gas flow, and its width can be for example about 3 mm to 5 mm (for example, 0.5% of the outer surface of the film) or more.

Alternatively, filler surrounding the periphery of the film member 831 can be formed over further wider (longer) region to fill the gap between the film member 831 and the casing 810; for example, 10% or more of the outer surface of the film member can be covered with the filler.

Figure 24:
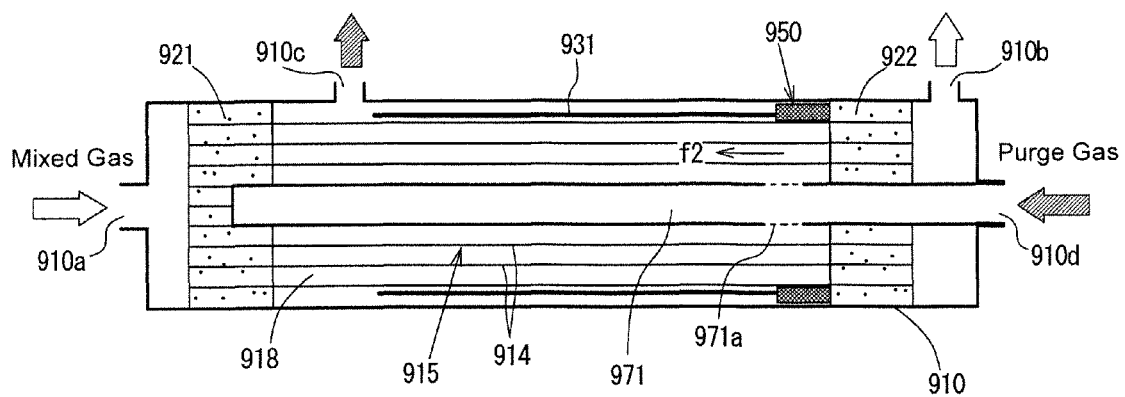
FIG. 24 is a cross-sectional view showing a gas separation membrane module according to another embodiment.

A gas separation membrane module of the invention in this section can have a structure for allowing a purge gas to flow as shown in FIG. 24. This gas separation membrane module has a hollow fiber bundle 915, a casing 910, two tube sheets 921, 922 for fixing the ends of the hollow fiber bundle 915, a gas-impermeable film member 931 wrapped on the outer surface of the hollow fiber bundle and a sealing structure 950 for sealing a gap between the end of the film member 931 and the tube sheet 922. This gas separation membrane module further has a core tube 971 for feeding a purge gas.

The casing 910 has a mixed gas inlet 910a in the upstream side (left side in the figure) and a permeate gas outlet 910c in the sidewall as in the module in FIG. 20. The structure in the downstream side from the tube sheet 922 is slightly different from the module in FIG. 20, that is, a non-permeate gas outlet 910b is formed in the side wall of the casing 910 and a core tube 971 is inserted in the center of the casing 910.

The core tube 971 is a member in which one of the ends is closed whereas the other is open, and the tube is disposed along a direction that the opening is downstream (the side of the tube sheet 922). The core tube 971 extends penetrating the tube sheet 922 and its tip is buried in the tube sheet 921 in the upstream side. The core tube 971 has hole(s) 971a in a region between two tube sheets 921, 922.

The principle for gas separation principle in the module is basically the same as that shown in FIG. 20. A purge gas is fed from the opening (purge gas inlet 910d) into the core tube 971, and the purge gas is discharged into the closed space 918 in the casing 910 via the hole 971a. The purge gas flows along the direction of f2 (a countercurrent direction to the direction of feeding a mixed gas) among the hollow fiber membranes 914, and then the purge gas pushes the permeate gas discharged into the space towards the permeate gas outlet 910c, which accelerates discharge of the permeate gas.

It is also preferable that in such a module utilizing a purge gas, a sealing structure 950 for sealing a gap between the film member 931 and the tube sheet 922 is formed. The sealing structure 950 can be any of various structures described above. Thus, leakage of the permeate gas and purge gas from the gap can be prevented, and then the permeate gas and purge gas can smoothly flow in the f2 direction, as a result, more efficient gas separation is accomplished.

The summary of the main invention disclosed in section F is as follows.

[1] A gas separation membrane module comprising;

a hollow fiber bundle as a collection of a number of hollow fiber membrane with gas separation ability, a casing having a mixed gas inlet, a permeate gas outlet and a non-permeate gas outlet, in which said hollow fiber bundle is disposed, and two tube sheets for fixing both ends of said hollow fiber bundle, a gas-impermeable (including substantially gas-impermeable) film member wrapped around the outer surface of said hollow fiber bundle, in which one end substantially abuts on said tube sheet in the downstream side along the mixed-gas feeding direction, whereas the other end is disposed away from said tube sheet in the upstream side in the mixed-gas feeding direction, and a sealing structure sealing a gap between said one end of the film member and said tube sheet.

[2] The gas separation membrane module as described in [1], wherein said sealing structure comprises;

a sealing part wrapped on the inside or the outside in a radial direction of said film member at said one end of said film member, the sealing part extending from said end toward said tube sheet, a part of the extending portion is buried in said tube sheet.

[3] The gas separation membrane module as described in [2], comprising, as said sealing part, the first sealing part made of a member, into which liquid resin material can permeate, which is wrapped on the outside in the radial direction of said film member, and the second sealing part made of a material, into which liquid resin material can permeate, which is wrapped on the inside in the radial direction of said film member.

[4] The gas separation membrane module as described in [2] or [3], wherein said sealing part is a mesh member.

[5] The gas separation membrane module as described in [3] or [4], wherein in at least a region facing said gap of said sealing parts, a resin material permeates and is cured to seal said gap.

[6] The gas separation membrane module as described in [3], wherein said sealing structure further comprises a fixing tape for fixing said first sealing part to said film member.

[7] The gas separation membrane module as described in [3], wherein said sealing structure further comprises a fixture for securing an extending portion of said first sealing part extending from said one end of the film member to an extending portion of said second sealing part extending from said one end of the film member.

[8] The gas separation membrane module as described in [1], wherein said sealing structure comprises a filler disposed such that the filler fills said gap between said one end of the film member and said tube sheet.

[9] The gas separation membrane module as described in any of [1] to [8], wherein extending portion of said one end of the film member is configured to not to be inserted into said tube sheet.

[10] The gas separation membrane module as described in any of [1] to [9], wherein said film member is made of polyimide.

Section G: Gas Separation Membrane Module Ensuring Adequate Sealing Performance Near a Tube Sheet Technical Field This invention relates to a gas separation membrane module for gas separation using a hollow fiber membrane, in particular, to a gas separation membrane module which ensures adequate sealing in the vicinity of a tube sheet and therefore it can be used at high temperature satisfactorily, even when a tube sheet material relatively susceptible to cure shrinkage is used Background Art A hollow fiber type gas separation membrane module generally has a hollow fiber element including a hollow fiber bundle comprising a number of hollow fiber membranes with selective permeability and a hollow casing housing the element. The hollow fiber bundle is fixed at its one or two ends by a resin cured plate (tube sheet).

A gas separation membrane generally has a larger gas permeation rate at a higher temperature and a higher pressure of a supplied gas. Therefore, when using the gas separation membrane module, it may be considered that the source gas is compressed by for example a compressor before being fed to the module. In some cases, the compressed gas may be warmed to about 149° C. to 260° C.

It is necessary to use heat-resistant tube sheet material in such modules for separating high-temperature mixed gas as described above. However, such tube sheet material is generally susceptible to cure shrinkage during its curing, thus there may be a problem such as inadequate performance of sealing around the tube sheet. In view of the problem, an objective of the invention in this section is to provide a separation membrane module and so on which ensures adequate sealing performance in the vicinity of the tube sheet and therefore it can be used at high temperature satisfactorily, even when a tube sheet material relatively susceptible to cure shrinkage is used and furthermore The summary of the main invention disclosed in this section is as follows.

A gas separation membrane module according to one embodiment of the invention in this section comprises;

a hollow fiber bundle as a collection of a number of hollow fiber membranes with gas separation ability, a casing housing said hollow fiber bundle, and a tube sheet for fixing at least one end of said hollow fiber bundle, wherein the outer surface of said tube sheet does not contact the inner surface of said casing, further comprising a sealing member for sealing between the outer surface of said tube sheet and the inner surface of said casing.

A process for manufacturing a gas separation membrane module according to one embodiment of the invention in this section is a process for manufacturing a gas separation membrane module, comprising a hollow fiber bundle as a collection of a number of hollow fiber membranes with gas separation ability, a casing housing said hollow fiber bundle, and a tube sheet for fixing at least one end of said hollow fiber bundle, comprising applying a mold release to at least a part which is to be in contact with said tube sheet in the inner surface of said casing, filling a thermosetting resin in a part of said casing, curing said thermosetting resin to form said tube sheet, and forming, after said curing of said thermosetting resin, a sealing member between the outer surface of said tube sheet and the inner circumference surface of said casing.

Definitions of terms used herein are as follows.

The term, "high-temperature condition" or "high temperature" means a temperature in the range of, for example, 80° C. to 300° C.

The term, "cylindrical vessel" is not limited to those in which both ends are open, but includes those in which only one end is open.

According to the invention in this section, there is provided a gas separation membrane module which ensures adequate sealing in the vicinity of the tube sheet even when the tube sheet material relatively susceptible to cure shrinkage is used and furthermore which can be satisfactorily used at high temperature.

Embodiments in Section G

Figure 25:
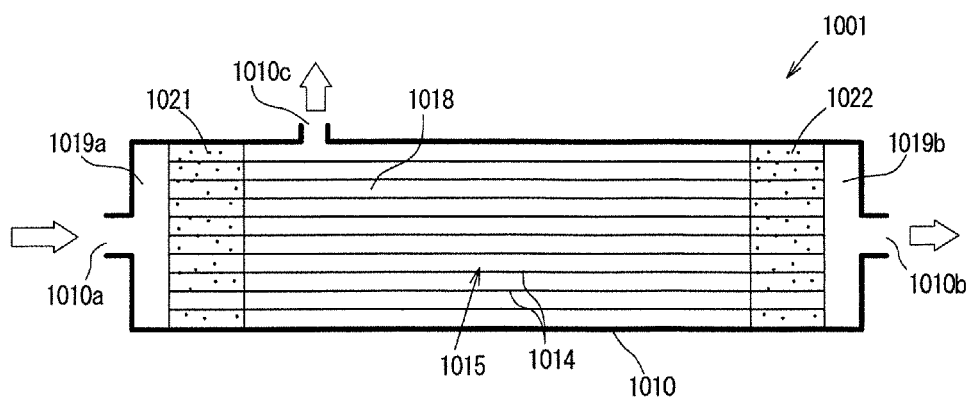
FIG. 25 is a cross-sectional view schematically showing a basic configuration of a gas separation membrane module according to one embodiment in section G.

There will be described one embodiment of the invention in this section with reference to the drawings. FIG. 25 more specifically shows the shape of a casing (detailed later) as an example. The configurations described below are merely examples and a gas separation membrane module of the present invention is not limited to these configurations.

A gas separation membrane module (hereinafter, simply referred to as "module") 1001 shown in FIGS. 25 and 26 has a hollow fiber bundle 1015 as a collection of a number of hollow fiber membranes 1014, a casing 1010 housing the bundle and tube sheets 1021, 1022 at the ends of the hollow fiber bundle 1015. This module 1001 is, for example, of a so-called bore feed type where a mixed gas (source gas) is fed into the hollow fiber membrane 1014.

The hollow fiber membrane 1014 can be made of any of known structure as long as it has gas separation ability. For example, it is suitably made of polymer material, which is glassy at normal temperature (23° C.) such as, in particular, polyimide, polysulfone, polyetherimide, polyphenylene oxide and polycarbonate for the gas separation ability.

The hollow fiber bundle 1015 can be, for example, a collection of about 100 to 1,000,000 hollow fiber membranes 1014. There are no particular restrictions to the shape of the collected hollow fiber bundle 1015, but for example, a cylindrical shape is preferable in the light of easiness in production and pressure resistance of a vessel. FIG. 25 shows an embodiment in which hollow fiber membranes 1014 are disposed substantially in parallel, however, these hollow fiber membranes can be cross-arranged.

There are no particular restrictions to a mixed gas to be subjected to separation by the hollow fiber membrane 1014, but it can be, for example, a mixed gas of a more permeable gas and a less permeable gas with a ratio of permeation rates to a separation membrane of 2 or more. The gas separation membrane module 1001 of this embodiment can be use for separating a particular gas component from a mixed gas in various manners. For example, it can be used for drying a variety of gases, humidification of a variety of gases, nitrogen enrichment or oxygen enrichment.

The tube sheets 1021, 1022 are formed substantially as a disc-shape (detailed later) in response to the shape of the casing 1010, and fix the end of the hollow fiber bundle 1015, with each hollow fiber membrane 1014 opened. In this example, the tube sheet works as a sealer between the hollow fiber membranes. The tube sheet can be made of a thermoplastic resin such as polyethylene and polypropylene or a thermosetting resin such as an epoxy resin and an urethane resin. There will be described a case in which a tube sheet is made of a thermosetting resin.

For a nitrogen membrane module, the epoxy resin for example described in Japanese published examined application No. 1990-36287 can be used for the tube sheet 1021, 1022, whereas for an organic-vapor separation module the epoxy resin for example described in WO 2009/044711 can be used The epoxy resin as disclosed in section B can also be used for a tube sheet in the module of this section.

A closed space 1018 (having a permeate gas outlet 1010*c* as described below) is formed by the casing 1010 and the two tube sheets 1021, 1022 as shown in FIG. 25 in this embodiment. The permeate gas permeating the hollow fiber membrane 1014 is introduced into this closed space 1018. A mixed gas space 1019*a* is formed by the casing 1010 and the tube sheet 1021, whereas a non-permeate gas space 1019*b* is formed by the casing 1010 and the tube sheet 1022.

As shown in FIG. 25, the casing 1010 is substantially cylindrical as a whole. The casing 1010 has a mixed gas inlet 1010*a* for introducing a mixed gas into the casing 1010 in the upstream side (left side in the figure), a non-permeate gas outlet 1010*b* in the downstream side (right side in the figure) and a permeate gas outlet 1010*c* in its side wall. The number of the permeate gas outlet 1010*c* can be one or two or more. The permeate gas outlets 1010*c* can be disposed at regular intervals along the side wall of the casing 1010.

The mixed gas introduced from the mixed gas inlet 1010*a* enters into each hollow fiber membrane 1014 from the end face of the tube sheet 1021 and flows downstream in the inside. A part of the mixed gas permeates the hollow fiber membrane 1014, and the permeate gas is fed to the inside of the closed space 1018 and then discharged from the casing through the permeate gas outlet 1010*c*. On the other hand, a non-permeate gas not permeating the hollow fiber membrane as it is flows downstream in the hollow fiber membrane 1014 and flows outward from the end face, and then is discharged out of the casing through the non-permeate gas outlet 1010*b*.

The mixed gas inlet 1010*a* and/or the non-permeate gas outlet 1010*b* can be disposed in such a way that their central axes are aligned with the central axis of the casing 1010 (that is, the central axis of the hollow fiber bundle 1015). The casing 1010 can have a cylindrical member 1011 and cap members 1012 at its ends as in the example in FIG. 26 (the other is not shown). The cylindrical member 1011 and the capping member 1012 can be, for example, made of a metal.

Specifically, the cylindrical member 1011 is a hollow member with an inner diameter of $d_0$, and has thick wall portions 1011*a*, 1011*b* near its end. The first thick wall portion 1011*a* is formed near the end face of the cylindrical member 1011, and has an inner diameter shorter than the inner diameter $d_0$. The second thick wall portion 1011*b* is formed in an inner area in an axial direction than the first thick wall portion 1011*a*, and has an inner diameter shorter than the inner diameter $d_0$. An inner diameter of a portion between the thick wall portion 1011*a* and 1011*b* is longer than an inner diameter of both thick wall portions 1011*a*, 1011*b*; for example it can be $d_0$.

Corresponding to the structure of the cylindrical member 1011, the tube sheet 1021 is formed in the following shape. The tube sheet 1021 includes generally three parts with different diameters (starting from the outer side, the first part 1021*a*, the second part 1021*b* and the third part 1021*c*) as shown in FIG. 26. Among these parts, the middle part 1021*b* has the largest diameter. In this example, the boundary between the first part 1021*a* and the second part 1021*b* is a tapered face. The boundary between the second part 1021*b* and the third part 1021*c* is a straight face (the face extending in a direction orthogonal to the central axis of the cylindrical member).

When the separation membrane module 1001 is used, a pressure of a mixed gas applies a force to the tube sheet 1021 in a direction that the tube sheet is pushed into the cylindrical member 1011. However, according to the configuration as shown in FIG. 26, a part of the tube sheet 1021 can abut on the thick wall portion 1011*b* to restrict movement of the tube sheet 1021, so that the tube sheet 1021 is not moved into the inside.

There can be, but not limited to, an R-shape on the corner 1021*f* between the second part 1021*b* and the third part 1021*c* in the tube sheet. Thus, stress concentration can be relaxed in this part, so that breakage of the tube sheet and so on can be prevented.

Figure 26:
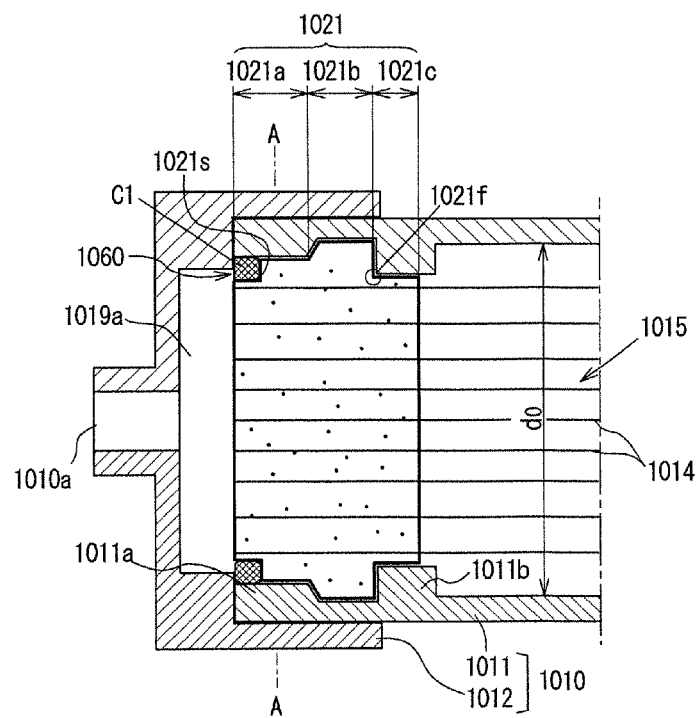
FIG. 26 is an enlarged partial view of FIG. 25.

The example in FIG. 26 shows the state where the tube sheet 1021 is a thermosetting resin and the tube sheet 1021 has a slightly reduced diameter due to cure shrinkage. In this configuration, sealing between the tube sheet 1021 and the cylindrical member 1011 may not be ensured. Therefore, an annular sealing member 1060 for sealing between these members is provided with the module in this embodiment.

An annular step 1021*s* is formed in the outer circumference of the first part 1021*a* of the tube sheet as shown in FIG. 26. An annular concave groove C1 as a whole is formed by the cooperation of the step 1021*s* and the inner surface of the cylindrical member 1011. An annular sealing member 1060 is disposed in the concave groove C1.

The sealing member 1060 is an annular component made of elastics members, which can be fitted into the concave groove C1 (for example, an O-ring). Alternatively, a resin material for sealing can be injected into the concave groove C1 and cured therein, to form the sealing member. The O-ring can have a circular or elliptic cross-sectional shape. Examples of an "annular part consisting of elastic members" can, in addition to an O-ring, include a V- or U-packing having a substantially V- or U-shaped cross section, respectively. Furthermore, its cross section can be rectangular, polygonal or X-shaped. The sealing member 1060 seals between the tube sheet 1021 and the casing 1010 as well as between the tube sheet 1021 and the capping member 1012 in the example shown in FIG. 26.

The structure shown in FIG. 26 is merely an example, which does not limit this invention in any manner. For example, the first part 1021*a* and the third part 1021*c* in the tube sheet can have the same diameter. Alternatively, a tube sheet having the first part 1021*a* and the third part 1021*c* can be used. Furthermore, the surface between the first part 1021*a* and the second part 1021*b* can be, not tapered face as shown in FIG. 26, but a straight face. Likewise, the surface between the first part 1021*b* and the third part 1021*c* can be, not a straight face as shown in FIG. 26, but a tapered face. Furthermore, the sealing member 1060 seals between the tube sheet 1021 and the casing 1010 and the capping member 1012 in the above embodiment, however, there can be additional sealing member between the rasing 1010 and the capping member 1012 in addition to the sealing member between the tube sheet 1021 and the casing 1010

Figure 27:
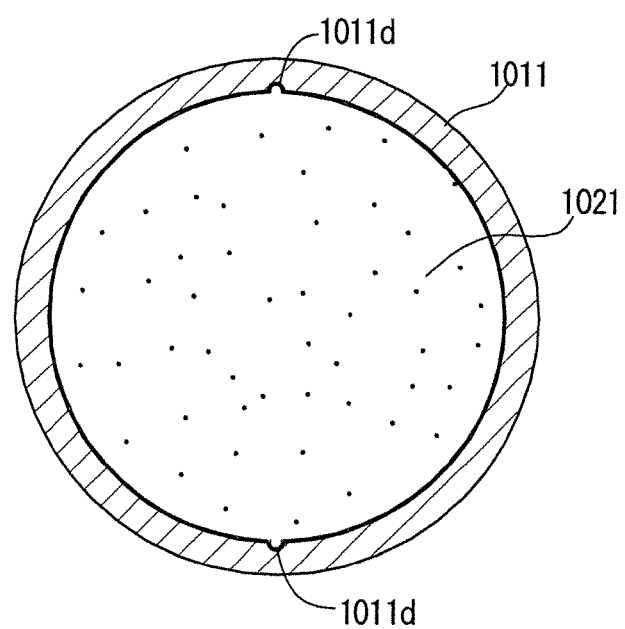
FIG. 27 is a cross-sectional view taken on line A-A of FIG. 26.

FIG. 27 is a cross-sectional view taken on A-A line of FIG. 26. Concave portions 1011*d*, 1011*d* can be formed at two positions on the inner surface of the cylindrical member 1011 as shown in the figure. In this configuration, the material for tube sheet enters the concave parts 1011*d*, 1011*d* and then is cured (detailed below). Consequently, rotation of the tube sheet 1021 can be prevented. There are no particular restrictions to the number of the concave parts 1011d, for example, one, or three or more.

As an example, the following process can be used for producing the gas separation membrane module 1001 having the configuration as described above. Specifically, a production process according to this embodiment including;

(a) applying material for releasing mold to at least a part which is to be in contact with a tube sheet in the inner surface of a casing, (b) injecting thermosetting resin before curing into a part of the casing, (c) curing the injected thermosetting resin to form the tube sheet, and (d) providing an annular sealing member between the outer circumference surface of the tube sheet and the inner surface of the casing after the curing of the thermosetting resin.

By applying the material for releasing mold in step (a), the tube sheet made of for example epoxy resin can be smoothly released from the casing (for example, made of a metal) in the curing of step (c). If it is not used, the tube sheet may not be released in the resin curing step, cracks may be formed in the tube sheet.

In step (b), a not-shown mold can be attached to the end of the cylindrical member 1011 during tube sheet resin is injected. In this process, the mold can has an annular convex part corresponding to the step 1021s in the tube sheet (see FIG. 26) to form the step 1021s in the tube sheet.

In step (d), an annular elastic member such as an O-ring can be fitted into the concave groove C1 as described above, or alternatively some resin can be injected into the concave groove C1 and cured to form the sealing member 1060.

According to the gas separation membrane module 1001 as described above in this embodiment, the separate sealing member 1060 can ensure sufficient sealing between these members, even if cure shrinkage of the tube sheet 1021 may cause insufficient sealing between the outer surface of the tube sheet and the inner surface of the casing, This is particularly advantageous in a gas separation membrane module used at high temperature. That is, generally, material resistant to cure shrinkage tends to be elastic, have a lower glass-transition temperature and be less heat-resistant. On the other hand, tube sheet material with excellent heat resistance tends to be susceptible to cure shrinkage. If such heat-resistant material is used in some structures such as the tube sheet is configured to adhere to the casing, cracks might be formed in the tube sheet due to drawing stress generated by the shrinkage of the tube sheet material. In contrast, according to this embodiment, the material for mold release is applied to the inside of the casing to prevent adhesion of the tube sheet material, whereas the sealing between the tube sheet and the casing is ensured by the annular sealing member. Therefore, there can be provided a gas separation membrane module in which crack formation is prevented in a tube sheet and sealing is adequately ensured.

Although of the tube sheets 1021, 1022, mainly the tube sheet 1021 (FIG. 26) has been described, both tube sheets 1021, 1022 can have the same similar configuration. Alternatively, only one tube sheet can has the structure as shown in FIG. 26. Furthermore, the structures of a tube sheet, an annular sealing member and a casing as in this embodiment can be applied, besides a bore feed type module, a shell feed type module and other types of modules.

The summary of the main invention disclosed in section G is as follows.

[1] A gas separation membrane module according to one embodiment of the invention in this section comprises;

a hollow fiber bundle as a collection of a number of hollow fiber membranes with gas separation ability, a casing housing said hollow fiber bundle, and a tube sheet for fixing at least one end of said hollow fiber bundle, wherein the outer surface of said tube sheet does not contact to the inner circumference surface of said casing, further comprising a sealing member for sealing between the outer surface of said tube sheet and the inner surface of said casing.

[2] The gas separation membrane module as described in [1], wherein said tube sheet has a step for forming an annular concave groove by cooperating with the inner surface of said casing.

[3] The gas separation membrane module as described in [1] or [2], wherein said casing comprises; a tubular member surrounding said hollow fiber bundle and a capping member at the end of the tubular member, said tubular member comprises a thick wall portion partially having shorter inner diameter, the thick wall portion abuts on said tube sheet to prevent movement of said tube sheet in said tubular member toward the inside from an axial direction.

[4] The gas separation membrane module as described in any of [1] to [3], wherein said sealing member is an annular elastic member which is fitted into said annular concave groove.

[5] A process for manufacturing a gas separation membrane module according to one embodiment of the invention in this section is a process for manufacturing a gas separation membrane module, comprising a hollow fiber bundle as a collection of a number of hollow fiber membranes with gas separation ability, a casing housing said hollow fiber bundle, and a tube sheet for fixing at least one end of said hollow fiber bundle, including;

applying material for releasing mold to at least a part which is to be in contact with said tube sheet in the inner surface of said casing, filling thermosetting resin in a part of said casing, curing said thermosetting resin to form said tube sheet, and forming, after said curing of said thermosetting resin, a sealing member between the outer surface of said tube sheet and the inner surface of said casing.

EXAMPLES

Examples Related to Section A

The invention in section A will be further described with reference to examples. The invention in section A is, however, not be limited to the following examples.

Method for Measuring a Glass-Transition Temperature (Tg) of a Hollow Fiber Membrane A glass-transition temperature (Tg) was measured for a sample of 2 mg over a temperature range of room temperature to 400° C. at a rate of 10° C./min under a nitrogen atmosphere using DSC50 device from Shimadzu Corporation in accordance with JIS K7121 "Method for measuring an extrapolated glass transition onset temperature".

Method for Measuring a Shape-Retention Ratio of a Hollow Fiber Membrane

In measurement of a shape-retention ratio, a hollow fiber having a length of 200 mm was placed in a hot air oven at 175° C. for 2 hours, and a length before and after heating were measured. A shape-retention ratio was determined as a proportion of a length after heating to an original length before heating.

2 used an air separation membrane module 2 which is produced using a hollow fiber membrane 2 described below or an air separation membrane module 3 which is produced using a hollow fiber membrane 3.

Table 1 shows data such as properties of each hollow fiber membrane. A glass-transition temperature and a shape-retention ratio were determined as described above.

TABLE 1

| Hollow fiber membrane | Material of a hollow fiber membrane | Outer diameter of a hollow fiber membrane (μm) | Inner diameter of a hollow fiber membrane (μm) | Glass transition temperature (° C.) | Shape retention ratio (%) | $P'_{O2}*^2$ ($\times 10^{-5}$ cm$^3$ (STP)/ cm$^2 \cdot$ sec $\cdot$ cmHg) |
|---|---|---|---|---|---|---|
| 1 | Polyimide | 410 | 280 | 300>*¹ | 99.5 | 9 |
| 2 | Polysulfone | 386 | 200 | 190 | 93 | 4.9 |
| 3 | Polyetherimide | 160 | 95 | 223 | 99 | 4.5 |

*¹The hollow fiber membrane 1 does not have a glass transition temperature at 300° C. or lower and cannot be determined by the method described above.
*²$P'_{O2}$ is an oxygen permeation rate at 40° C.

Method for Measuring a Solution Viscosity

A solution viscosity of a polyimide solution was measured at a temperature of 100° C. using a rotating viscometer (rotor shear rate 1.75 sec$^{-1}$).

Production Example 1

In a separable flask equipped with a stirrer and a nitrogen-gas inlet tube, 200 mmol of 4,4'-(hexafluoroisopropylidene)-bis(phthalic anhydride), 225 mmol of 3,3',4,4'-biphenyl tetracarboxylic dianhydride, 75 mmol of pyromellitic dianhydride, 250 mmol of 2,2',5,5'-tetrachlorobenzidine and 250 mmol of 3,7-diamino-dimethyldibenzothiophene=5,5-dioxide were placed in 1882 g of 4-chlorophenol as a solvent, and the mixture was subjected to polymerization and imidization at a reaction temperature of 190° C. for 20 hours under stirring while nitrogen gas was flowing in the flask, to prepare an aromatic polyimide solution with a polyimide concentration of 17% by weight. This aromatic polyimide solution has a solution viscosity of 1940 poise at 100° C.

The aromatic polyimide solution thus prepared was filtered through a 400 mesh woven wire. Using the solution as a dope solution and a spinning apparatus equipped with a nozzle for hollow-fiber spinning, the dope solution was discharged from a circular opening of the nozzle for hollow-fiber spinning (an outer diameter of the circular opening: 1000 μm, a slit width of the circular opening: 200 μm, an outer diameter of the core opening: 400 μm) while nitrogen gas was fed from the core opening, to form a hollow fiber form, which was then carried under a nitrogen atmosphere, immersed in a coagulation liquid to be solidified, and taken by a take-up roll to provide a wet hollow fiber membrane. Then, this hollow fiber membrane was dried and further heated at 250° C. for 30 min to give a hollow fiber membrane 1.

The hollow fiber membrane 1 thus prepared generally had an outer diameter of 410 μm and an inner diameter of 280 μm. A fiber bundle element was formed from the hollow fiber membranes and further a gas separation membrane module was formed from each fiber bundle element comprising the hollow fiber membranes.

Examples 1, 2 used an air separation membrane module 1 which is produced using the hollow fiber membranes 1 prepared as described above, and Comparative Examples 1, Table 2 shows the specification of each air separation membrane module.

TABLE 2

| Air separation membrane module | Inner diameter of a vessel (mm) | Effective length (mm) | Number of fibers in a module | Membrane area (m$^2$) |
|---|---|---|---|---|
| 1 | 40 | 249 | 3500 | 1.12 |
| 2 | 40 | 496 | 3800 | 2.28 |
| 3 | 40 | 223 | 18000 | 2.02 |

Example 1 of Section A

An air at 175° C. and a pressure of 0.2 MPaG was fed to the air separation membrane module 1, regulating the air-feed rate such that an oxygen gas concentration in a non-permeate gas, that is, a nitrogen-rich air, was 12%, and the process continuously proceeded under these conditions. At predetermined elapsed times from the beginning of the operation, a flow rate of the nitrogen-rich air produced was measured. The measurement results are shown in FIG. 1. From the measurement results, an oxygen permeation rate ($P'_{O2}$) of the air separation membrane and a ratio of an oxygen-gas permeation rate to a nitrogen-gas permeation rate ($P'_{O2}/P'_{N2}$) as an index of separation performance were calculated at 0, 140 and 2069 hours after the beginning of the operation. The results are shown in Table 3.

At the beginning of the operation (0 hr), $P'_{O2}$ was 35.4× $10^{-5}$ cm$^3$ (STP)/cm$^2$·sec·cmHg and a flow rate of the nitrogen-rich air produced from the air separation membrane module 1 was 0.748 Nm$^3$/h. At 140 hrs after the beginning of the operation, $P'_{O2}$ was 33.4×10$^{-5}$ cm$^3$ (STP)/ cm$^2$·sec·cmHg which was lower only by 5.6% from the beginning of the operation. At 2069 hrs after the beginning of the operation, $P'_{O2}$ was 31.4×10$^5$ cm$^3$(STP)/cm$^2$ sec emit which was lower by 11% from the beginning of the operation. A flow rate of the nitrogen-rich air produced from the air separation membrane module 1 after 2069 hrs from the beginning of the operation was 0.65 Nm$^3$/h, which was lower only by 13% compared with the beginning of the operation. The results indicate that even after operation at 175° C. for 2000 hrs, the air separation membrane module 1 maintained its ability as a gas separation membrane.

Comparative Example 1 of Section A

Although measurement as described in Example 1 was attempted using the air separation membrane module 2, a hollow fiber membrane was so shrinked at 175° C. that a nitrogen-rich air could not be obtained. In the air separation membrane module 2 maintained at 175° C., hollow collapse, fiber breakage and distortion of a tube sheet were observed.

Comparative Example 2 of Section A

Operation was conducted and a flow rate of a nitrogen-rich air at each predetermined time was measured as described in Example 1, except that the air separation membrane module 3 was used. The measurement results are shown in FIG. 1. $PO_2$ at the beginning of the operation was $19.3 \times 10^{-5}$ cm$^3$(STP)/cm$^2$·sec·cmHg and a flow rate of a nitrogen-rich air produced from the air separation membrane module was 0.625 Nm$^3$/h. At 140 hrs after the beginning of the operation, $P'_{O2}$ of the separation membrane was $11.3 \times 10^5$ cm$^3$(STP)/cm$^2$·sec·cmHg, which was lower by 41% from the beginning of the use, and a flow rate of a nitrogen-rich air produced from the air separation membrane module was 0.419 Nm$^3$/h, which was lower by 35% from the beginning of the use.

Example 2 of Section A

Figure 2:
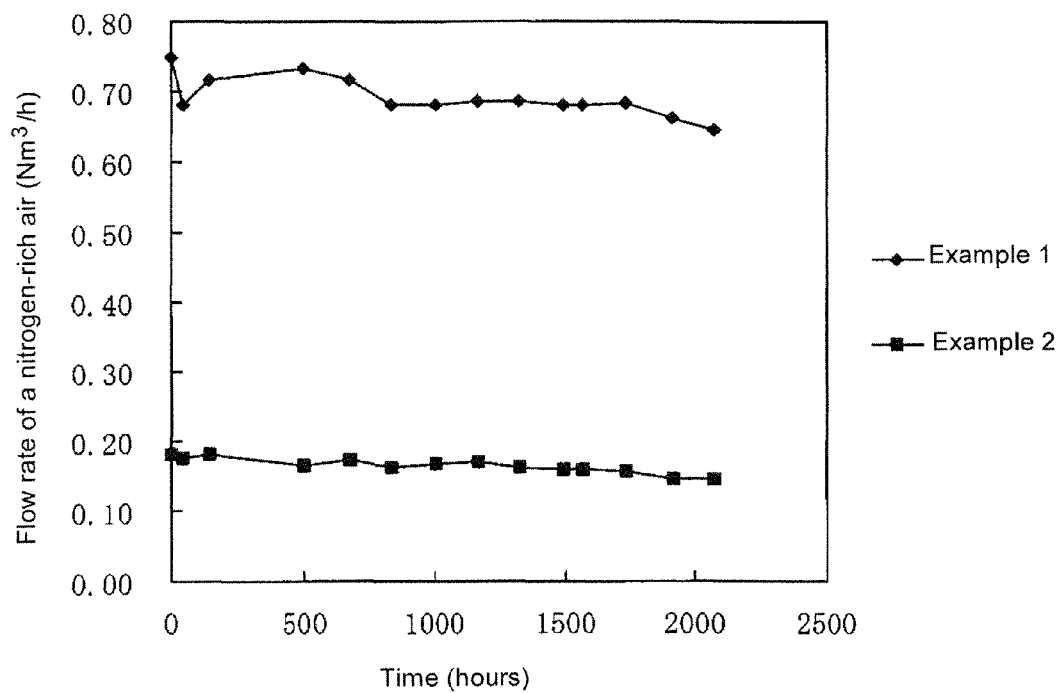
FIG. 2 shows the measurement results for Examples 1 and 2 in section A.

Measurement was conducted as described in Example 1, except that the air-feed rate was regulated such that an oxygen gas concentration in a nitrogen-rich air produced was 5%. The measurement results are shown in FIG. 2. A flow rate of a nitrogen-rich air at the beginning of the operation was 0.18 Nm$^3$/h. At 2069 hr after the beginning of the operation, a flow rate of a nitrogen-rich air was 0.15 Nm$^3$/h, which was lower only by 16%. The results indicate that, as in Example 1, the air separation membrane module 1 maintained its performance as a gas separation membrane even after 2000 hr at 175° C.

terminated butadiene acrylonitrile copolymer (molecular weight: 3100) was heated at 150° C. for 3 to 4 hours to prepare a denatured epoxy resin. Then, 100 parts by weight of the denatured epoxy resin thus prepared, 80 parts by weight of methyl-5-norbornene-2,3-dicarboxylic anhydride and 0.3 parts by weight of 2-ethyl-4-methylimidazole were mixed and stirred to prepare a casting resin composition.

Evaluation of Moldability of a Tube Sheet

A fiber bundle as a collection of 12,000 polyimide hollow fiber membranes (length: 100 cm, outer diameter: 500 μm) was placed in a mold with Φ 100 mm as shown in FIG. 4b. The fiber bundle was substantially erected in such a way that the tip was down, and the casting resin composition prepared by the above procedure was slowly injected into a mold kept at 70° C. The amount of the casting resin composition was regulated such that a thickness became about 90 mm. After the injection, the composition was first-cured at 70° C. for 12 hours, then heated to 142° C. and then post-cured for 4 hours, to mold the tube sheet. After the curing, the hollow fiber element was removed from the casing and visually observed, and the tube sheet was cut substantially into halves and the state of the center was visually observed.

As a result, no cracks were observed in the molded tube sheet.

Example Related to Section E

There will be described the results of simulation with respect to a response of a gas separation membrane module with or without film member wrapping. Table 4 shows module response, in which "type A (crossflow)" indicates a module without film member wrapping, "type B (counterflow)" indicates a module with film member wrapping. Calculation was conducted with the temperature of t=25° C. and the mixed-gas feed pressure PF=0.7 MPaG. It is noted that the simulation was conducted for a separation membrane module for producing a nitrogen-rich air as a product

TABLE 3

<Flow rate of a nitrogen-rich air and properties of an air separation membrane after predetermined times at 175° C.>

| Hollow fiber membrane | 0 hr | | | 140 hr | | | 2069 hr | | |
|---|---|---|---|---|---|---|---|---|---|
| | Product amount | $P'_{O2}$ | $P'_{O2}/P'_{N2}$ | Product amount | $P'_{O2}$ | $P'_{O2}/P'_{N2}$ | Product amount | $P'_{O2}$ | $P'_{O2}/P'_{N2}$ |
| 1 | 0.748 | 35.4 | 2.6 | 0.717 | 33.4 | 2.6 | 0.650 | 31.4 | 2.5 |
| 2 | Not measureable | | | Not measureable | | | Not measureable | | |
| 3 | 0.625 | 19.3 | 2.7 | 0.419 | 11.3 | 3.0 | — | — | — |

In this table, the product amount is a flow rate of a nitrogen-rich air produced (the unit is Nm$^3$/h).
$P'_{O2}$ is an oxygen-gas permeation rate (the unit thereof is ×10$^{-5}$ cm$^{3(STP)/cm2}$ · sec · cmHg).
$P'_{O2}/P'_{N2}$ is a ratio of an oxygen-gas permeation rate to an nitrogen-gas permeation rate.

Example Related to Section B

The invention in section B will be described with reference to examples, but the present invention is, however, not be limited to the examples.

Example 1

Preparation of a Casting Resin Composition

A mixture of 100 parts by weight of phenol novolac polyglycidyl ether and 10 parts by weight of a carboxyl-from air fed as the mixed gas. This nitrogen-rich air passes through the hollow fiber membrane and recovered as a non-permeate gas discharged from the downstream end. In the table, a feed pressure and a feed flow rate indicate a feed pressure and a feed flow rate of the air as a mixed gas, respectively; a product concentration and a product flow rate indicate a nitrogen concentration and a flow rate of a nitrogen-rich air as a product as a non-permeate gas, respectively; and a recovery rate indicates a proportion of a non-permeate gas as a product in the mixed gas fed (product rate/feed flow rate)×100.

TABLE 4

| Type | Flow | Case | Temp. t ° C. | Feed pressure PF MPaG | Feed flow rate FF Nmm³ · h | Product concentration XR % N₂ | Product flow rate FR Nm³/h | Recovery rate | Remarks |
|---|---|---|---|---|---|---|---|---|---|
| A | Crossflow | 1 | 25 | 0.7 | 131.9 | 95 | 62.0 | 47.0 | |
| B | Counterflow | 2 | 25 | 0.7 | 131.9 | 96.05 | 61.5 | 46.6 | FF equal to that in 1 |
| | | 3 | 25 | 0.7 | 144.8 | 95 | 73.2 | 50.6 | XR equal to that in 1 |

As shown in Table 4, at the same feed flow rate FF (see cases 1 and 2), the case 2 with film member wrapping can provide higher product concentration XR. At the same product concentration XR (see cases 1 and 3), the case 3 with film member wrapping can provide higher product flow rate and a higher recovery rate. In other words, these results indicate that wrapping with a film member is effective in efficient gas separation.

EXPLANATION OF REFERENCES 1, 1', 101: separation membrane module
10, 110, 110': cylindrical vessel
10a: inner surface of vessel
10f: flange
10h: opening
10s: step
10t: step
110g: groove
111: tubular member
112: end member
12, 112h: permeate gas outlet
112f: flange
14: hollow fiber membrane
15, 115: hollow fiber bundle
17: annular sealing member
18, 118, 119: O-ring
20, 21, 26, 27, 120, 121, 127: cap
20h: opening
120f flange
120s: step
22A: mixed gas inlet
22B: non-permeate gas outlet
27f flange
127f flange
127g: groove
30, 30', 38, 130A, 130B, 530: tube sheet
30s, 530s: step
30't: step
41: discharge pipe
42: fixing screw
43: fixture
201: gas separation membrane module
210: cartridge
211: cylindrical vessel
212: opening
214: hollow fiber membrane
215: hollow fiber bundle
217, 218: inner groove
219: periphery groove
220, 221: capping member
220A: end face
220B: cylindrical part
220f flat part
220g: flat part
220h: through-hole
223: outlet
227a, 227b: inner groove
230, 231: tube sheet
R1, R2: elastic ring member
245: fixing rod
246: nut
P1: gas inlet
P2: non-permeate gas outlet
P3: gas channel
601: gas separation membrane module
610: casing
610a: mixed gas inlet
610b: non-permeate gas outlet
610c: permeate gas outlet
611: tubular member
612, 613: cap
614: hollow fiber membrane
615: hollow fiber bundle
618: closed space
619a: mixed gas space
619b: non-permeate gas space
621, 622: tube sheet
631: film member
631a, 631b: end
801: gas separation membrane module
810, 910: casing
810a, 910a: mixed gas inlet
810b, 910b: non-permeate gas outlet
810c, 910c: permeate gas outlet
910d: purge gas inlet
811: tubular member
813: tube sheet retaining member
813a: straight part
813b: longer diameter part
813c: tapered part
814, 914: hollow fiber membrane
815, 915: hollow fiber bundle
818, 918: closed space
819a: mixed gas space
819b: non-permeate gas space
821, 822, 921, 922: tube sheet
822a: hollow-fiber-membrane burying part
822b: tube sheet intact part
831: film member
831a, 831b: end
850, 950: sealing structure
851, 853: sealing part
855: fixing tape
857: fixture
891, 893: filler
971: core tube
971a: hole
A1: exposed part
A31: gap
1001: gas separation membrane module
1010: casing 1010a: mixed gas inlet
1010b: non-permeate gas outlet
1010c: permeate gas outlet
1011: cylindrical member
1011a, 1011b: thick wall portions
1011d: concave part
1012: capping member
1014: hollow fiber membrane
1015: hollow fiber bundle
1018: closed space
1019a: mixed gas space
1019b: non-permeate gas space
1021, 1022: tube sheet
1021s: step
1060: sealing member
C1: annular concave groove
B11: mixed gas inlet
B12: permeate gas outlet
B13: non-permeate gas outlet
B14: hollow fiber membrane
B15: casing
B16a, 16b: tube sheet
B21: mold
B22: casing
B23: tube sheet
B24: hollow fiber membrane

The invention claimed is:

1. A process for producing nitrogen-rich air from the air using an air separation membrane module including an air separation membrane, the process comprising feeding the air at 175° C. or higher to the air separation membrane, wherein the air separation membrane in the air separation membrane module comprises a material having no glass-transition temperature at 300° C. or lower,
wherein for the air separation membrane module,
at the initiation of the use, an oxygen-gas permeation rate ($P'_{O2}$) at 175° C. is $20 \times 10^{-5}$ cm$^3$(STP)/cm$^2$·sec ·cmHg or more and a ratio of an oxygen-gas permeation rate to a nitrogen-gas permeation rate ($P'_{O2}/P'_{N2}$) at 175° C. is 1.8 or more; and
after the use at 175° C. for 140 hours, $P'_{O2}$ and $P'_{O2}/P'_{N2}$ are retained in levels of 90% or more of $P'_{O2}$ and $P'_{O2}/P'_{N2}$ before the initiation of the use, respectively.

2. A process for producing nitrogen-rich air from the air using an air separation membrane module including an air separation membrane, the process comprising feeding the air at 175° C. or higher to the air separation membrane, wherein the air separation membrane in the air separation membrane module comprises a material having no glass-transition temperature at 300° C. or lower,
wherein after being placed at 175° C. for 2 hours, the air separation membrane exhibits a shape-retention ratio of 95% or more.

3. A method for explosion protection of an aircraft, comprising producing nitrogen-rich air by the production process as claimed in claim 1 and feeding the nitrogen-rich air to a fuel tank for an aircraft.

4. A method for explosion protection of an aircraft, comprising producing nitrogen-rich air by the production process as claimed in claim 2 and feeding the nitrogen-rich air to a fuel tank for an aircraft.

5. The process according to claim 1, wherein the material having no glass-transition temperature at 300° C. or lower in the air separation membrane comprises polyimide.

6. The process according to claim 2, wherein the material having no glass-transition temperature at 300° C. or lower in the air separation membrane comprises polyimide.

* * * * *